(12) United States Patent
Yang et al.

(10) Patent No.: US 10,432,761 B2
(45) Date of Patent: Oct. 1, 2019

(54) TECHNIQUES FOR HANDLING INTERNET PROTOCOL FLOWS IN A LAYER 2 ARCHITECTURE OF A WIRELESS DEVICE

(71) Applicant: QUALCOMM Incorporated, San Diego, CA (US)

(72) Inventors: Yue Yang, San Diego, CA (US); Yu-Ting Yu, Union City, CA (US); Aziz Gholmieh, Del Mar, CA (US); Leena Zacharias, San Jose, CA (US); Shailesh Maheshwari, San Diego, CA (US); Vishal Dalmiya, San Diego, CA (US); Bao Vinh Nguyen, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 15/650,725

(22) Filed: Jul. 14, 2017

(65) Prior Publication Data

US 2018/0205808 A1 Jul. 19, 2018

Related U.S. Application Data

(60) Provisional application No. 62/447,896, filed on Jan. 18, 2017, provisional application No. 62/476,504, filed on Mar. 24, 2017.

(51) Int. Cl.
*H04W 72/04* (2009.01)
*H04L 29/08* (2006.01)
(Continued)

(52) U.S. Cl.
CPC ............ *H04L 69/324* (2013.01); *H04L 29/06* (2013.01); *H04L 45/00* (2013.01); *H04L 69/14* (2013.01);
(Continued)

(58) Field of Classification Search
CPC . H04W 72/1242; H04W 12/02; H04W 16/32; H04W 28/0268; H04W 72/02;
(Continued)

(56) References Cited

U.S. PATENT DOCUMENTS

2002/0097723 A1* 7/2002 Tourunen ................ H04L 69/04
370/392
2003/0123485 A1* 7/2003 Yi .......................... H04W 28/06
370/477

(Continued)

FOREIGN PATENT DOCUMENTS

| EP | 2073588 A2 | 6/2009 |
| EP | 3282747 A1 | 2/2018 |
| WO | WO-2016163036 A1 | 10/2016 |

OTHER PUBLICATIONS

Fischer P., et al., "User Plane Protocols" In: "LTE—The UMTS Long Term Evolution", Feb. 20, 2009 (Feb. 20, 2009), John Wiley & Sons, Ltd, Chichester, UK, XP055115879, pp. 79-110.
(Continued)

*Primary Examiner* — Sai Aung
(74) *Attorney, Agent, or Firm* — Holland & Hart LLP

(57) ABSTRACT

Techniques are described for wireless communication. One method includes receiving, at a medium access control (MAC) entity, protocol data units (PDUs) corresponding to one or more Internet protocol (IP) flows, routing the PDUs from the MAC entity to respective radio link control (RLC) entities based on a logical channel prioritization, and forwarding the PDUs from respective RLC entities to one or more packet data convergence protocol (PDCP) entities mapped to each RLC entity. Another method includes receiving, at a protocol layer entity above an RLC layer of a transmitting device, a PDU, labeling the PDU with a
(Continued)

unique PDCP instance identifier packet, and passing the PDU to a protocol layer entity below the PDCP layer of the transmitting device.

25 Claims, 35 Drawing Sheets

(51) Int. Cl.
    *H04L 29/06*     (2006.01)
    *H04L 12/701*     (2013.01)
    *H04W 40/00*     (2009.01)

(52) U.S. Cl.
    CPC ........... *H04L 69/321* (2013.01); *H04W 40/00* (2013.01); *H04L 69/16* (2013.01); *H04L 69/161* (2013.01); *H04L 69/165* (2013.01)

(58) Field of Classification Search
    CPC ............. H04W 72/0453; H04W 72/10; H04W 72/1231; H04W 76/15; H04L 1/0007; H04L 1/0017; H04L 1/1867; H04L 1/1896; H04L 41/5022
    See application file for complete search history.

(56) References Cited

U.S. PATENT DOCUMENTS

| | | | |
|---|---|---|---|
| 2009/0046631 A1 | 2/2009 | Meylan et al. | |
| 2010/0232356 A1* | 9/2010 | Maheshwari | H04L 1/1867 370/328 |
| 2011/0090806 A1* | 4/2011 | Ozturk | H04L 1/0007 370/252 |
| 2015/0003336 A1* | 1/2015 | Singh | H04W 72/02 370/329 |
| 2017/0150393 A1* | 5/2017 | Payer | H04L 41/5022 |

OTHER PUBLICATIONS

Partial International Search Report—PCT/US2018/013878—ISA/EPO—dated Jun. 14, 2018.
International Search Report and Written Opinion—PCT/US2018/013878—ISA/EPO—dated Aug. 29, 2018.

\* cited by examiner

LTE RRC
(split SRB bearer)

NR RRC
(direct SRB bearer or via LTE transparent container)

Path 1: Direct via MN

Path 2: Split via SN

TECHNIQUES FOR HANDLING INTERNET PROTOCOL FLOWS IN A LAYER 2 ARCHITECTURE OF A WIRELESS DEVICE

CROSS REFERENCES

The present Application for Patent claims priority to U.S. Provisional Patent Application No. 62/447,896 by Yang et al., entitled "TECHNIQUES FOR HANDLING INTERNET PROTOCOL (IP) FLOWS IN A LAYER 2 (L2) ARCHITECTURE OF A WIRELESS DEVICE," filed Jan. 18, 2017, assigned to the assignee hereof, and U.S. Provisional Patent Application No. 62/476,504 by Yu et al., entitled "PACKET DATA CONVERGENCE PROTOCOL (PDCP) INSTANCE AGGREGATION IN RADIO LINK CONTROL (RLC)," filed Mar. 24, 2017, assigned to the assignee hereof.

INTRODUCTION

The present disclosure, for example, relates to wireless communication systems, and more particularly to techniques for handling Internet protocol (IP) flows in a Layer 2 (L2) architecture of a wireless device and techniques for handling packet data convergence protocol (PDCP) instance aggregation in radio link control (RLC) using communications systems operating according to new radio (NR) technologies.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of network access devices, each simultaneously supporting communication for multiple communication devices, otherwise known as user equipment (UEs). In a Long-Term Evolution (LTE) or LTE-Advanced (LTE-A) network, a network access device may take the form of a base station, with a set of one or more base stations defining an eNodeB (eNB). In a next generation, NR, millimeter wave (mmW), or 5G network, a network access device may take the form of a smart radio head (or radio head (RH)) or access node controller (ANC), with a set of smart radio heads in communication with an ANC defining a gNodeB (gNB). A network access device may communicate with a set of UEs on downlink channels (e.g., for transmissions from a network access device to a UE) and uplink channels (e.g., for transmissions from a UE to a network access device).

When transmitting packets between wireless devices (e.g., between UEs and network access devices, or between UEs), a transmitting device may process packets to be transmitted using a layered protocol stack including a L2 (and other layers) of a protocol stack. Similarly, a receiving device may process received packets using a layered protocol stack including a L2 (and other layers) of a protocol stack.

SUMMARY

Methods, systems, and devices of wireless communication is described. Techniques include the use of various L2 architectures so as to reduce the potential for delay during forwarding and processing of data as well as improved communications between devices in a wireless network.

A method of wireless communication may include receiving, at a medium access control (MAC) entity, protocol data units (PDUs) corresponding to one or more IP flows, routing the PDUs from the MAC entity to respective RLC entities based at least in part on a logical channel prioritization, and forwarding the PDUs from respective RLC entities to one or more PDCP entities mapped to each RLC entity.

An apparatus for wireless communication is described. The apparatus may include means for receiving, at a MAC entity, PDUs corresponding to one or more IP flows, means for routing the PDUs from the MAC entity to respective RLC entities based at least in part on a logical channel prioritization, and means for forwarding the PDUs from respective RLC entities to one or more PDCP entities mapped to each RLC entity.

Another apparatus for wireless communication is described. The apparatus may include a processor, memory in electronic communication with the processor, and instructions stored in the memory. The instructions may be operable to receive, at a MAC entity, PDUs corresponding to one or more IP flows, route the PDUs from the MAC entity to respective RLC entities based at least in part on a logical channel prioritization, and forward the PDUs from respective RLC entities to one or more PDCP entities mapped to each RLC entity.

A non-transitory computer readable medium for wireless communication is described. The non-transitory computer-readable medium may include instructions operable to cause a processor to receive, at a MAC entity, PDUs corresponding to one or more IP flows, route the PDUs from the MAC entity to respective RLC entities based at least in part on a logical channel prioritization, and forward the PDUs from respective RLC entities to one or more PDCP entities mapped to each RLC entity.

In some examples of the method, apparatus, and non-transitory computer-readable medium described above, the forwarding the PDUs from respective RLC entities to the one or more PDCP entities may comprise forwarding the PDUs from respective RLC entities to a plurality of PDCP entities mapped to each RLC entity.

In some examples of the method, apparatus, and non-transitory computer-readable medium described above, the forwarding the PDUs from respective RLC entities to the plurality of PDCP entities may further comprise forwarding PDUs corresponding to one IP flow of the one or more IP flows to one PDCP entity of the plurality of PDCP entities dedicated to the one IP flow.

In some examples of the method, apparatus, and non-transitory computer-readable medium described above, the forwarding the PDUs from respective RLC entities to the one or more PDCP entities may further comprise extracting, at respective RLC entities, an IP flow identifier from a header of each of the PDUs, and forwarding the PDUs to the one or more PDCP entities based at least in part on the IP flow identifier.

In some examples of the method, apparatus, and non-transitory computer-readable medium described above, the forwarding the PDUs from respective RLC entities to the one or more PDCP entities may further comprise forwarding PDUs corresponding to a correlated portion of the one or more IP flows to one of the one or more PDCP entities dedicated to the correlated portion of IP flows.

In some examples of the method, apparatus, and non-transitory computer-readable medium described above, the routing the PDUs from the MAC entity to respective RLC entities may further comprise routing the PDUs from the MAC entity to respective radio bearers, each radio bearer comprising a single RLC entity and multiple PDCP entities.

In some examples of the method, apparatus, and non-transitory computer-readable medium described above, the single RLC entity is a receive RLC entity that is different from a transmit RLC entity for the multiple PDCP entities.

In some examples of the method, apparatus, and non-transitory computer-readable medium described above, the forwarding the PDUs from respective RLC entities to one or more PDCP entities may comprise forwarding the PDUs from respective RLC entities to corresponding respective PDCP entities, at least one of the respective RLC entities and corresponding respective PDCP entities being dedicated to a single IP flow. In some examples of the method, apparatus, and non-transitory computer-readable medium described above, the forwarding the PDUs from respective RLC entities to corresponding respective PDCP entities may further comprise using matching sequence numbers for a same PDU at a respective RLC entity and a PDCP entity mapped to the respective RLC entity. In some examples of the method, apparatus, and non-transitory computer-readable medium described above, the forwarding the PDUs from respective RLC entities to corresponding PDCP entities may further comprise forwarding PDUs corresponding to a correlated portion of the one or more IP flows to one of the one or more PDCP entities dedicated to the correlated portion of IP flows. In some examples of the method, apparatus, and non-transitory computer-readable medium described above, the routing the PDUs from the MAC entity to respective RLC entities may further comprise routing the PDUs from the MAC entity to respective radio bearers, each radio bearer comprising a single RLC entity and a single PDCP entity. In some examples of the method, apparatus, and non-transitory computer-readable medium described above, the single RLC entity is a receive RLC entity that is different from a transmit RLC entity for the single PDCP entity.

In some examples of the method, apparatus, and non-transitory computer-readable medium described above, the forwarding the PDUs from respective RLC entities to the one or more PDCP entities may comprise forwarding the PDUs from respective RLC entities to a plurality of PDCP entities, at least one of the PDCP entities being dedicated to a single IP flow.

In some examples of the method, apparatus, and non-transitory computer-readable medium described above, each of the received PDUs corresponding to the one or more IP flows includes a unique PDCP instance identifier.

Some examples of the method, apparatus, and non-transitory computer-readable medium described above may further include processes, features, means, or instructions for demultiplexing the PDUs corresponding to the one or more IP flows at the respective RLC entities.

A method of wireless communication may include receiving, at a PDCP entity dedicated to an IP flow, PDUs corresponding to the IP flow, passing the PDUs to an RLC entity based at least in part on a logical channel identifier (LCID) associated with the RLC entity, and forwarding the PDUs from the RLC entity to a MAC entity for wireless transmission.

An apparatus for wireless communication is described. The apparatus may include means for receiving, at a PDCP entity dedicated to an IP flow, PDUs corresponding to the IP flow, means for passing the PDUs to an RLC entity based at least in part on an LCID associated with the RLC entity, and means for forwarding the PDUs from the RLC entity to a MAC entity for wireless transmission.

Another apparatus for wireless communication is described. The apparatus may include a processor, memory in electronic communication with the processor, and instructions stored in the memory. The instructions may be operable to receive, at a PDCP entity dedicated to an IP flow, PDUs corresponding to the IP flow, pass the PDUs to an RLC entity based at least in part on an LCID associated with the RLC entity, and forward the PDUs from the RLC entity to a MAC entity for wireless transmission.

A non-transitory computer readable medium for wireless communication is described. The non-transitory computer-readable medium may include instructions operable to cause a processor to receive, at a PDCP entity dedicated to an IP flow, PDUs corresponding to the IP flow, pass the PDUs to an RLC entity based at least in part on an LCID associated with the RLC entity, and forward the PDUs from the RLC entity to a MAC entity for wireless transmission.

In some examples of the method, apparatus, and non-transitory computer-readable medium described above, the RLC entity and the PDCP entity dedicated to the IP flow are mapped together as a radio bearer.

Some examples of the method, apparatus, and non-transitory computer-readable medium described above may further include processes, features, means, or instructions for concatenating PDUs corresponding to the IP flow received at the PDCP entity dedicated to the IP flow.

Some examples of the method, apparatus, and non-transitory computer-readable medium described above may further include processes, features, means, or instructions for concatenating PDUs from the RLC entity belonging to the LCID associated with the RLC entity.

Some examples of the method, apparatus, and non-transitory computer-readable medium described above may further include processes, features, means, or instructions for determining, at the MAC entity, a logical channel prioritization for a plurality of IP flows including the IP flow.

Some examples of the method, apparatus, and non-transitory computer-readable medium described above may further include processes, features, means, or instructions for inserting, at the PDCP entity, an IP flow identifier in a header of each of the PDUs passed to the RLC entity.

Some examples of the method, apparatus, and non-transitory computer-readable medium described above may further include processes, features, means, or instructions for labeling each of the PDUs corresponding to the IP flow with a unique PDCP instance identifier.

A method of wireless communication may include receiving, by a receiving device, a PDU that includes a unique PDCP instance identifier, identifying a PDCP entity corresponding to the PDU based at least in part on the PDCP instance identifier, and forwarding the PDU to the PDCP entity.

An apparatus for wireless communication is described. The apparatus may include means for receiving a PDU that includes a unique PDCP instance identifier, means for identifying a PDCP entity corresponding to the PDU based at least in part on the PDCP instance identifier, and means for forwarding the PDU to the PDCP entity.

Another apparatus for wireless communication is described. The apparatus may include a processor, memory in electronic communication with the processor, and instructions stored in the memory. The instructions may be operable to receive a PDU that includes a unique PDCP instance identifier, identify a PDCP entity corresponding to the PDU based at least in part on the PDCP instance identifier, and forward the PDU to the PDCP entity.

A non-transitory computer readable medium for wireless communication is described. The non-transitory computer-readable medium may include instructions operable to cause a processor to receive a PDU that includes a unique PDCP instance identifier, identify a PDCP entity corresponding to the PDU based at least in part on the PDCP instance identifier, and forward the PDU to the PDCP entity.

In some examples of the method, apparatus, and non-transitory computer-readable medium described above, the receiving, by the receiving device, the PDU that includes the unique PDCP instance identifier may comprise receiving, at a MAC entity of the receiving device, the PDU that includes the unique PDCP instance identifier, the PDU corresponding to an IP flow.

In some examples of the method, apparatus, and non-transitory computer-readable medium described above, the forwarding the PDU to the PDCP entity may comprise determining that the PDCP entity is associated with a destination receiving device different from the receiving device, and transmitting the PDU to the destination receiving device.

A method of wireless communication may include receiving, at a protocol layer entity above a PDCP layer of a transmitting device, a PDU, labeling the PDU with a unique PDCP instance identifier, and passing the PDU to a protocol layer entity below the PDCP layer of the transmitting device.

An apparatus for wireless communication is described. The apparatus may include means for receiving, at a protocol layer entity above a PDCP layer, a PDU, means for labeling the PDU with a unique PDCP instance identifier, and means for passing the PDU to a protocol layer entity below the PDCP layer.

Another apparatus for wireless communication is described. The apparatus may include a processor, memory in electronic communication with the processor, and instructions stored in the memory. The instructions may be operable to receive, at a protocol layer entity above a PDCP layer, a PDU, label the PDU with a unique PDCP instance identifier, and pass the PDU to a protocol layer entity below the PDCP layer.

A non-transitory computer readable medium for wireless communication is described. The non-transitory computer-readable medium may include instructions operable to cause a processor to receive, at a protocol layer entity above a PDCP layer, a PDU, label the PDU with a unique PDCP instance identifier, and pass the PDU to a protocol layer entity below the PDCP layer.

Some examples of the method, apparatus, and non-transitory computer-readable medium described above may further include processes, features, means, or instructions for determining an RLC entity associated with the PDU based at least in part on the unique PDCP instance identifier. Some examples of the method, apparatus, and non-transitory computer-readable medium described above may further include processes, features, means, or instructions for labeling the PDU with an additional unique PDCP instance identifier, the additional unique PDCP instance identifier corresponding to a same RLC entity as the unique PDCP instance identifier and a PDCP entity different from a PDCP entity associated with the the unique PDCP instance identifier.

In some examples of the method, apparatus, and non-transitory computer-readable medium described above, the passing the PDU to a protocol layer below the PDCP layer of the transmitting device may comprise passing the PDU to an RLC entity of the transmitting device based at least in part on an LCID associated with the RLC entity. Some examples of the method, apparatus, and non-transitory computer-readable medium described above may further include processes, features, means, or instructions for forwarding the PDU from the RLC entity to a MAC entity for wireless transmission.

In some examples of the method, apparatus, and non-transitory computer-readable medium described above, the forwarding the PDU to the PDCP entity may comprise transmitting the PDU to a destination transmitting device different from the transmitting device when the unique PDCP instance identifier is associated with the destination transmitting device.

A method may include receiving, at a MAC entity, PDUs corresponding to one or more IP flows. The method may also include routing the PDUs from the MAC entity to respective RLC entities based on a logical channel prioritization, and forwarding the PDUs from respective RLC entities to a plurality of PDCP entities mapped to each RLC entity.

In some examples of the method described above, a one-to-one relationship between RLC entities and PDCP entities may exist, where PDCP entities are dedicated to a single IP flow. In some examples of the method described above, a single RLC entity may be mapped to multiple PDCP entities. In some examples of the method described above, a PDCP entity may be dedicated to a single IP flow or to a correlated portion of IP flows. In some examples of the method described above, various L2 architectures may be used for transmission of PDUs as well.

A method of wireless communication is described. The method may include receiving, at a MAC entity, PDUs corresponding to one or more IP flows, routing the PDUs from the MAC entity to respective RLC entities based at least in part on a logical channel prioritization, and forwarding the PDUs from respective RLC entities to a plurality of PDCP entities mapped to each RLC entity.

In some examples of the method described above, the forwarding the PDUs from respective RLC entities to a plurality of PDCP entities may include forwarding PDUs corresponding to one of the one or more IP flows to one of the plurality of PDCP entities dedicated to the one IP flow.

In some examples, the method described above may include demultiplexing the PDUs corresponding to the one or more IP flows at the respective RLC entities. In some examples of the method described above, the forwarding the PDUs from respective RLC entities to a plurality of PDCP entities may include extracting, at respective RLC entities, an IP flow identifier from a header of each of the PDUs, and forwarding the PDUs to the plurality of PDCP entities based at least in part on the IP flow identifier.

In some examples of the method described above, the forwarding the PDUs from respective RLC entities to a plurality of PDCP entities may include forwarding PDUs corresponding to a correlated portion of the one or more IP flows to one of the plurality of PDCP entities dedicated to the correlated portion of IP flows.

In some examples of the method described above, the routing the PDUs from the MAC entity to respective RLC entities may include routing the PDUs from the MAC entity to respective radio bearers, with each radio bearer including a single RLC entity and multiple PDCP entities.

In some examples of the method described above, the single RLC entity may be a receive RLC entity that is different from a transmit RLC entity for the multiple PDCP entities.

Some examples of the method described above may further include dynamically updating a mapping of the PDCP entities to the RLC entities.

Some examples of the method described above may further include applying, at a respective RLC entity, header compression to PDUs forwarded to the plurality of PDCP entities mapped to the respective RLC entity.

An apparatus for wireless communication is described. The apparatus may include means for receiving, at a MAC entity, PDUs corresponding to one or more IP flows, means for routing the PDUs from the MAC entity to respective RLC entities based at least in part on a logical channel prioritization, and means for forwarding the PDUs from respective RLC entities to a plurality of PDCP entities mapped to each RLC entity.

In some examples of the apparatus described above, the means for forwarding the PDUs from respective RLC entities to a plurality of PDCP entities may include means for forwarding PDUs corresponding to one of the one or more IP flows to one of the plurality of PDCP entities dedicated to the one IP flow.

Some examples of the apparatus described above may further include means for demultiplexing the PDUs corresponding to the one or more IP flows at the respective RLC entities.

In some examples of the apparatus described above, the means for forwarding the PDUs from respective RLC entities to a plurality of PDCP entities may include means for extracting, at respective RLC entities, an IP flow identifier from a header of each of the PDUs, and means for forwarding the PDUs to the plurality of PDCP entities based at least in part on the IP flow identifier.

In some examples of the apparatus described above, the means for forwarding the PDUs from respective RLC entities to a plurality of PDCP entities may include means for forwarding PDUs corresponding to a correlated portion of the one or more IP flows to one of the plurality of PDCP entities dedicated to the correlated portion of IP flows.

In some examples of the apparatus described above, the means for routing the PDUs from the MAC entity to respective RLC entities may include means for routing the PDUs from the MAC entity to respective radio bearers, with each radio bearer including a single RLC entity and multiple PDCP entities.

In some examples of the apparatus described above, the single RLC entity may be a receive RLC entity that is different from a transmit RLC entity for the multiple PDCP entities.

Some examples of the apparatus described above may further include means for dynamically updating a mapping of the PDCP entities to the RLC entities.

Some examples of the apparatus described above may further include means for applying, at a respective RLC entity, header compression to PDUs forwarded to the plurality of PDCP entities mapped to the respective RLC entity.

Another apparatus for wireless communication is described. The apparatus may include a processor, memory in electronic communication with the processor, and instructions stored in the memory. The instructions may be operable to cause the processor to receive, at a MAC entity, PDUs corresponding to one or more IP flows, to route the PDUs from the MAC entity to respective RLC entities based at least in part on a logical channel prioritization, and to forward the PDUs from respective RLC entities to a plurality of PDCP entities mapped to each RLC entity.

In some examples of the apparatus described above, the instructions operable to cause the processor to forward the PDUs from respective RLC entities to a plurality of PDCP entities may include instructions operable to cause the processor to forward PDUs corresponding to one of the one or more IP flows to one of the plurality of PDCP entities dedicated to the one IP flow.

Some examples of the apparatus described above may further include instructions operable to cause the processor to demultiplex the PDUs corresponding to the one or more IP flows at the respective RLC entities.

In some examples of the apparatus described above, the instructions operable to cause the processor to forward the PDUs from respective RLC entities to a plurality of PDCP entities may include instructions operable to cause the processor to extract, at respective RLC entities, an IP flow identifier from a header of each of the PDUs, and forward the PDUs to the plurality of PDCP entities based at least in part on the IP flow identifier.

In some examples of the apparatus described above, the instructions operable to cause the processor to forward the PDUs from respective RLC entities to a plurality of PDCP entities may include instructions operable to cause the processor to forward PDUs corresponding to a correlated portion of the one or more IP flows to one of the plurality of PDCP entities dedicated to the correlated portion of IP flows.

In some examples of the apparatus described above, the instructions operable to cause the processor to route the PDUs from the MAC entity to respective RLC entities may include instructions operable to cause the processor to route the PDUs from the MAC entity to respective radio bearers, with each radio bearer including a single RLC entity and multiple PDCP entities.

In some examples of the apparatus described above, the single RLC entity may be a receive RLC entity that is different from a transmit RLC entity for the multiple PDCP entities.

Some examples of the apparatus described above may further include instructions operable to cause the processor to dynamically update a mapping of the PDCP entities to the RLC entities.

Some examples of the apparatus described above may further include instructions operable to cause the processor to apply, at a respective RLC entity, header compression to PDUs forwarded to the plurality of PDCP entities mapped to the respective RLC entity.

A non-transitory computer readable medium for wireless communication is described. The non-transitory computer-readable medium may include instructions operable to cause a processor to receive, at a MAC entity, PDUs corresponding to one or more IP flows, route the PDUs from the MAC entity to respective RLC entities based at least in part on a logical channel prioritization, and forward the PDUs from respective RLC entities to a plurality of PDCP entities mapped to each RLC entity.

In some examples of the non-transitory computer readable medium described above, the instructions operable to cause the processor to forward the PDUs from respective RLC entities to a plurality of PDCP entities may include instructions operable to cause the processor to forward PDUs corresponding to one of the one or more IP flows to one of the plurality of PDCP entities dedicated to the one IP flow.

Some examples of the non-transitory computer readable medium described above may further include instructions operable to cause the processor to demultiplex the PDUs corresponding to the one or more IP flows at the respective RLC entities.

In some examples of the non-transitory computer readable medium described above, the instructions operable to cause the processor to forward the PDUs from respective RLC entities to a plurality of PDCP entities may include instructions operable to cause the processor to extract, at respective RLC entities, an IP flow identifier from a header of each of the PDUs, and forward the PDUs to the plurality of PDCP entities based at least in part on the IP flow identifier.

In some examples of the non-transitory computer readable medium described above, the instructions operable to cause the processor to forward the PDUs from respective RLC entities to a plurality of PDCP entities may further include instructions operable to cause the processor to forward PDUs corresponding to a correlated portion of the one or more IP flows to one of the plurality of PDCP entities dedicated to the correlated portion of IP flows.

In some examples of the non-transitory computer readable medium described above, the instructions operable to cause the processor to route the PDUs from the MAC entity to respective RLC entities may further include instructions operable to cause the processor to route the PDUs from the MAC entity to respective radio bearers, with each radio bearer including a single RLC entity and multiple PDCP entities.

In some examples of the non-transitory computer readable medium described above, the single RLC entity may be a receive RLC entity that is different from a transmit RLC entity for the multiple PDCP entities.

Some examples of the non-transitory computer readable medium described above may further include instructions operable to cause the processor to dynamically update a mapping of the PDCP entities to the RLC entities.

Some examples of the non-transitory computer readable medium described above may further include instructions operable to cause the processor to apply, at a respective RLC entity, header compression to PDUs forwarded to the plurality of PDCP entities mapped to the respective RLC entity.

A method of wireless communication is described. The method may include receiving, at a MAC entity, PDUs corresponding to one or more IP flows, routing the PDUs corresponding to the one or more IP flows from the MAC entity to respective RLC entities based at least in part on a logical channel prioritization, and forwarding the PDUs from respective RLC entities to corresponding respective PDCP entities, in which at least one of the respective RLC entities and corresponding respective PDCP entities being dedicated to a single IP flow.

In some examples of the method, forwarding the PDUs from respective RLC entities to corresponding respective PDCP entities may include using matching sequence numbers for a same PDU at a respective RLC entity and a PDCP entity mapped to the respective RLC entity.

In some examples, forwarding the PDUs from respective RLC entities to corresponding PDCP entities may include forwarding PDUs corresponding to a correlated portion of the one or more IP flows to one of the plurality of PDCP entities dedicated to the correlated portion of IP flows.

In some examples, routing the PDUs from the MAC entity to respective RLC entities may include routing the PDUs from the MAC entity to respective radio bearers, with each radio bearer including a single RLC entity and a single PDCP entity.

In some examples, the single RLC entity may be a receive RLC entity that is different from a transmit RLC entity for the single PDCP entity. In some examples, the method may include dynamically updating a mapping of the PDCP entities to the RLC entities.

In some examples, the method may include applying, at a respective RLC entity, header compression to PDUs forwarded to the respective PDCP entity mapped to the respective RLC entity.

An apparatus for wireless communication is described. The apparatus may include means for receiving, at a MAC entity, PDUs corresponding to one or more IP flows, means for routing the PDUs corresponding to the one or more IP flows from the MAC entity to respective RLC entities based at least in part on a logical channel prioritization, and means for forwarding the PDUs from respective RLC entities to corresponding respective PDCP entities, in which at least one of the respective RLC entities and corresponding respective PDCP entities being dedicated to a single IP flow.

In some examples of the apparatus, the means for forwarding the PDUs from respective RLC entities to corresponding respective PDCP entities may include means for using matching sequence numbers for a same PDU at a respective RLC entity and a PDCP entity mapped to the respective RLC entity.

In some examples, the means for forwarding the PDUs from respective RLC entities to corresponding PDCP entities may include means for forwarding PDUs corresponding to a correlated portion of the one or more IP flows to one of the plurality of PDCP entities dedicated to the correlated portion of IP flows.

In some examples, the means for routing the PDUs from the MAC entity to respective RLC entities may include means for routing the PDUs from the MAC entity to respective radio bearers, with each radio bearer including a single RLC entity and a single PDCP entity.

In some examples, the single RLC entity may be a receive RLC entity that is different from a transmit RLC entity for the single PDCP entity.

In some examples, the apparatus may include means for dynamically updating a mapping of the PDCP entities to the RLC entities. In some examples, the apparatus may include means for applying, at a respective RLC entity, header compression to PDUs forwarded to the respective PDCP entity mapped to the respective RLC entity.

Another apparatus for wireless communication is described. The apparatus may include a processor, and memory in electronic communication with the processor. The processor and memory may be configured to receive, at a MAC entity, PDUs corresponding to one or more IP flows, to route the PDUs corresponding to the one or more IP flows from the MAC entity to respective RLC entities based at least in part on a logical channel prioritization and to forward the PDUs from respective RLC entities to corresponding respective PDCP entities, in which at least one of the respective RLC entities and corresponding respective PDCP entities being dedicated to a single IP flow.

In some examples of the apparatus, forwarding the PDUs from respective RLC entities to corresponding respective PDCP entities may include using matching sequence numbers for a same PDU at a respective RLC entity and a PDCP entity mapped to the respective RLC entity.

In some examples, forwarding the PDUs from respective RLC entities to corresponding PDCP entities may include forwarding PDUs corresponding to a correlated portion of the one or more IP flows to one of the plurality of PDCP entities dedicated to the correlated portion of IP flows.

In some examples, routing the PDUs from the MAC entity to respective RLC entities may include routing the PDUs from the MAC entity to respective radio bearers, with each radio bearer including a single RLC entity and a single PDCP entity. In some examples, the single RLC entity may be a receive RLC entity that is different from a transmit RLC entity for the single PDCP entity.

In some examples, the processor and memory may be configured to dynamically update a mapping of the PDCP entities to the RLC entities.

In some examples, the processor and memory may be configured to apply, at a respective RLC entity, header compression to PDUs forwarded to the respective PDCP entity mapped to the respective RLC entity.

A non-transitory computer readable medium storing computer-executable code for wireless communication is described. The code may include code to receive, at a MAC entity, PDUs corresponding to one or more IP flows, route the PDUs corresponding to the one or more IP flows from the MAC entity to respective RLC entities based at least in part on a logical channel prioritization, and forward the PDUs from respective RLC entities to corresponding respective PDCP entities, in which at least one of the respective RLC entities and corresponding respective PDCP entities being dedicated to a single IP flow.

In some examples of the non-transitory computer readable medium, the code to forward the PDUs from respective RLC entities to corresponding respective PDCP entities may include code to use matching sequence numbers for a same PDU at a respective RLC entity and a PDCP entity mapped to the respective RLC entity.

In some examples, the code to forward the PDUs from respective RLC entities to corresponding PDCP entities may include code to forward PDUs corresponding to a correlated portion of the one or more IP flows to one of the plurality of PDCP entities dedicated to the correlated portion of IP flows.

In some examples, the code to route the PDUs from the MAC entity to respective RLC entities may include code to route the PDUs from the MAC entity to respective radio bearers, with each radio bearer including a single RLC entity and a single PDCP entity.

In some examples, the single RLC entity may be a receive RLC entity that is different from a transmit RLC entity for the single PDCP entity.

In some examples, the code may include code to dynamically update a mapping of the PDCP entities to the RLC entities.

In some examples, the code may include code to apply, at a respective RLC entity, header compression to PDUs forwarded to the respective PDCP entity mapped to the respective RLC entity.

A method of wireless communication is described. The method may include receiving, at a MAC entity, PDUs corresponding to one or more IP flows, routing the PDUs corresponding to the one or more IP flows from the MAC entity to respective RLC entities based at least in part on a logical channel prioritization, and forwarding the PDUs from respective RLC entities to a plurality of PDCP entities, at least one of the PDCP entities being dedicated to a single IP flow.

An apparatus for wireless communication is described. The apparatus may include means for receiving, at a MAC entity, PDUs corresponding to one or more IP flows, means for routing the PDUs corresponding to the one or more IP flows from the MAC entity to respective RLC entities based at least in part on a logical channel prioritization, and means for forwarding the PDUs from respective RLC entities to a plurality of PDCP entities, at least one of the PDCP entities being dedicated to a single IP flow.

Another apparatus for wireless communication is described. The apparatus may include a processor, and memory in electronic communication with the processor. The processor and memory may be configured to receive, at a MAC entity, PDUs corresponding to one or more IP flows, to route the PDUs corresponding to the one or more IP flows from the MAC entity to respective RLC entities based at least in part on a logical channel prioritization, and to forward the PDUs from respective RLC entities to a plurality of PDCP entities, at least one of the PDCP entities being dedicated to a single IP flow.

A non-transitory computer readable medium storing computer-executable code for wireless communication is described. The code may include code to receive, at a MAC entity, PDUs corresponding to one or more IP flows, to route the PDUs corresponding to the one or more IP flows from the MAC entity to respective RLC entities based at least in part on a logical channel prioritization, and to forward the PDUs from respective RLC entities to a plurality of PDCP entities, at least one of the PDCP entities being dedicated to a single IP flow.

A method of wireless communication is described. The method may include receiving, at a RLC entity associated with an LCID, PDUs corresponding to an IP flow, with the PDUs being received from a PDCP entity dedicated to the IP flow, and forwarding the PDUs from the RLC entity to a MAC entity for wireless transmission.

In some examples of the method, the RLC entity and the PDCP entity may be mapped together as a radio bearer. In some examples, the RLC entity may be mapped together with the PDCP entity and other PDCP entities as a radio bearer.

In some examples, receiving, at the RLC entity, PDUs corresponding to an IP flow may include receiving concatenated PDUs from the PDCP entity. In some examples, the method may include concatenating PDUs belonging to the LCID at the MAC entity.

In some examples, the method may include determining, at the MAC entity, a logical channel prioritization for a plurality of IP flows including the IP flow.

In some examples, the method may include inserting, at the PDCP entity, an IP flow identifier in a header of each of the PDUs routed to the RLC entity.

In some examples, the method may include concatenating PDUs corresponding to the IP flow at the PDCP entity.

An apparatus for wireless communication is described. The apparatus may include means for receiving, at a RLC entity associated with a LCID, PDUs corresponding to an IP flow, with the PDUs being received from a PDCP entity dedicated to the IP flow, and means for forwarding the PDUs from the RLC entity to a MAC entity for wireless transmission.

In some examples of the apparatus, the RLC entity and the PDCP entity may be mapped together as a radio bearer.

In some examples, the RLC entity may be mapped together with the PDCP entity and other PDCP entities as a radio bearer. In some examples, the means for receiving, at the RLC entity, PDUs corresponding to an IP flow may include means for receiving concatenated PDUs from the PDCP entity.

In some examples, the apparatus may include means for concatenating PDUs belonging to the LCID at the MAC entity.

In some examples, the apparatus may include means for determining, at the MAC entity, a logical channel prioritization for a plurality of IP flows including the IP flow.

In some examples, the apparatus may include means for inserting, at the PDCP entity, an IP flow identifier in a header of each of the PDUs routed to the RLC entity.

In some examples, the apparatus may include means for concatenating PDUs corresponding to the IP flow at the PDCP entity.

Another apparatus for wireless communication is described. The apparatus may include a processor, and memory in electronic communication with the processor. The processor and memory may be configured to receive, at a RLC entity associated with a LCID, PDUs corresponding to an IP flow, with the PDUs being received from a PDCP entity dedicated to the IP flow, and forward the PDUs from the RLC entity to a MAC entity for wireless transmission.

In some examples of the apparatus, the RLC entity and the PDCP entity may be mapped together as a radio bearer.

In some examples, the RLC entity may be mapped together with the PDCP entity and other PDCP entities as a radio bearer.

In some examples, receiving, at the RLC entity, PDUs corresponding to an IP flow may include receiving concatenated PDUs from the PDCP entity.

In some examples, the processor and memory may be configured to concatenate PDUs belonging to the LCID at the MAC entity.

In some examples, the processor and memory may be configured to determine, at the MAC entity, a logical channel prioritization for a plurality of IP flows including the IP flow.

In some examples, the processor and memory may be configured to insert, at the PDCP entity, an IP flow identifier in a header of each of the PDUs routed to the RLC entity.

In some examples, the processor and memory may be configured to concatenate PDUs corresponding to the IP flow at the PDCP entity.

A non-transitory computer-readable medium storing computer-executable code for wireless communication is described. The code may include code to receive, at a RLC entity associated with a LCID, PDUs corresponding to an IP flow, with the PDUs being received from a PDCP entity dedicated to the IP flow, and forward the PDUs from the RLC entity to a MAC entity for wireless transmission.

In some examples of the non-transitory computer readable medium, the RLC entity and the PDCP entity may be mapped together as a radio bearer.

In some examples, the RLC entity may be mapped together with the PDCP entity and other PDCP entities as a radio bearer.

In some examples, the code to receive, at the RLC entity, PDUs corresponding to an IP flow may include code to receive concatenated PDUs from the PDCP entity.

In some examples, the code may include code to concatenate PDUs belonging to the LCID at the MAC entity. In some examples, the code may include code to determine, at the MAC entity, a logical channel prioritization for a plurality of IP flows including the IP flow.

In some examples, the code may include code to insert, at the PDCP entity, an IP flow identifier in a header of each of the PDUs routed to the RLC entity.

In some examples, the code may include code to concatenate PDUs corresponding to the IP flow at the PDCP entity.

A method of wireless communication by a transmitter may include establishing a connection with a receiver, receiving a packet from an upper layer, labeling the packet with a unique PDCP instance identifier (PII), and transmitting the packet.

An apparatus for wireless communication is described. The apparatus may include means for establishing a connection with a receiver, means for receiving a packet from an upper layer, means for labeling the packet with a unique PII, and means for transmitting the packet.

Another apparatus for wireless communication is described. The apparatus may include a processor, memory in electronic communication with the processor, and instructions stored in the memory. The instructions may be operable to establish a connection with a receiver, receive a packet from an upper layer, label the packet with a unique PII, and transmit the packet.

A non-transitory computer readable medium for wireless communication is described. The non-transitory computer-readable medium may include instructions operable to cause a processor to establish a connection with a receiver, receive a packet from an upper layer, label the packet with a unique PII, and transmit the packet.

In some examples of the method, apparatus, and non-transitory computer-readable medium described above, the transmitting the packet may include determining an RLC instance for communicating the packet based on the PII, and transmitting the packet to the receiver based on the determination.

In some examples of the method, apparatus, and non-transitory computer-readable medium described above, a second PII for the same RLC. In some examples, the second PII indicates where the PDCP terminates.

In some examples of the method, apparatus, and non-transitory computer-readable medium described above, a UE in dual connectivity comprising two or more links associated with the connection. In some examples, the second PII indicates a link where the PDCP terminates.

In some examples of the method, apparatus, and non-transitory computer-readable medium described above, the second PII indicates a radio resource control (RRC) instance associated with the PDCP.

In some examples of the method, apparatus, and non-transitory computer-readable medium described above, the transmitting the packet may include transmitting the packet to a second transmitter. Some examples of the method, apparatus, and non-transitory computer-readable medium described above may further include processes, features, means, or instructions for receiving, at the second transmitter, the packet from the transmitter, reading the PII from the packet, determining an RLC instance for communicating the packet based on the PII, and transmitting the packet to the receiver based on the determination.

In some examples of the method, apparatus, and non-transitory computer-readable medium described above, the PII includes an identifier of the transmitter where a PDCP terminates.

In some examples of the method, apparatus, and non-transitory computer-readable medium described above, the PII indicates an identifier of a PDCP instance.

In some examples of the method, apparatus, and non-transitory computer-readable medium described above, the PII includes information indicating a RRC connection.

In some examples of the method, apparatus, and non-transitory computer-readable medium described above, the PII includes information indicating a type of traffic.

In some examples of the method, apparatus, and non-transitory computer-readable medium described above, the PII includes information indicating a quality of service (QoS) flow.

In some examples of the method, apparatus, and non-transitory computer-readable medium described above, the PII includes information indicating a type of upper layer connection.

In some examples of the method, apparatus, and non-transitory computer-readable medium described above, the PII includes a special PII value used to indicate a default PDCP instance.

In some examples of the method, apparatus, and non-transitory computer-readable medium described above, the PII is included in at least one of a PDCP header, a RLC header, a MAC.

In some examples of the method, apparatus, and non-transitory computer-readable medium described above, the a labeling layer is above PDCP. In some examples of the method, apparatus, and non-transitory computer-readable medium described above, a labeling layer is between PDCP and RLC.

In some examples of the method, apparatus, and non-transitory computer-readable medium described above, the determination is based on a PII to RLC instance mapping.

In some examples of the method, apparatus, and non-transitory computer-readable medium described above, the determination is based on a PII to RLC instance mapping.

Some examples of the method, apparatus, and non-transitory computer-readable medium described above may further include processes, features, means, or instructions for configuring the PII using RRC signaling.

Some examples of the method, apparatus, and non-transitory computer-readable medium described above may further include processes, features, means, or instructions for configuring the PII to RLC instance mapping using RRC signaling. Some examples of the method, apparatus, and non-transitory computer-readable medium described above may further include processes, features, means, or instructions for configuring the PII to RLC instance mapping using RRC signaling.

In some examples of the method, apparatus, and non-transitory computer-readable medium described above, the labeling the packet is provided at least at one of above, within, or below a PDCP layer.

Some examples of the method, apparatus, and non-transitory computer-readable medium described above may further include processes, features, means, or instructions for multiplexing the packet to an RLC instance based on the PII and a PII to RLC instance mapping rule. In some examples of the method, apparatus, and non-transitory computer-readable medium described above, the multiplexing the packet may be provided at least at one of above, within, or below a PDCP layer and above an RLC layer.

In some examples of the method, apparatus, and non-transitory computer-readable medium described above, the transmitter is a transmit/receiver point (TRP).

A method of wireless communication by a receiver may include receiving a packet that includes a unique PII, reading the PII from the packet, determining which PDCP instance should process the packet based on the PII, and transmitting the packet to the PDCP instance.

An apparatus for wireless communication is described. The apparatus may include means for receiving a packet that includes a unique PII, means for reading the PII from the packet, means for determining which PDCP instance should process the packet based on the PII, and means for transmitting the packet to the PDCP instance.

Another apparatus for wireless communication is described. The apparatus may include a processor, memory in electronic communication with the processor, and instructions stored in the memory. The instructions may be operable to establish a connection with a receiver, receive a packet from an upper layer, label the packet with a unique PII, and transmit the packet.

A non-transitory computer readable medium for wireless communication is described. The non-transitory computer-readable medium may include instructions operable to cause a processor to establish a connection with a receiver, receive a packet from an upper layer, label the packet with a unique PII, and transmit the packet.

In some examples of the method, apparatus, and non-transitory computer-readable medium described above, the PDCP instance is on at least one of the receiver or another receiving device.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques are described for handling IP flows in an L2 architecture of a wireless device. In an L2 architecture used by LTE devices, packets are routed through a MAC layer, RLC layer, and PDCP layer based on logical channel identifiers (LCIDs). Packet re-ordering is performed at the PDCP layer.

In the L2 architecture used by LTE devices, each LCID may be associated with a plurality of IP flows. The IP flows may be associated with different parameters (e.g., priorities, application types, etc.). When a packet associated with an LCID is not received, a PDCP entity may not be able to re-order packets and may instead begin queuing received packets in a buffer until the missing packet is received or a timer expires. The queued packets may be associated with various different IP flows. Thus, even though the missing packet is only associated with a single IP flow, packets from multiple different IP flows may be delayed. A missing packet associated with one IP flow therefore delays packet re-ordering and delivery (to higher layers) for all IP flows associated with a LCID.

The present disclosure describes techniques that enable the layers of a device's L2 architecture to route packets associated with IP flows to higher layers, but for the packets associated with an IP flow for which a packet is missing.

Additionally, aspects of the present disclosure provide apparatus, methods, processing systems, and computer readable mediums for NR. NR may support various wireless communication services, such as Enhanced mobile broadband (eMBB) targeting wide bandwidth (e.g., 80 MHz beyond), millimeter wave (mmW) targeting high carrier frequency (e.g., 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective QoS requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples.

Figure 1:
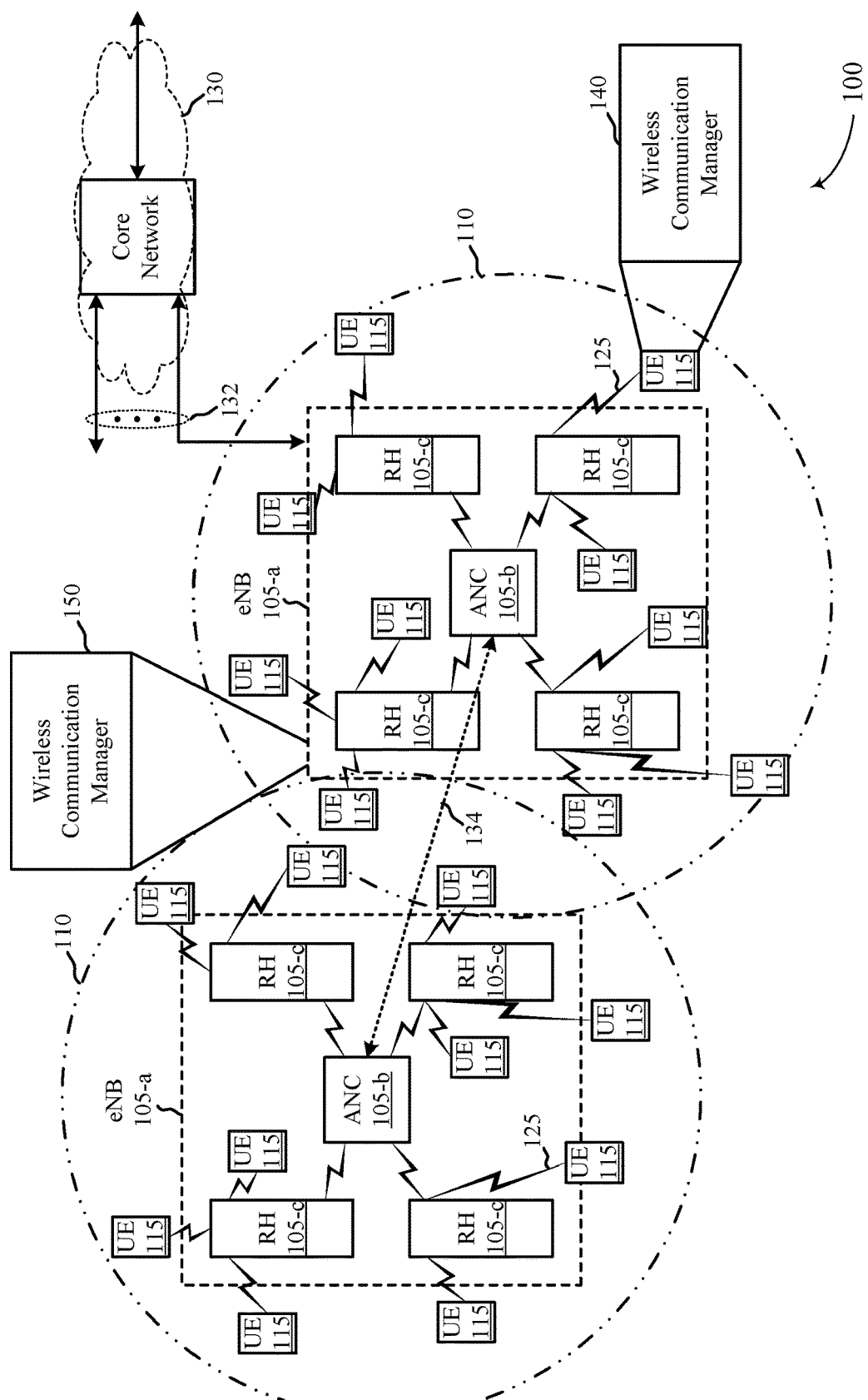
FIG. 1 shows an example of a wireless communication system, in accordance with one or more aspects of the present disclosure.

FIG. 1 shows an example of a wireless communication system 100, in accordance with one or more aspects of the present disclosure. The wireless communication system 100 may include network access devices 105 (e.g., eNBs 105-*a*, ANCs 105-*b*, and/or RHs 105-*c*), UEs 115, and a core network 130. The core network 130 may provide user authentication, access authorization, tracking, IP connectivity, and other access, routing, or mobility functions. At least some of the network access devices 105 (e.g., eNBs 105-*a* or ANCs 105-*b*) may interface with the core network 130 through backhaul links 132 (e.g., S1, S2, etc.) and may perform radio configuration and scheduling for communication with the UEs 115. In various examples, the ANCs 105-*b* may communicate, either directly or indirectly (e.g., through core network 130), with each other over backhaul links 134 (e.g., X1, X2, etc.), which may be wired or wireless communication links. Each ANC 105-*b* may also communicate with a number of UEs 115 through a number of smart radio heads (e.g., RHs 105-*c*). In an alternative configuration of the wireless communication system 100, the functionality of an ANC 105-*b* may be provided by a radio head 105-*c* or distributed across the radio heads 105-*c* of an eNB 105-*a*. In another alternative configuration of the wireless communication system 100 (e.g., an LTE/LTE-A configuration), the radio heads 105-c may be replaced with base stations, and the ANCs 105-b may be replaced by base station controllers (or links to the core network 130). In some examples, the wireless communication system 100 may include a mix of radio heads 105-c, base stations, and/or other network access devices 105 for receiving/transmitting communications according to different radio access technologies (RATs) (e.g., LTE/LTE-A, 5G, Wi-Fi, etc.).

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the eNBs 105-a and/or radio heads 105-c may have similar frame timing, and transmissions from different eNBs 105-a and/or radio heads 105-c may be approximately aligned in time. For asynchronous operation, the eNBs 105-a and/or radio heads 105-c may have different frame timings, and transmissions from different eNBs 105-a and/or radio heads 105-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or PDCP layer may be IP-based. A RLC layer may in some cases perform packet segmentation and reassembly to communicate over logical channels. A MAC layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a radio head 105-c, ANC 105-b, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of Everything (IoE) device, etc. A UE 115 may be able to communicate with various types of eNBs 105-a, radio heads 105-c, base stations, access points, or other network access devices, including macro eNBs, small cell eNBs, relay base stations, and the like. A UE 115 may also be able to communicate directly with other UEs 115 (e.g., using a peer-to-peer (P2P) protocol).

The communication links 125 shown in wireless communication system 100 may include uplinks (ULs) from a UE 115 to a radio head 105-c, and/or downlinks (DLs), from a radio head 105-c to a UE 115. The downlinks may also be called forward links, while the uplinks may also be called reverse links. Control information and data may be multiplexed on an uplink or downlink according to various techniques. Control information and data may be multiplexed on an uplink or downlink, for example, using TDM techniques, FDM techniques, or hybrid TDM-FDM techniques.

Each communication link 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) techniques (e.g., using paired spectrum resources) or Time Division Duplexing techniques (e.g., using unpaired spectrum resources). Frame structures for FDD (e.g., frame structure type 1) and TDD (e.g., frame structure type 2) may be defined.

In some examples of the wireless communication system 100, network access devices 105 (e.g., radio heads 105-c) and UEs 115 may include multiple antennas for employing antenna diversity schemes to improve communication quality and reliability between network access devices 105 and UEs 115. Additionally or alternatively, network access devices and UEs 115 may employ multiple-input, multiple-output (MIMO) techniques that may take advantage of multi-path environments to transmit multiple spatial layers carrying the same or different coded data. In some cases, signal processing techniques such as beamforming (i.e., directional transmission) may be used with MIMO techniques to coherently combine signal energies and overcome the path loss in specific beam directions. Precoding (e.g., weighting transmissions on different paths or layers, or from different antennas) may be used in conjunction with MIMO or beamforming techniques.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some examples, a UE 115 may include a wireless communication manager 140 or a network access device 105 may include a wireless communication manager 150. The wireless communication manager 140 or 150 may be used (in a receive path) to receive, at a MAC entity, PDUs corresponding to one or more IP flows. The wireless communication manager 140 or 150 may also be used to route the PDUs from the MAC entity to respective RLC entities based at least in part on a logical channel prioritization, and to forward the PDUs from respective RLC entities to a plurality of PDCP entities mapped to each RLC entity. Alternatively or additionally, the wireless communication manager 140 or 150 may be used (in a receive path) to receive, at a MAC entity, PDUs corresponding to one or more IP flows; to route the PDUs corresponding to the one or more IP flows from the MAC entity to respective RLC entities based at least in part on a logical channel prioritization; and to forward the PDUs from respective RLC entities to corresponding respective PDCP entities, in which at least one of the respective RLC entities and corresponding respective PDCP entities are dedicated to a single IP flow. Alternatively or additionally, the wireless communication manager 140 or 150 may be used (in a receive path) to receive, at a MAC entity, PDUs corresponding to one or more IP flows; to route the PDUs corresponding to the one or more IP flows from the MAC entity to respective RLC entities based at least in part on a logical channel prioritization; and to forward the PDUs from respective RLC entities to a plurality of PDCP entities, in which at least one of the PDCP entities is dedicated to a single IP flow. Alternatively or additionally, the wireless communication manager 140 or 150 may be used (in a transmit path) to receive, at a RLC entity associated with a LCID, PDUs corresponding to an IP flow, in which the PDUs are received from a PDCP entity dedicated to the IP flow. The wireless communication manager 140 or 150 may also be used (in the transmit path) to forward the PDUs from the RLC entity to a MAC entity for wireless transmission.

Figure 2:
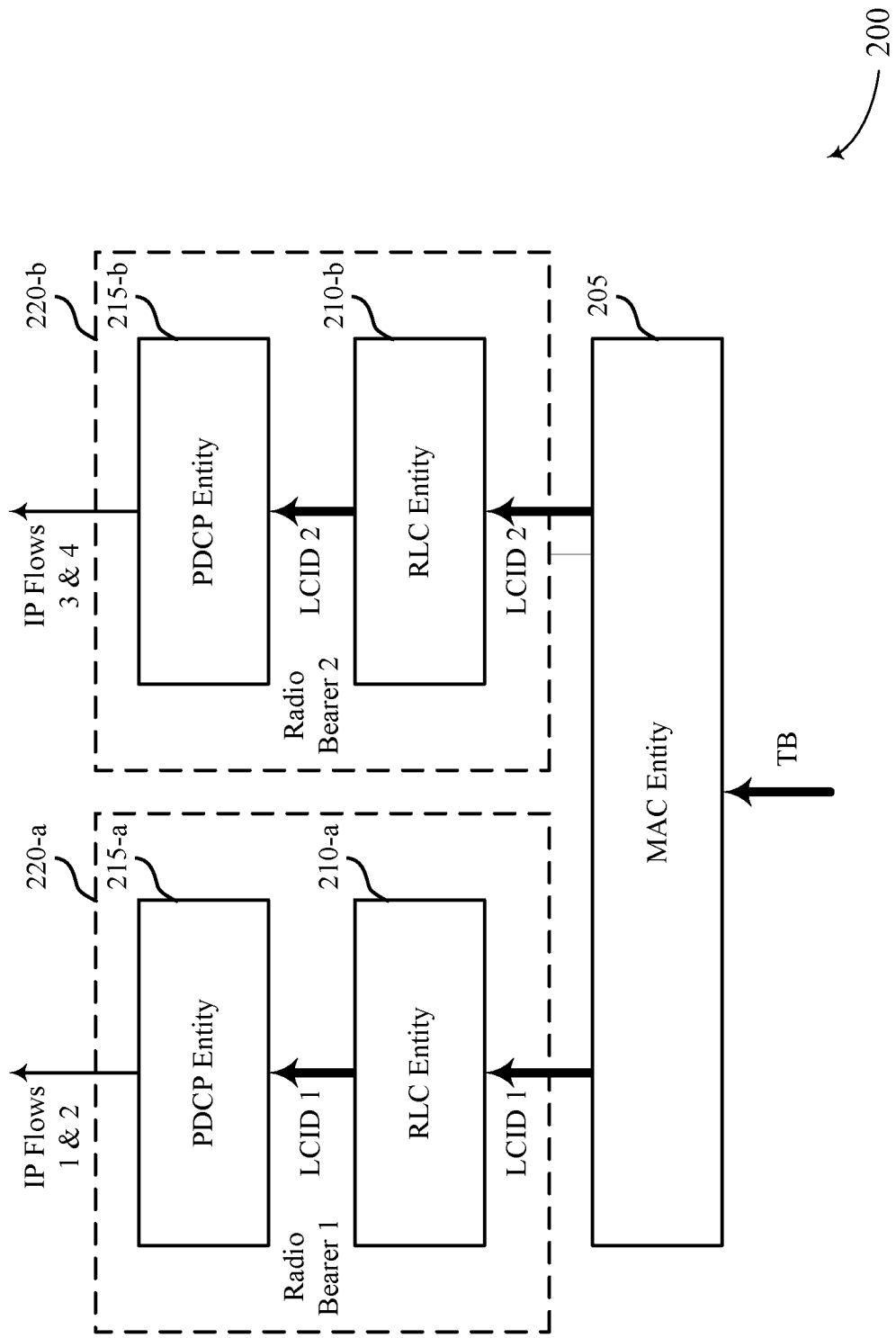
FIG. 2 shows data processing through an L2 architecture of a receiving device, in accordance with one or more aspects of the present disclosure.

FIG. 2 shows data processing through an L2 architecture 200 of a receiving device, in accordance with one or more aspects of the present disclosure. The L2 architecture 200 may include a MAC layer (e.g., a MAC entity 205), a RLC layer (e.g., a plurality of RLC entities 210, such as a first RLC entity 210-a and a second RLC entity 210-b), and a PDCP layer (e.g., a plurality of PDCP entities 215, such as a first PDCP entity 215-a and a second PDCP entity 215-b). A corresponding RLC entity 210 and PDCP entity 215 may be associated with a single radio bearer 220 and LCID (e.g., the first RLC entity 210-a and first PDCP entity 215-a may be associated with a first radio bearer (i.e., Radio Bearer 1 220-a) and LCID 1, and the second RLC entity 210-b and second PDCP entity 215-b may be associated with a second radio bearer (i.e., Radio Bearer 2 220-b) and LCID 2). The receiving device may be an example of aspects of one of the network access devices 105 or UEs 115 described with reference to FIG. 1.

As shown in FIG. 2, the MAC entity 205 may receive transport blocks (TBs) (e.g., data, or MAC PDUs). The TBs may be received, for example, from a lower layer (e.g., from a L1, PHY layer, or PHY entity that receives the TBs over a wireless interface). The MAC entity 205 may perform logical channel de-multiplexing for all logical channel identifiers (LCIDs). Assuming the existence of two logical channels, identified by LCID 1 and LCID 2, the MAC entity 205 may route traffic (e.g., MAC service data units (SDUs)) for LCID 1 to the first RLC entity 210-a, and route traffic for LCID 2 to the second RLC entity 210-b.

Each RLC entity 210 may request retransmission of missing packets for a respective LCID (i.e., within an LCID level). Each RLC entity 210 may route traffic (e.g., RLC SDUs) associated with a LCID to a respective PDCP entity. For example, the first RLC entity 210-a may route traffic associated with LCID 1 to the first PDCP entity 215-a, and the second RLC entity 210-b may route traffic associated with LCID 2 to the second PDCP entity 215-b.

Each PDCP entity 215 may re-order packets (e.g., PDCP PDUs) for a respective LCD (i.e., within an LCID level) and pass the packets (e.g., PDCP SDUs) to an upper layer (e.g., a Layer 3 (L3) or IP layer). For example, the first PDCP entity 215-a may re-order packets associated with LCID 1, and the second PDCP entity 215-b may re-order packets associated with LCID 2. In some cases, the traffic (e.g., packets) associated with a single LCID or radio bearer may include traffic for a plurality of IP flows (e.g., a plurality of IP flows having a same priority). However, the traffic associated with a single LCID may be re-ordered as a whole (e.g., without differentiating between IP flows). Thus, a missing packet (e.g., a missing PDCP PDU) associated with one IP flow may cause all later-numbered packets to be queued until the missing packet arrives, and thereby delay the re-ordering of packets for all IP flows associated with a same LCID. For example, the traffic associated with LCID 1 may include traffic for IP Flow 1 and IP Flow 2. If the first PDCP entity 215-a determines that a packet associated with LCID 1 is missing, and if the missing packet is associated with IP Flow 1, the PDCP entity 215-a may buffer all later-numbered packets associated with LCID 1, regardless of whether the later-numbered packets are associated with IP Flow 1 or IP Flow 2. The re-ordering and output of traffic associated with IP Flow 2 is thus dependent on (and is delayed because of) a missing packet associated with IP Flow 1 (and vice versa).

Figure 3:
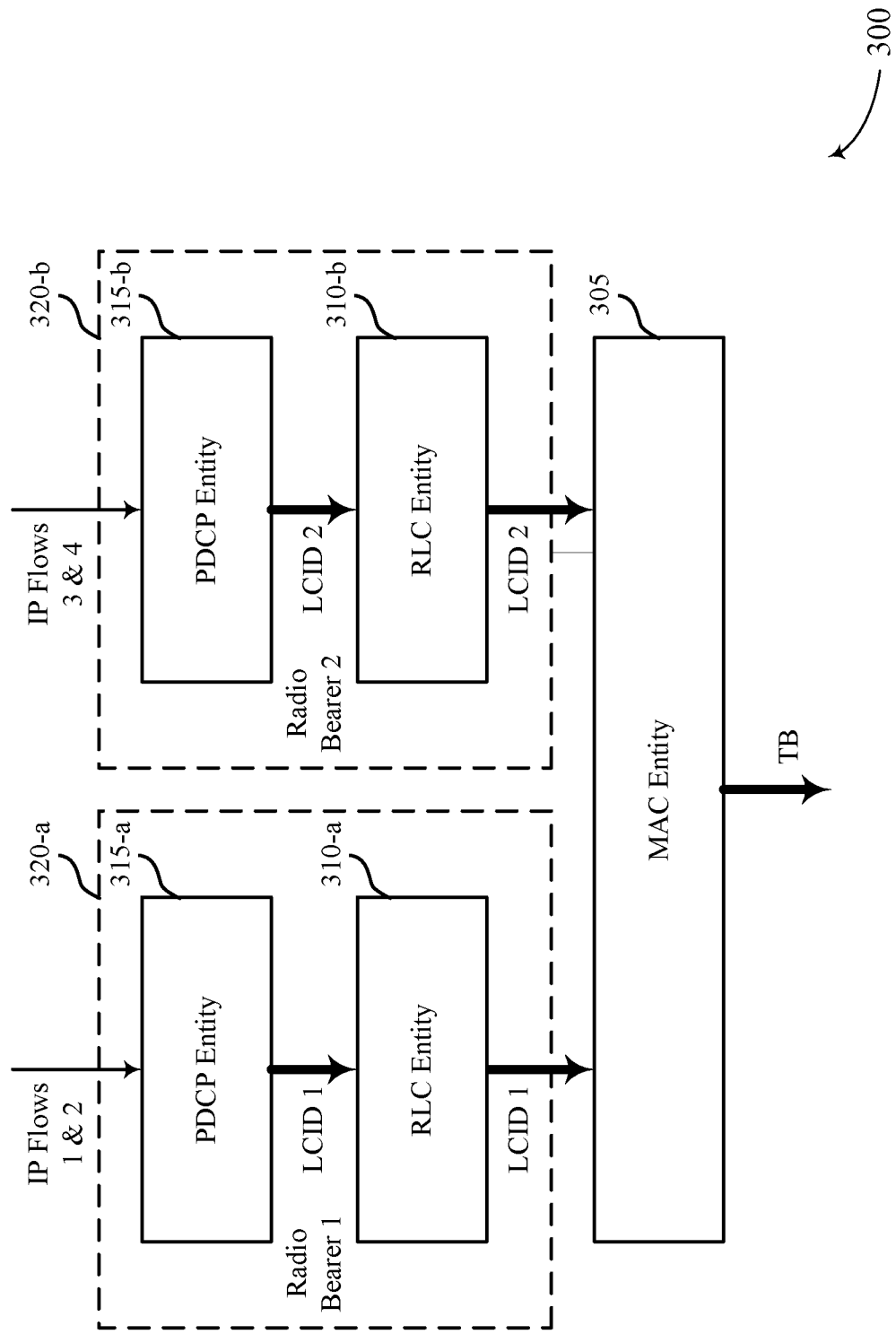
FIG. 3 shows data processing through an L2 architecture of a transmitting device, in accordance with one or more aspects of the present disclosure.

FIG. 3 shows data processing through an L2 architecture 300 of a transmitting device, in accordance with one or more aspects of the present disclosure. By way of example, the L2 architecture 300 shown in FIG. 3 has the same organization as the L2 architecture 200 shown in FIG. 2 (and in some cases may be the same L2 architecture). The L2 architecture 300 may include a MAC layer (e.g., a MAC entity 305), a RLC layer (e.g., a plurality of RLC entities 310, such as a first RLC entity 310-a and a second RLC entity 310-b), and a PDCP layer (e.g., a plurality of PDCP entities 315, such as a first PDCP entity 315-a and a second PDCP entity 315-b). A corresponding RLC entity 310 and PDCP entity 315 may be associated with a single radio bearer 320 and LCID (e.g., the first RLC entity 310-a and first PDCP entity 315-a may be associated with a first radio bearer (i.e., Radio Bearer 1 320-a) and LCID 1, and the second RLC entity 310-b and second PDCP entity 315-b may be associated with a second radio bearer (i.e., Radio Bearer 2 320-b) and LCID 2). The transmitting device may be an example of aspects of one of the network access devices 105 or UEs 115 described with reference to FIG. 1.

As shown in FIG. 3, each PDCP entity 315 may receive packets (e.g., PDCP SDUs) from a number of IP flows (which IP flows are associated with a same LCID), assemble the packets into groups of one or more packets (e.g., PDCP PDUs), and pass the groups of packets to a corresponding RLC entity 310 (e.g., the first PDCP entity 315-a may pass groups of packets to the first RLC entity 310-a, and the second PDCP entity 315-b may pass groups of packets to the second RLC entity 310-b). Each RLC entity 310 may assemble the groups of one or more packets (e.g., RLC SDUs) received from a PDCP entity 315 into further groups of one or more packets (e.g., RLC PDUs), and may pass the groups of packets to the MAC entity 305. The MAC entity 305 may perform logical channel prioritization, and may assemble the groups of one or more packets (e.g., MAC SDUs) received from the RLC entities 310 into MAC PDUs (i.e., TBs) that are passed to a lower layer (e.g., a L1, PHY layer, or PHY entity) for transmission over a wireless interface.

The PDCP entities 315 may buffer transmitted packets until a receiving device acknowledges receipt of the packets. When the packets associated with a LCID include packets associated with different IP flows (e.g., IP Flow 1 and IP Flow 2), the receiving device's failure to receive (or to acknowledge receipt of) a packet associated with one IP flow may cause the PDCP entity 315 to continue buffering packets associated with multiple IP flows, thereby consuming additional resources.

Figure 4:
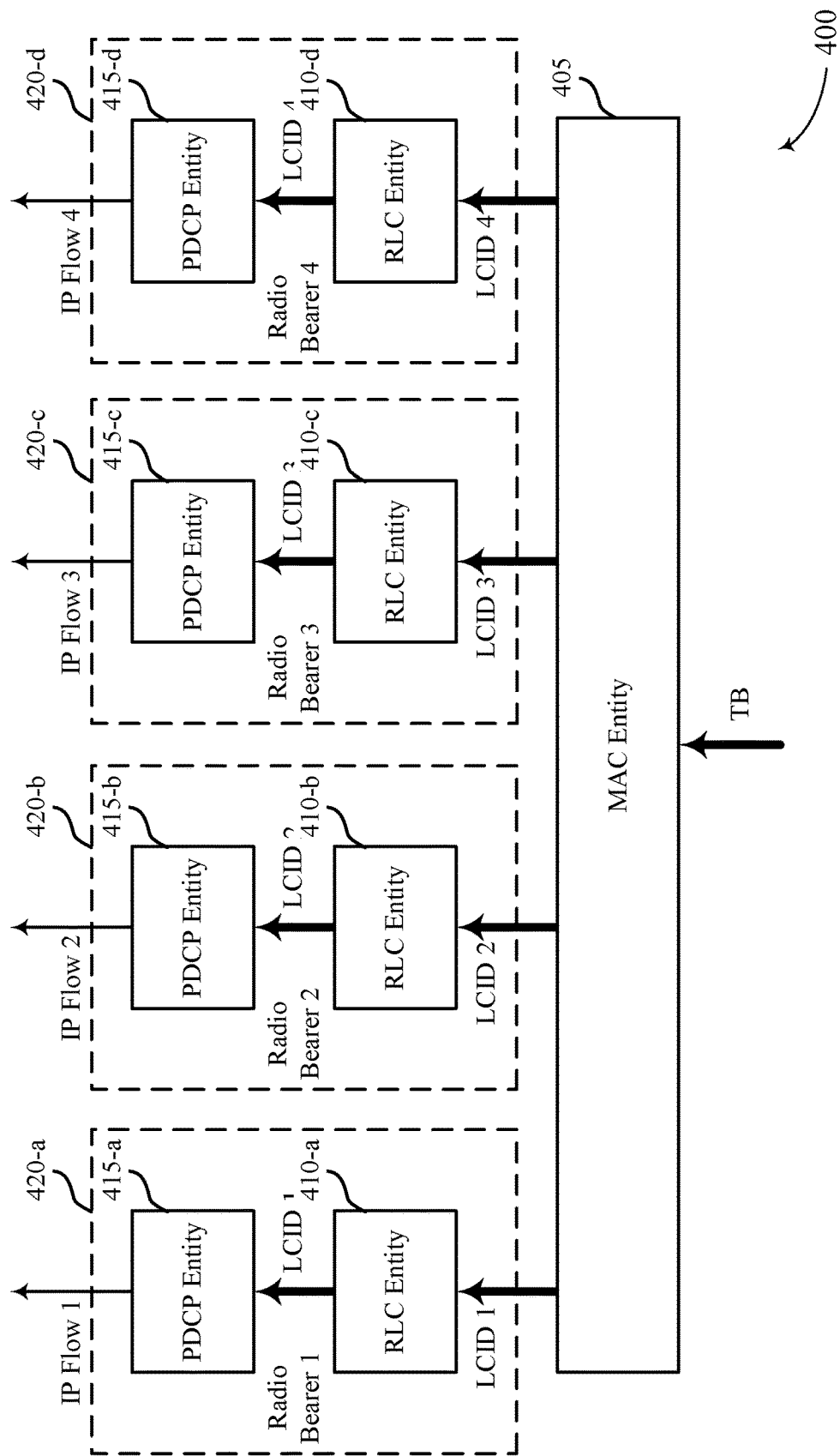
FIG. 4 shows data processing through an L2 architecture of a receiving device, in accordance with one or more aspects of the present disclosure.

FIG. 4 shows data processing through an L2 architecture 400 of a receiving device, in accordance with one or more aspects of the present disclosure. The L2 architecture 400 may include a MAC layer (e.g., a MAC entity 405), a RLC layer (e.g., a plurality of RLC entities 410, such as a first RLC entity 410-a, a second RLC entity 410-b, a third RLC entity 410-c, and a fourth RLC entity 410-d), and a PDCP layer (e.g., a plurality of PDCP entities 415, such as a first PDCP entity 415-a, a second PDCP entity 415-b, a third PDCP entity 415-c, and a fourth PDCP entity 415-d). A corresponding RLC entity 410 and PDCP entity 415 may be associated with a single radio bearer 420 and LCID (e.g., the first RLC entity 410-a and first PDCP entity 415-a may be associated with a first radio bearer (i.e., Radio Bearer 1 420-a) and LCID 1, the second RLC entity 410-b and second PDCP entity 415-b may be associated with a second radio bearer (i.e., Radio Bearer 2 420-b) and LCID 2, the third RLC entity 410-c and third PDCP entity 415-c may be associated with a third radio bearer (i.e., Radio Bearer 3 420-c) and LCID 3, and the fourth RLC entity 410-d and fourth PDCP entity 415-d may be associated with a fourth radio bearer (i.e., Radio Bearer 4 420-d) and LCID 4). The receiving device may be an example of aspects of one of the network access devices 105 or UEs 115 described with reference to FIG. 1.

As shown in FIG. 4, the MAC entity 405 may receive TBs (e.g., data, or MAC PDUs). The TBs may be received, for example, from a lower layer (e.g., from a L1, PHY layer, or PHY entity that receives the TBs over a wireless interface). The MAC entity 405 may perform logical channel de-multiplexing for all LCIDs. Assuming the existence of four logical channels, identified by LCID 1, LCID 2, LCID 3, and LCID 4, the MAC entity 405 may route traffic (e.g., MAC SDUs) for LCID 1 to the first RLC entity 410-a, traffic for LCID 2 to the second RLC entity 410-b, traffic for LCID 3 to the third RLC entity 410-c, and traffic for LCID 4 to the fourth RLC entity 410-d.

Each RLC entity 410 may request retransmission of missing packets for a respective LCID (i.e., within an LCID level). Each RLC entity 410 may route traffic (e.g., RLC SDUs) associated with a LCID to a respective PDCP entity. For example, the first RLC entity 410-a may route traffic associated with LCID 1 to the first PDCP entity 415-a; the second RLC entity 410-b may route traffic associated with LCID 2 to the second PDCP entity 415-b; the third RLC entity 410-c may route traffic associated with LCID 3 to the third PDCP entity 415-c; and the fourth RLC entity 410-d may route traffic associated with LCID 4 to the fourth PDCP entity 415-d.

Each PDCP entity 415 may re-order packets (e.g., PDCP PDUs) for a respective LCID (i.e., within an LCID level) and pass the packets (e.g., PDCP SDUs) to an upper layer (e.g., a L3 or IP layer). For example, the first PDCP entity 415-a may re-order packets associated with LCID 1, the second PDCP entity 415-b may re-order packets associated with LCID 2, the third PDCP entity 415-c may re-order packets associated with LCID 3, and the fourth PDCP entity 415-d may re-order packets associated with LCID 4. In contrast to the L2 architecture 200 shown in FIG. 2, the traffic (e.g., packets) associated with a single LCID or radio bearer in the L2 architecture 400 may include traffic for a single IP flow. Thus, a missing packet (e.g., a missing PDCP PDU) associated with an IP flow only affects the re-ordering and higher layer processing of packets for one IP flow, and does not delay the re-ordering or higher layer processing of packets for other IP flows. Also, retransmission of missing packets may be requested per IP flow (i.e., within an LCID level).

Figure 5:
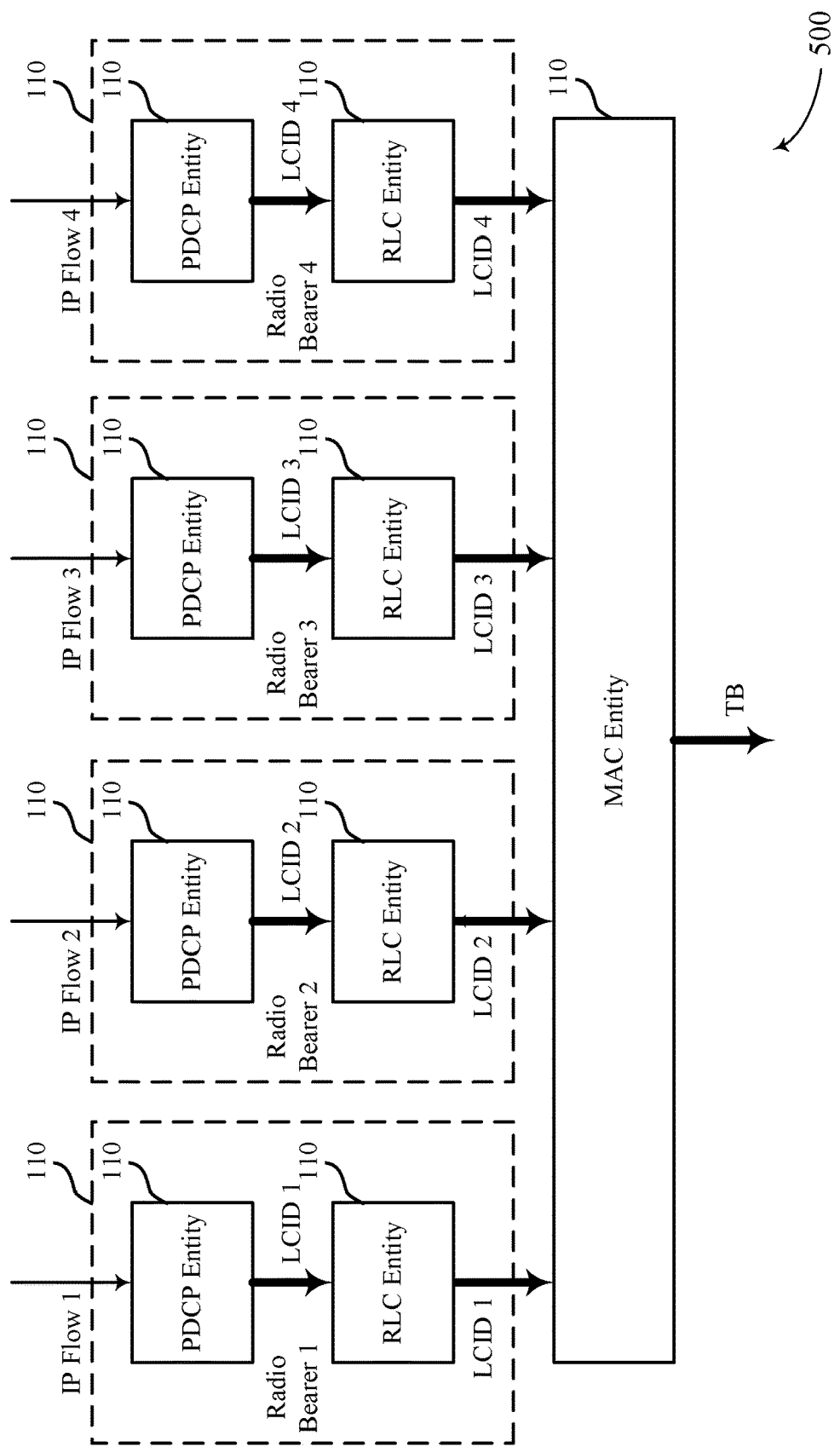
FIG. 5 shows data processing through an L2 architecture of a transmitting device, in accordance with one or more aspects of the present disclosure.

FIG. 5 shows data processing through an L2 architecture 500 of a transmitting device, in accordance with one or more aspects of the present disclosure. By way of example, the L2 architecture 500 shown in FIG. 5 has the same organization as the L2 architecture 400 shown in FIG. 4 (and in some cases may be the same L2 architecture). The L2 architecture 500 may include a MAC layer (e.g., a MAC entity 505), a RLC layer (e.g., a plurality of RLC entities 510, such as a first RLC entity 510-a, a second RLC entity 510-b, a third RLC entity 510-c, and a fourth RLC entity 510-d), and a PDCP layer (e.g., a plurality of PDCP entities 515, such as a first PDCP entity 515-a, a second PDCP entity 515-b, a third PDCP entity 515-c, and a fourth PDCP entity 515-d). A corresponding RLC entity 510 and PDCP entity 515 may be associated with a single radio bearer 520 and LCID (e.g., the first RLC entity 510-a and first PDCP entity 515-a may be associated with a first radio bearer (i.e., Radio Bearer 1 520-a) and LCID 1, the second RLC entity 510-b and second PDCP entity 515-b may be associated with a second radio bearer (i.e., Radio Bearer 2 520-b) and LCID 2, the third RLC entity 510-c and third PDCP entity 515-c may be associated with a third radio bearer (i.e., Radio Bearer 3 520-c) and LCID 3, and the fourth RLC entity 510-d and fourth PDCP entity 515-d may be associated with a fourth radio bearer (i.e., Radio Bearer 4 520-d) and LCID 4). The transmitting device may be an example of aspects of one of the network access devices 105 or UEs 115 described with reference to FIG. 1.

As shown in FIG. 5, each PDCP entity 515 may receive packets (e.g., PDCP SDUs) from a different IP flow, assemble the packets into groups of one or more packets (e.g., PDCP PDUs), and pass the groups of packets to a corresponding RLC entity 510 (e.g., the first PDCP entity 515-a may pass groups of packets to the first RLC entity 510-a, the second PDCP entity 515-b may pass groups of packets to the second RLC entity 510-b, the third PDCP entity 515-c may pass groups of packets to the third RLC entity 510-c, and the fourth PDCP entity 515-d may pass groups of packets to the fourth RLC entity 510-d). Each RLC entity 510 may assemble the groups of one or more packets (e.g., RLC SDUs) received from a PDCP entity 515 into further groups of one or more packets (e.g., RLC PDUs), and may pass the groups of packets to the MAC entity 505. The MAC entity 505 may perform logical channel prioritization, and may assemble the groups of one or more packets (e.g., MAC SDUs) received from the RLC entities 510 into MAC PDUs (i.e., TBs) that are passed to a lower layer (e.g., a L1, PHY layer, or PHY entity) for transmission over a wireless interface.

Similarly to the PDCP entities 315 described with reference to FIG. 3, the PDCP entities 515 may buffer transmitted packets until a receiving device acknowledges receipt of the packets. However, because each PDCP entity 515 is associated with a different IP flow, a delay in receiving an acknowledgement of a packet associated with one IP flow may not impede the clearing of packets buffered (and acknowledged) for another IP flow.

The MAC entity 405 or 505 may be configured similarly to the MAC entity 205 or 305 described with reference to FIG. 2 or 3, but may perform LCP for a greater number of RLC entities 410 or 510. In some examples, the MAC entity 405 or 505 may perform LCP for logical channel groups (LCGs; i.e., at the LCG level) instead of for LCIDs. In some examples, MAC concatenation may be employed (i.e., multiple RLC PDUs belonging to the same LCID may be concatenated into a single packet by the MAC entity 405 or 505, so that one LCID value per logical channel (LC) is included in a TB).

In a first variation of the L2 architecture 400 or 500, a second RLC entity may be mapped to the PDCP entities 415 or 515 of each radio bearer 420 or 520, with the first RLC entity being used in a receive path (as shown in FIG. 4) and the second RLC entity being used in a transmit path (as shown in FIG. 5).

In some examples of the L2 architecture 400 or 500, the RLC entity 410 or 510 and PDCP entity 415 or 515 associated with a radio bearer 420 or 520 or LCID may share the same packet sequence numbers (SNs).

In some examples of the L2 architecture 400 or 500, packets corresponding to a set of correlated IP flows may be routed to and processed by a same PDCP entity 415 or 515. Correlated IP flows are IP flows that share a priority, application type, or other parameter. In some examples, the rules that define correlated IP flows may be dynamically changed (i.e., IP flows may be dynamically mapped to radio bearers 420 or 520 or LCIDs.

In some examples of the L2 architecture 400 or 500, PDCP concatenation may be employed (i.e., multiple IP packets belonging to the same IP flow may be concatenated into a single packet by a PDCP entity 415 or 515, to reduce overhead).

Figure 6:
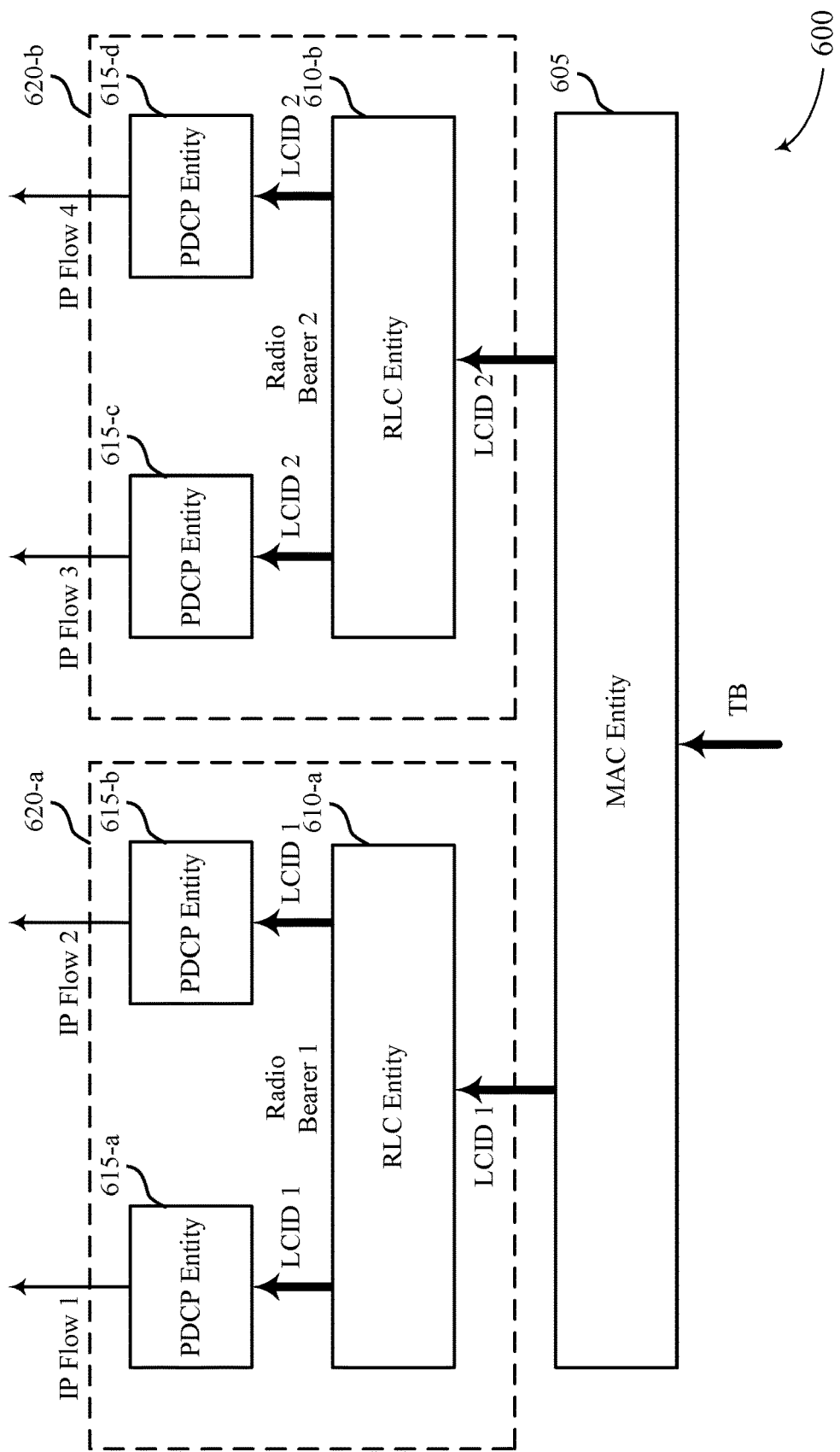
FIG. 6 shows data processing through an L2 architecture of a receiving device, in accordance with one or more aspects of the present disclosure.

FIG. 6 shows data processing through an L2 architecture 600 of a receiving device, in accordance with one or more aspects of the present disclosure. The L2 architecture 600 may include a MAC layer (e.g., a MAC entity 605), a RLC layer (e.g., a plurality of RLC entities 610, such as a first RLC entity 610-a and a second RLC entity 610-b), and a PDCP layer (e.g., a plurality of PDCP entities 615, such as a first PDCP entity 615-a, a second PDCP entity 615-b, a third PDCP entity 615-c, and a fourth PDCP entity 615-d). A RLC entity 610 and corresponding PDCP entities 615 may be associated with a single radio bearer 620 and LCID (e.g., the first RLC entity 610-a, first PDCP entity 615-a, and second PDCP entity 615-b may be associated with a first radio bearer (i.e., Radio Bearer 1 620-a) and LCID 1, and the second RLC entity 610-b, third PDCP entity 615-c, and fourth PDCP entity 615-d may be associated with a second radio bearer (i.e., Radio Bearer 2 620-b) and LCID 2. The receiving device may be an example of aspects of one of the network access devices 105 or UEs 115 described with reference to FIG. 1.

As shown in FIG. 6, the MAC entity 605 may receive TBs (e.g., data, or MAC PDUs). The TBs may be received, for example, from a lower layer (e.g., from a L1, PHY layer, or PHY entity that receives the TBs over a wireless interface). The MAC entity 605 may perform logical channel de-multiplexing for all LCIDs. Assuming the existence of two logical channels, identified by LCID 1 and LCID 2, the MAC entity 605 may route traffic (e.g., MAC SDUs) for LCID 1 to the first RLC entity 610-a and route traffic for LCID 2 to the second RLC entity 610-b. In FIG. 6, the traffic associated with each LCID may include packets associated with multiple IP flows.

Each RLC entity 610 may request retransmission of missing packets for a respective LCID (i.e., within an LCID level). Each RLC entity 610 may route traffic (e.g., RLC SDUs) to a PDCP entity 615 based on the traffic's association with an IP flow. In some examples, information associating packets with IP flows (e.g., IP flow identifiers (i.e., PDCP entity indices)) may be encapsulated in PDCP PDUs at the PDCP layer (e.g., in PDCP headers), and a RLC entity 710 may decode this information for packet routing purposes. For example, the first RLC entity 610-a may route traffic associated with IP Flow 1 to the first PDCP entity 615-a, and route traffic associated with IP Flow 2 to the second PDCP entity 615-b. Similarly, the second RLC entity 610-b may route traffic associated with IP Flow 3 to the third PDCP entity 615-c, and route traffic associated with IP Flow 4 to the fourth PDCP entity 615-d. Such routing is in contrast to the routing performed by RLC entities 210 in the L2 architecture 200 described with reference to FIG. 2, which routes traffic to a PDCP entity 215 based on the traffic's association with a LCID.

Each PDCP entity 615 may re-order packets (e.g., PDCP PDUs) for a respective IP flow and pass the packets (e.g., PDCP SDUs) to an upper layer (e.g., a L3 or IP layer). For example, the first PDCP entity 615-a may re-order packets associated with IP Flow 1, the second PDCP entity 615-b may re-order packets associated with IP Flow 2, the third PDCP entity 615-c may re-order packets associated with IP Flow 3, and the fourth PDCP entity 615-d may re-order packets associated with IP Flow 4. In contrast to the L2 architecture 200 or 400 shown in FIG. 2 or 4, the RLC entities 610 have a one-to-multiple relationship with the PDCP entities 615, and the PDCP entities 615 have a one-to-one relationship with IP flows. Thus, a missing packet (e.g., a missing PDCP PDU) associated with an IP flow only affects the re-ordering and higher layer processing of packets for one IP flow, and does not delay the re-ordering or higher layer processing of packets for other IP flows. However, retransmission of missing packets may be requested per LCID, as in the L2 architecture 200 described with reference to FIG. 2.

Figure 7:
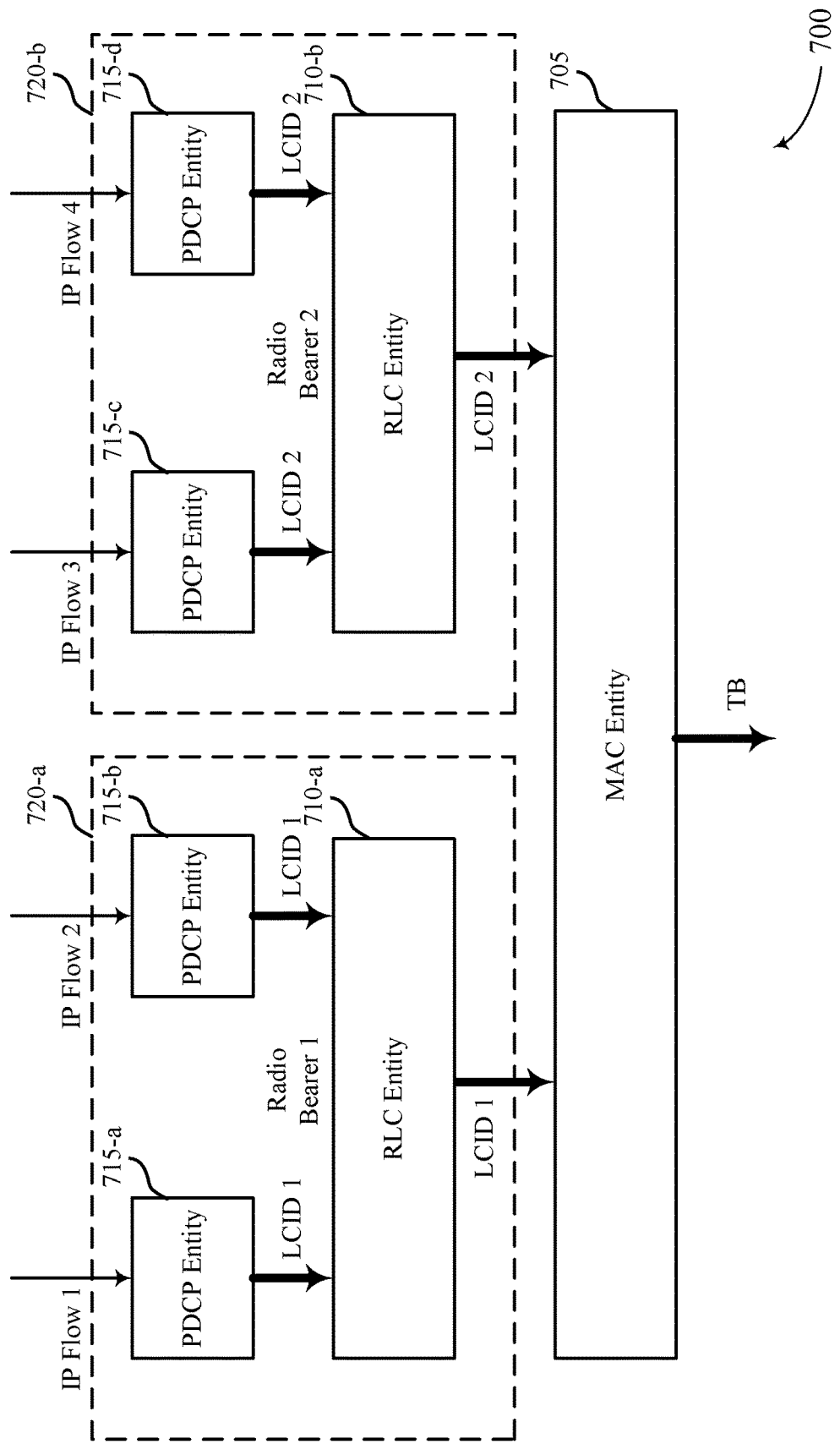
FIG. 7 shows data processing through an L2 architecture of a transmitting device, in accordance with one or more aspects of the present disclosure.

FIG. 7 shows data processing through an L2 architecture 700 of a transmitting device, in accordance with one or more aspects of the present disclosure. By way of example, the L2 architecture 700 shown in FIG. 7 has the same organization as the L2 architecture 600 shown in FIG. 6 (and in some cases may be the same L2 architecture). The L2 architecture 700 may include a MAC layer (e.g., a MAC entity 705), a RLC layer (e.g., a plurality of RLC entities 710, such as a first RLC entity 710-a and a second RLC entity 710-b), and a PDCP layer (e.g., a plurality of PDCP entities 715, such as a first PDCP entity 715-a, a second PDCP entity 715-b, a third PDCP entity 715-c, and a fourth PDCP entity 715-d). A RLC entity 710 and corresponding PDCP entities 715 may be associated with a single radio bearer 720 and LCID (e.g., the first RLC entity 710-a, first PDCP entity 715-a, and second PDCP entity 715-b may be associated with a first radio bearer (i.e., Radio Bearer 1 720-a) and LCID 1, and the second RLC entity 710-b, third PDCP entity 715-c, and fourth PDCP entity 715-d may be associated with a second radio bearer (i.e., Radio Bearer 2 720-b) and LCID 2. The transmitting device may be an example of aspects of one of the network access devices 105 or UEs 115 described with reference to FIG. 1.

As shown in FIG. 7, each PDCP entity 715 may receive packets (e.g., PDCP SDUs) from a different IP flow, assemble the packets into groups of one or more packets (e.g., PDCP PDUs), and pass the groups of packets to a corresponding RLC entity 710 (e.g., the first PDCP entity 715-a may pass groups of packets to the first RLC entity 710-a, the second PDCP entity 715-b may pass groups of packets to the first RLC entity 710-a, the third PDCP entity 715-c may pass groups of packets to the second RLC entity 710-b, and the fourth PDCP entity 715-d may pass groups of packets to the second RLC entity 710-d). In some examples, information associating packets with IP flows (e.g., IP flow identifiers (i.e., PDCP entity indices)) may be encapsulated in PDCP PDUs at the PDCP layer (e.g., in PDCP headers). Each RLC entity 710 may assemble the groups of one or more packets (e.g., RLC SDUs) received from multiple PDCP entities 715 into further groups of one or more packets (e.g., RLC PDUs), and may pass the groups of packets to the MAC entity 705. The MAC entity 705 may perform logical channel prioritization, and may assemble the groups of one or more packets (e.g., MAC SDUs) received from the RLC entities 710 into MAC PDUs (i.e., TBs) that are passed to a lower layer (e.g., a L1, PHY layer, or PHY entity) for transmission over a wireless interface.

Similarly to the PDCP entities 315 described with reference to FIG. 3, the PDCP entities 715 may buffer transmitted packets until a receiving device acknowledges receipt of the packets. However, because each PDCP entity 715 is associated with a different IP flow, a delay in receiving an acknowledgement of a packet associated with one IP flow may not impede the clearing of packets buffered (and acknowledged) for another IP flow.

The MAC entity 605 or 705 may be configured similarly to the MAC entity 205, 305, 405, or 505 described with reference to FIGS. 2-5. In some examples, the MAC entity 605 or 705 may perform LCP for LCGs (i.e., at the LCG level) instead of for LCIDs. In some examples, MAC concatenation may be employed (i.e., multiple RLC PDUs belonging to the same LCID may be concatenated into a single packet by the MAC entity 605 or 705, so that one LCID value per LC is included in a TB).

In a first variation of the L2 architecture 600 or 700, a second RLC entity may be mapped to the PDCP entities 615 or 715 of each radio bearer 620 or 720, with the first RLC entity being used in a receive path (as shown in FIG. 6) and the second RLC entity being used in a transmit path (as shown in FIG. 7).

In some examples of the L2 architecture 600 or 700, the RLC entity 610 or 710 and PDCP entities 615 or 715 associated with a radio bearer 620 or 720 or LCID may share the same packet SNs.

In some examples of the L2 architecture 600 or 700, packets corresponding to a set of correlated IP flows may be routed to and processed by a same PDCP entity 615 or 715. In some examples, the rules that define correlated IP flows may be dynamically changed (i.e., IP flows may be dynamically mapped to radio bearers 620 or 720 or LCIDs.

In some examples of the L2 architecture 600 or 700, header compression may be employed by a RLC entity 710 across multiple PDCP entities 715. Also or alternatively, PDCP concatenation may be employed (i.e., multiple IP packets belonging to the same IP flow may be concatenated into a single packet by a PDCP entity 615 or 715, to reduce overhead).

In some examples of the L2 architecture 600 or 700, RLC concatenation may be employed (i.e., multiple PDCP PDUs belonging to the same IP flow may be concatenated into a single packet for the RLC entity 610 or 710, so that one IP flow identifier (i.e., PDCP entity index) per PDCP entity 615 or 715 is included in a TB.

Figure 8:
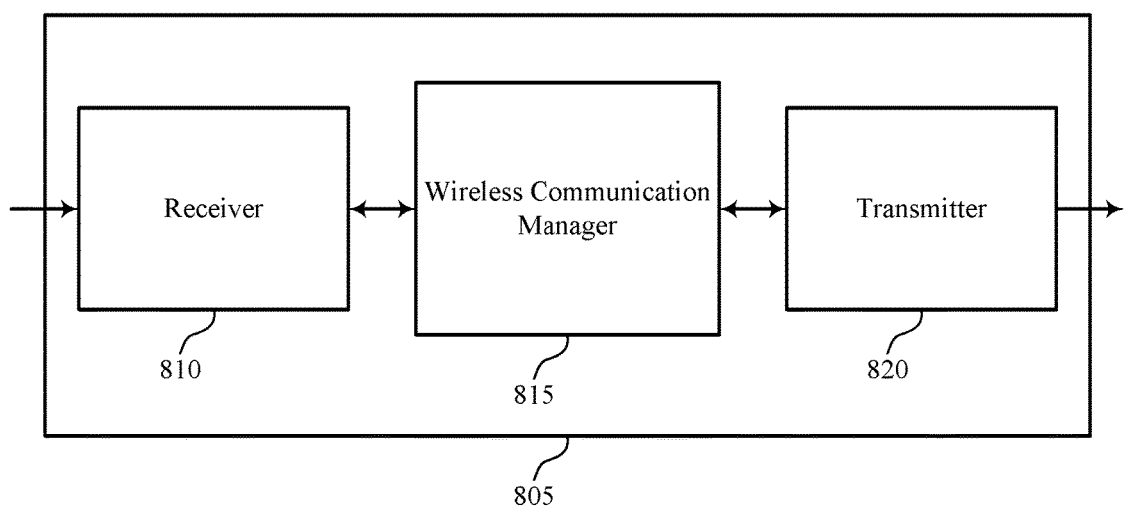
FIGS. 8-9 show block diagrams of apparatuses for use in wireless communication, in accordance with one or more aspects of the present disclosure.

FIG. 8 shows a block diagram 800 of an apparatus 805 for use in wireless communication, in accordance with one or more aspects of the present disclosure. The apparatus 805 may be an example of aspects of a UE or network access device described with reference to FIG. 1. The apparatus 805 may include a receiver 810, a wireless communication manager 815, and a transmitter 820. The apparatus 805 may also include a processor. Each of these components may be in communication with one another (e.g., via one or more buses).

The receiver 810 may receive information such as packets, user data, or control information associated with various information channels (e.g., control channels, data channels, and information related to uplink transmission parameter selection for random access initial message, etc.). Information may be passed on to other components of the apparatus 805. The receiver 810 may be an example of aspects of the transceiver 1230 or 1350 described with reference to FIG. 12 or 13. The receiver 810 may include a single antenna or a set of antennas.

The wireless communication manager 815 and/or at least some of its various sub-components may be implemented in hardware, software executed by a processor, firmware, or any combination thereof. If implemented in software executed by a processor, the functions of the wireless communication manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The wireless communication manager 815 and/or at least some of its various sub-components may be physically located at various positions, including being distributed such that portions of functions are implemented at different physical locations by one or more physical devices. In some examples, the wireless communication manager 815 and/or at least some of its various sub-components may be a separate and distinct component in accordance with various aspects of the present disclosure. In other examples, the wireless communication manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. The wireless communication manager 815 may be an example of aspects of the wireless communication managers described with reference to FIG. 1.

In some examples, the wireless communication manager 815 may receive, at a MAC entity, PDUs corresponding to one or more IP flows. The MAC entity may route the PDUs from the MAC entity to respective RLC entities based at least in part on a logical channel prioritization. The RLC entities may forward the PDUs from respective RLC entities to a plurality of PDCP entities mapped to each RLC entity.

In some examples, the wireless communication manager 815 may receive, at a MAC entity, PDUs corresponding to one or more IP flows. The MAC entity may route PDUs corresponding to the one or more IP flows from the MAC entity to respective RLC entities based at least in part on a logical channel prioritization. The RLC entities may forward the PDUs from respective RLC entities to corresponding respective PDCP entities. At least one of the respective RLC entities and corresponding respective PDCP entities may be dedicated to a single IP flow.

In some examples, the wireless communication manager 815 may receive, at a MAC entity, PDUs corresponding to one or more IP flows. The MAC entity may route the PDUs corresponding to the one or more IP flows from the MAC entity to respective RLC entities based at least in part on a logical channel prioritization. The RLC entities may forward the PDUs from respective RLC entities to a plurality of PDCP entities. At least one of the PDCP entities may be dedicated to a single IP flow.

In some examples, the wireless communication manager 815 may receive, at a RLC entity associated with a LCID, PDUs corresponding to an IP flow. The PDUs may be received from a PDCP entity dedicated to the IP flow. The RLC entity may forward the PDUs from the RLC entity to a MAC entity for wireless transmission.

The transmitter 820 may transmit signals generated by other components of the apparatus 805. In some examples, the transmitter 820 may be collocated with the receiver 810 in a transceiver. For example, the transmitter 820 may be an example of aspects of the transceiver 1230 or 1350 described with reference to FIG. 12 or 13. The transmitter 820 may include a single antenna or a set of antennas.

Figure 9:
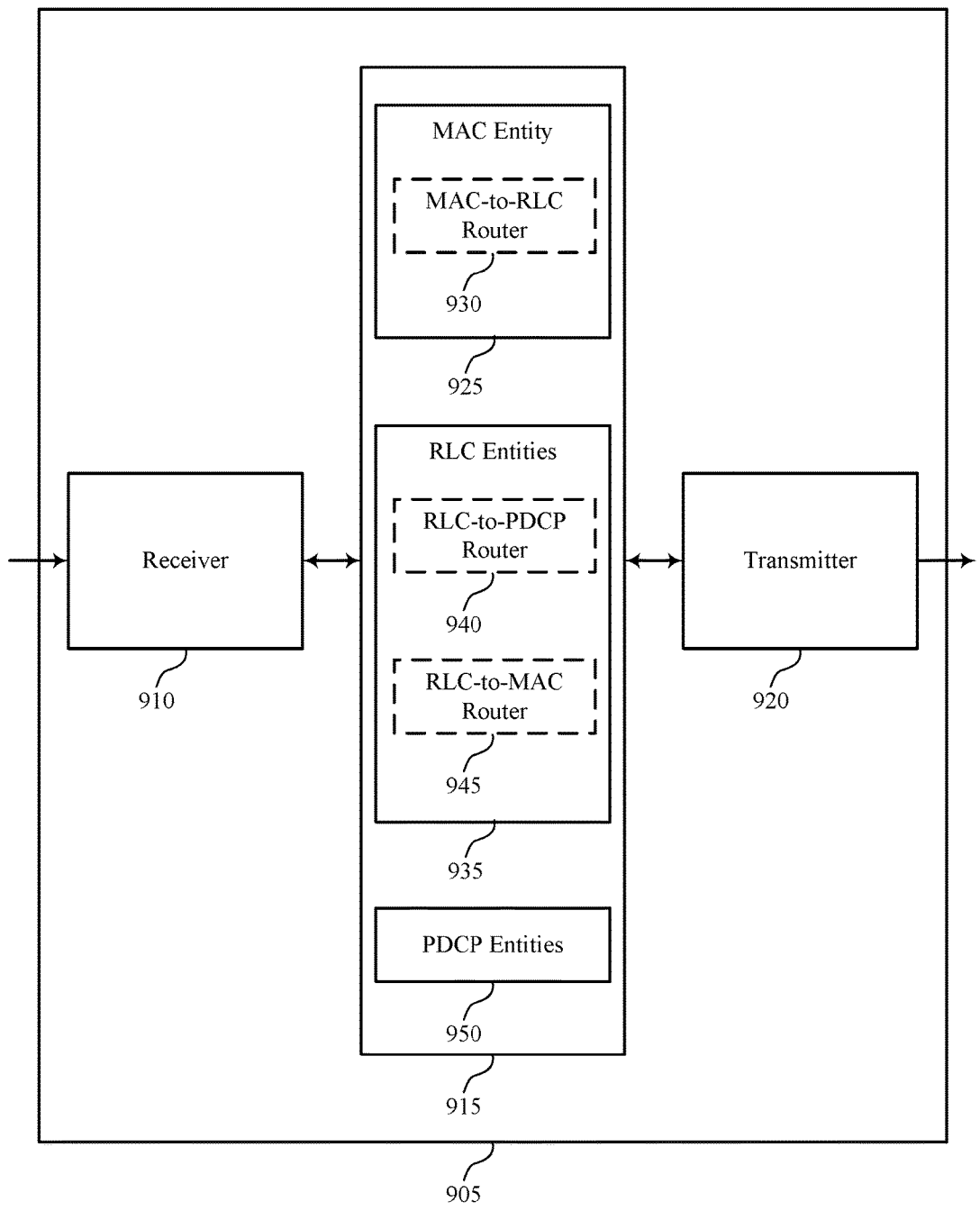

FIG. 9 shows a block diagram 900 of an apparatus 905 for use in wireless communication, in accordance with one or more aspects of the present disclosure. The apparatus 905 may be an example of aspects of a UE, network access device, or apparatus described with reference to FIG. 1 or 8. The apparatus 905 may include a receiver 910, a wireless communication manager 915, and a transmitter 920. The apparatus 905 may also include a processor. Each of these components may be in communication with one another (e.g., via one or more buses).

The receiver 910 may receive information such as packets, user data, or control information associated with various information channels (e.g., control channels, data channels, and information related to uplink transmission parameter selection for random access initial message, etc.). Information may be passed on to other components of the apparatus 905. The receiver 910 may be an example of aspects of the transceiver 1230 or 1350 described with reference to FIG. 12 or 13. The receiver 910 may include a single antenna or a set of antennas.

The wireless communication manager 915 may include a MAC entity 925, one or more RLC entities 935, and one or more PDCP entities 950. The MAC entity 925 may include an optional MAC-to-RLC router 930. Each RLC entity 935 may include an optional RLC-to-PDCP router 940 and RLC-to-MAC router 945. The wireless communication manager 915 may be an example of aspects of the wireless communication manager described with reference to FIG. 1 or 8.

In some examples, the wireless communication manager 915 may receive, at the MAC entity 925 (e.g., over a wireless interface), PDUs corresponding to one or more IP flows. The MAC entity 925 (or MAC-to-RLC router 930) may route the PDUs from the MAC entity 925 to respective RLC entities 935 based at least in part on a logical channel prioritization. In some examples, routing the PDUs from the MAC entity 925 to respective RLC entities 935 may include routing the PDUs from the MAC entity 925 to respective radio bearers. Each radio bearer may include a single RLC entity 935 and multiple PDCP entities 950. In some examples, the single RLC entity 935 may be a receive RLC entity that is different from a transmit RLC entity for the multiple PDCP entities 950. The RLC entities 935 (or RLC-to-PDCP routers 940 of the RLC entities 935) may forward the PDUs from respective RLC entities 935 to a plurality of PDCP entities 950 mapped to each RLC entity 935. In some examples, forwarding the PDUs from respective RLC entities 935 to a plurality of PDCP entities 950 may include forwarding PDUs corresponding to one of the one or more IP flows to one of the plurality of PDCP entities 950 dedicated to the one IP flow. In some examples, forwarding the PDUs from respective RLC entities 935 to a plurality of PDCP entities 950 may include extracting, at respective RLC entities 935, an IP flow identifier from a header of each of the PDUs, and forwarding the PDUs to the plurality of PDCP entities 950 based at least in part on the IP flow identifier. In some examples, forwarding the PDUs from respective RLC entities 935 to a plurality of PDCP entities 950 may include forwarding PDUs corresponding to a correlated portion of the one or more IP flows to one of the plurality of PDCP entities 950 dedicated to the correlated portion of IP flows.

In some examples, the wireless communication manager 915 may receive, at the MAC entity 925, PDUs corresponding to one or more IP flows. The MAC entity 925 (or MAC-to-RLC router 930) may route PDUs corresponding to the one or more IP flows from the MAC entity 925 to respective RLC entities 935 based at least in part on a logical channel prioritization. In some examples, routing the PDUs from the MAC entity 925 to respective RLC entities 935 may include routing the PDUs from the MAC entity 925 to respective radio bearers, with each radio bearer including a single RLC entity 935 and a single PDCP entity 950. In some examples, the single RLC entity 935 may be a receive RLC entity that is different from a transmit RLC entity for the single PDCP entity 950. The RLC entities 935 (or RLC-to-PDCP routers 940 of the RLC entities 935) may forward the PDUs from respective RLC entities 935 to corresponding respective PDCP entities 950. At least one of the respective RLC entities 935 and corresponding respective PDCP entities 950 may be dedicated to a single IP flow. In some examples, forwarding the PDUs from respective RLC entities 935 to corresponding respective PDCP entities 950 may include using matching sequence numbers for a same PDU at a respective RLC entity 935 and a PDCP entity 950 mapped to the respective RLC entity 935. In some examples, forwarding the PDUs from respective RLC entities 935 to corresponding respective PDCP entities 950 may include forwarding PDUs corresponding to a correlated portion of the one or more IP flows to one of the plurality of PDCP entities 950 dedicated to the correlated portion of IP flows.

In some examples, the wireless communication manager 915 may receive, at the MAC entity 925, PDUs corresponding to one or more IP flows. The MAC entity 925 (or MAC-to-RLC router 930) may route the PDUs corresponding to the one or more IP flows from the MAC entity 925 to respective RLC entities 935 based at least in part on a logical channel prioritization. The RLC entities 935 (or RLC-to-PDCP routers 940 of the RLC entities 935) may forward the PDUs from respective RLC entities 935 to a plurality of PDCP entities 950. At least one of the PDCP entities 950 may be dedicated to a single IP flow.

In some examples, the wireless communication manager 915 may receive, at a RLC entity 935 associated with a LCID, PDUs corresponding to an IP flow. The PDUs may be received from a PDCP entity 950 dedicated to the IP flow. In some examples, the RLC entity 935 and the PDCP entity 950 may be mapped together as a radio bearer. In some examples, the RLC entity 935 may be mapped together with the PDCP entity 950 and other PDCP entities 950 as a radio bearer. In some examples, receiving, at the RLC entity 935, PDUs corresponding to an IP flow may include receiving concatenated PDUs from the PDCP entity 950. The RLC entity 935 (or RLC-to-MAC router 945) may forward the PDUs from the RLC entity 935 to the MAC entity 925 for wireless transmission.

The transmitter 920 may transmit signals generated by other components of the apparatus 905. In some examples, the transmitter 920 may be collocated with the receiver 910 in a transceiver. For example, the transmitter 920 may be an example of aspects of the transceiver 1230 or 1350 described with reference to FIG. 12 or 13. The transmitter 920 may include a single antenna or a set of antennas.

Figure 10:
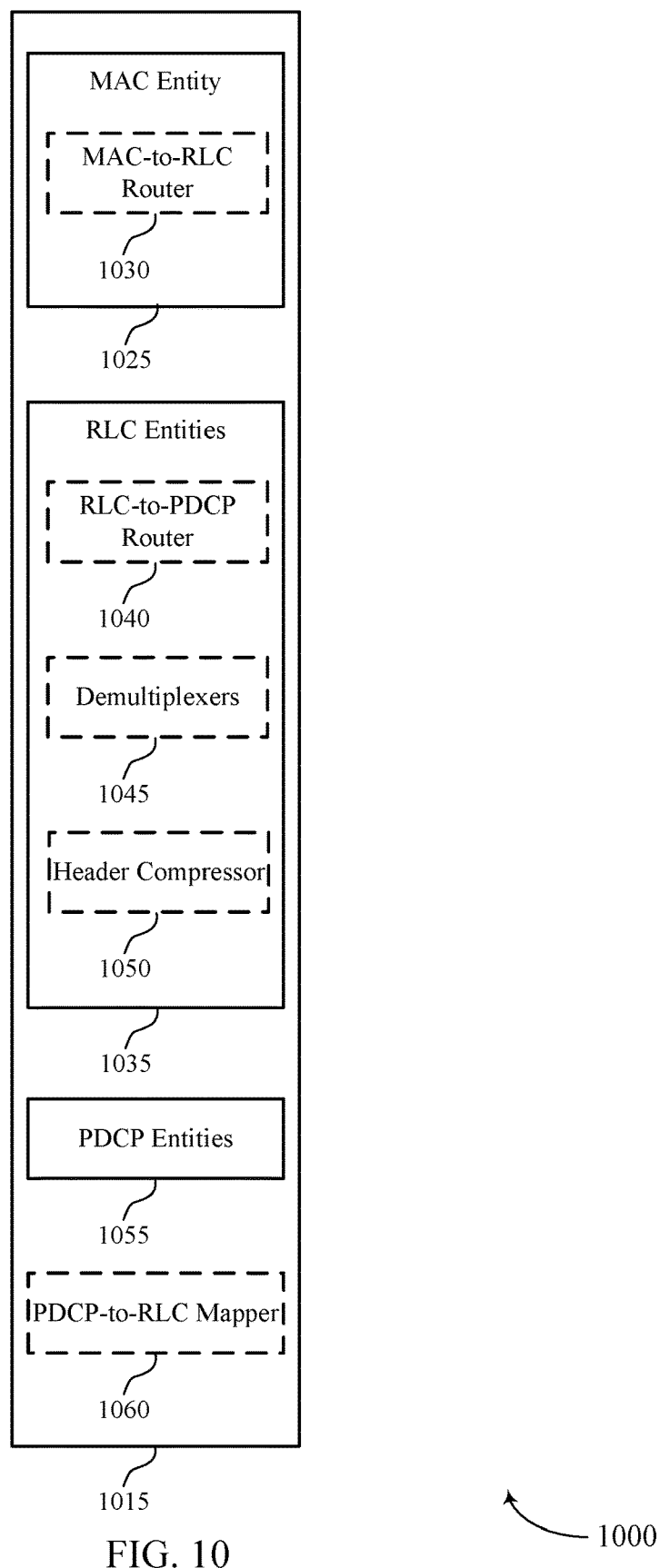
FIGS. 10-11 show block diagrams of wireless communication managers, in accordance with one or more aspects of the present disclosure.

FIG. 10 shows a block diagram 1000 of a wireless communication manager 1015, in accordance with one or more aspects of the present disclosure. The wireless communication manager 1015 may be an example of aspects of a wireless communication manager described with reference to FIG. 1, 8, or 9. The wireless communication manager 1015 may include a MAC entity 1025, one or more RLC entities 1035, one or more PDCP entities 1055, and an optional PDCP-to-RLC mapper 1060. The MAC entity 1025 may include an optional MAC-to-RLC router 1030. Each RLC entity 1035 may include an optional RLC-to-PDCP router 1040, optional demultiplexer 1045, and optional header compressor 1050. Each of these components may communicate, directly or indirectly, with one another (e.g., via one or more buses). The MAC entity 1025, MAC-to-RLC router 1030, RLC entities 1035, RLC-to-PDCP router 1040, and PDCP entities 1055 may be configured similarly to, and may perform the functions of, the MAC entity 925, MAC-to-RLC router 930, RLC entities 935, RLC-to-PDCP router 940, and PDCP entities 950 described with reference to FIG. 9.

The PDCP-to-RLC mapper 1060 may dynamically update a mapping of PDCP entities 1055 to RLC entities 1035.

The demultiplexers 1045 may demultiplex the PDUs corresponding to the one or more IP flows at the respective RLC entities 1035.

The header compressors 1050 may apply, at a respective RLC entity 1035, header compression to PDUs forwarded to a plurality of PDCP entities 1055 mapped to the respective RLC entity 1035.

Figure 11:
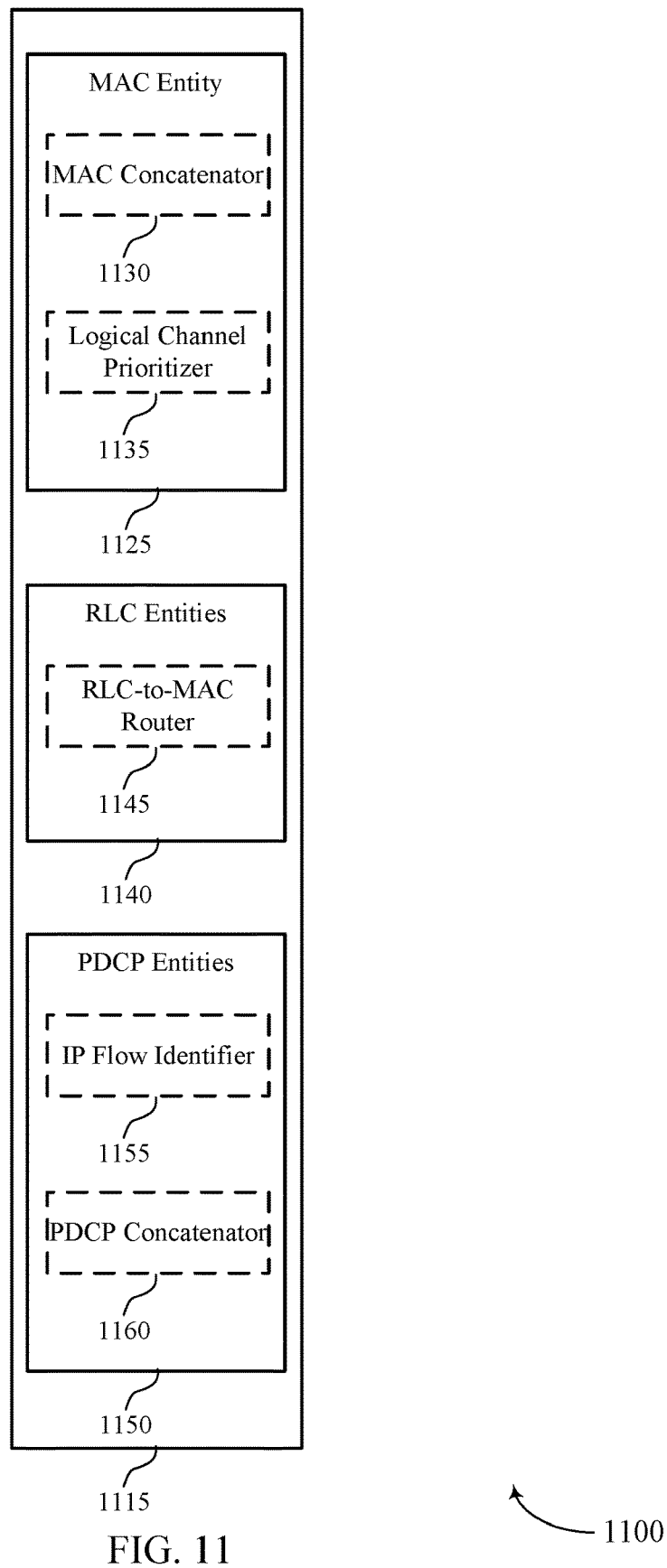

FIG. 11 shows a block diagram 1100 of a wireless communication manager 1115, in accordance with one or more aspects of the present disclosure. The wireless communication manager 1115 may be an example of aspects of a wireless communication manager described with reference to FIG. 1, 8, or 9. The wireless communication manager 1115 may include a MAC entity 1125, one or more RLC entities 1140, and one or more PDCP entities 1150. The MAC entity 1125 may include an optional MAC concatenator 1130 and optional logical channel prioritizer 1135. Each RLC entity 1140 may include an optional RLC-to-MAC router 1145. Each PDCP entity 1150 may include an optional IP flow identifier 1155 and optional PDCP concatenator 1160. Each of these components may communicate, directly or indirectly, with one another (e.g., via one or more buses). The MAC entity 1125, RLC entities 1140, RLC-to-MAC router 1145, and PDCP entities 1150 may be configured similarly to, and may perform the functions of, the MAC entity 925, RLC entities 935, RLC-to-MAC router 945, and PDCP entities 950 described with reference to FIG. 9.

The MAC concatenator 1130 may concatenate PDUs belonging to a LCID at the MAC entity 1125.

The logical channel prioritizer 1135 may determine, at the MAC entity 1125, a logical channel prioritization for a plurality of IP flows.

The IP flow identifier 1155 may insert, at a PDCP entity 1150, an IP flow identifier in a header of each PDU routed to a RLC entity 1140 associated with a LCID.

The PDCP concatenator 1160 may concatenate PDUs corresponding to the IP flow at a PDCP entity 1150.

Figure 12:
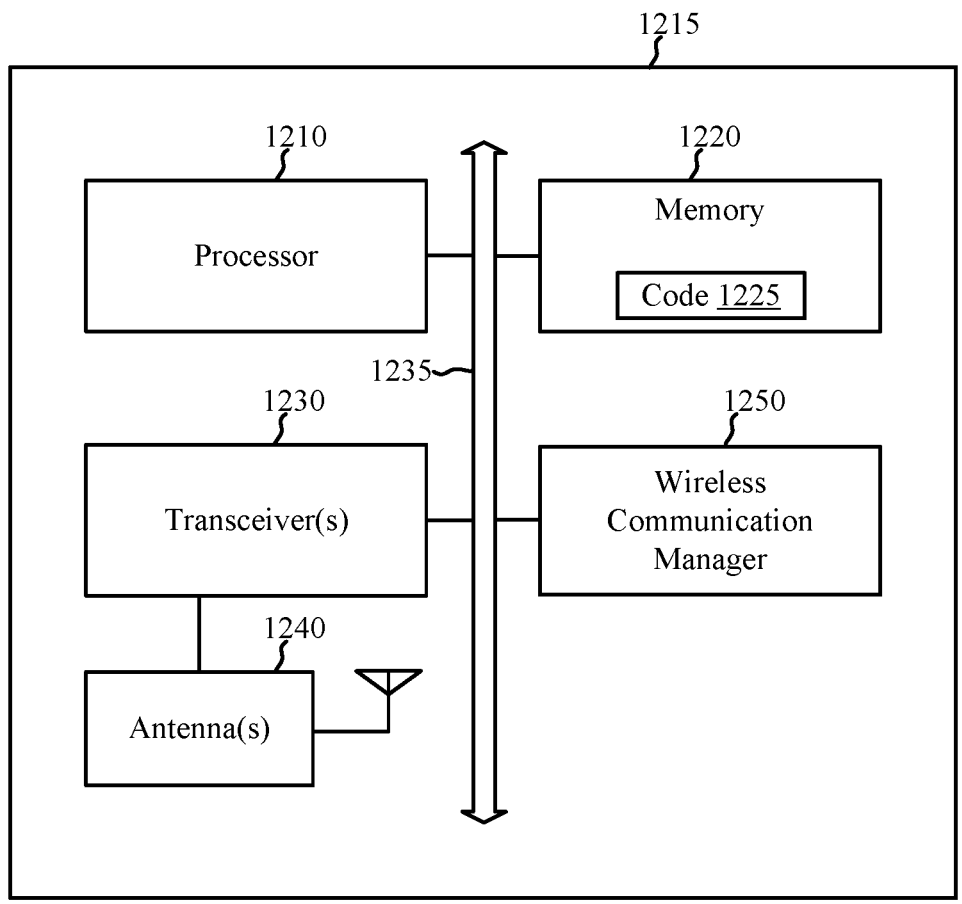
FIG. 12 shows a block diagram of a UE for use in wireless communication, in accordance with one or more aspects of the present disclosure.

FIG. 12 shows a block diagram 1200 of a UE 1215 for use in wireless communication, in accordance with one or more aspects of the present disclosure. The UE 1215 may be included or be part of a personal computer (e.g., a laptop computer, a netbook computer, a tablet computer, etc.), a cellular telephone, a PDA, a digital video recorder (DVR), an internet appliance, a gaming console, an e-reader, a vehicle, a home appliance, a lighting or alarm control system, etc. The UE 1215 may, in some examples, have an internal power supply (not shown), such as a small battery, to facilitate mobile operation. In some examples, the UE 1215 may be an example of aspects of one or more of the UEs described with reference to FIG. 1, or aspects of the apparatus described with reference to FIG. 8 or 9. The UE 1215 may be configured to implement at least some of the UE or apparatus techniques and functions described with reference to FIGS. 1-11.

The UE 1215 may include a processor 1210, a memory 1220, at least one transceiver (represented by transceiver(s) 1230), antennas 1240 (e.g., an antenna array), or a wireless communication manager 1250. Each of these components may be in communication with each other, directly or indirectly, over one or more buses 1235.

The memory 1220 may include random access memory (RAM) or read-only memory (ROM). The memory 1220 may store computer-readable, computer-executable code 1225 containing instructions that are configured to, when executed, cause the processor 1210 to perform various functions described herein related to wireless communication, including, for example, the processing of IP flows in an L2 architecture. Alternatively, the computer-executable code 1225 may not be directly executable by the processor 1210 but be configured to cause the UE 1215 (e.g., when compiled and executed) to perform various of the functions described herein.

The processor 1210 may include an intelligent hardware device, e.g., a central processing unit (CPU), a microcontroller, an ASIC, etc. The processor 1210 may process information received through the transceiver(s) 1230 or information to be sent to the transceiver(s) 1230 for transmission through the antennas 1240. The processor 1210 may handle, alone or in connection with the wireless communication manager 1250, one or more aspects of communicating over (or managing communications over) one or more radio frequency spectrum bands.

The transceiver(s) 1230 may include a modem configured to modulate packets and provide the modulated packets to the antennas 1240 for transmission, and to demodulate packets received from the antennas 1240. The transceiver(s) 1230 may, in some examples, be implemented as one or more transmitters and one or more separate receivers. The transceiver(s) 1230 may support communications in one or more radio frequency spectrum bands. The transceiver(s) 1230 may be configured to communicate bi-directionally, via the antennas 1240, with one or more of the network access devices described with reference to FIG. 1.

The wireless communication manager 1250 may be configured to perform or control some or all of the UE or apparatus techniques or functions described with reference to FIGS. 1-11 related to wireless communication. The wireless communication manager 1250, or portions of it, may include a processor, or some or all of the functions of the wireless communication manager 1250 may be performed by the processor 1210 or in connection with the processor 1210. In some examples, the wireless communication manager 1250 may be an example of the wireless communication manager described with reference to FIG. 1, 8, 9, 10, or 11.

Figure 13:
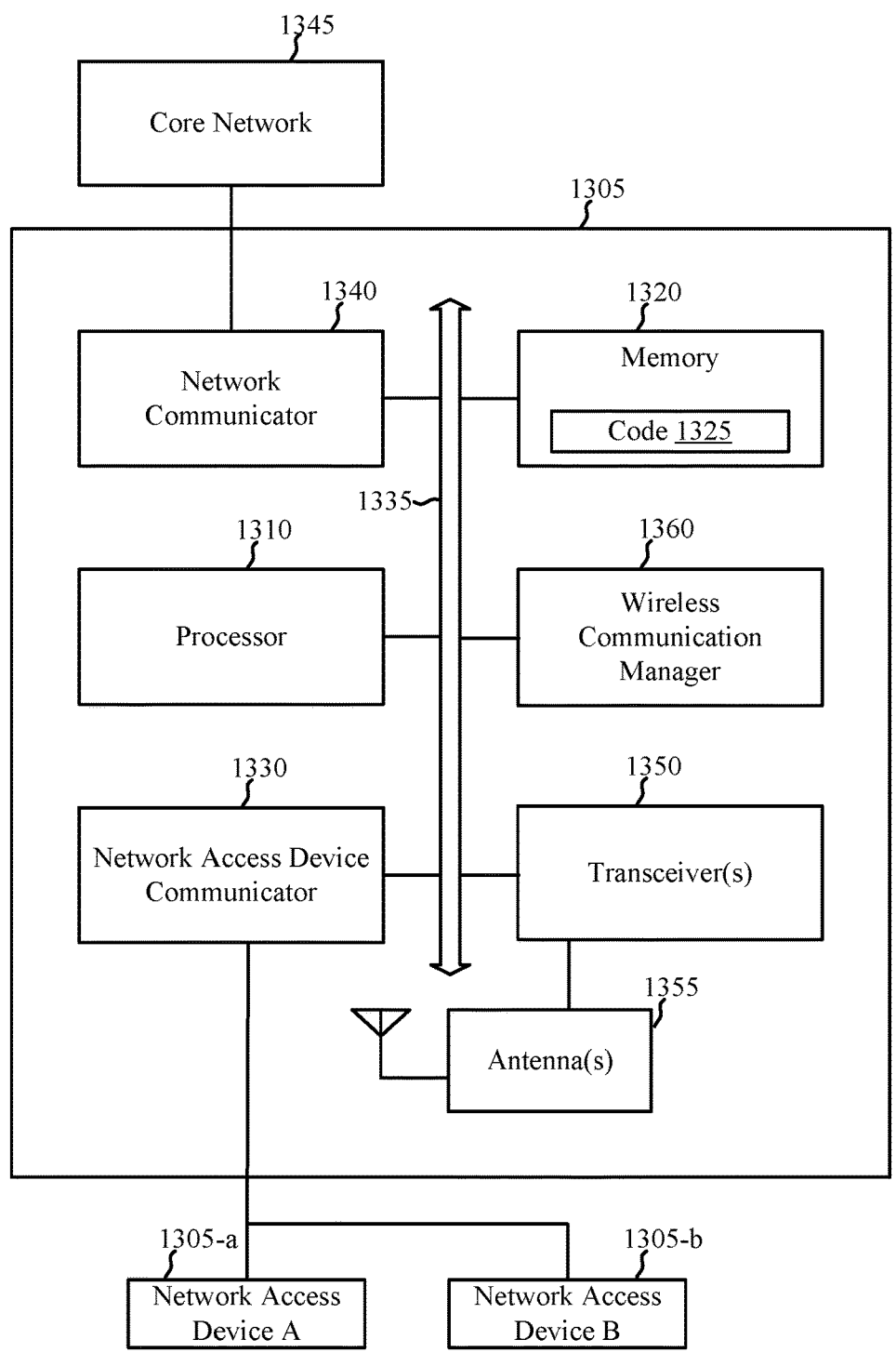
FIG. 13 shows a block diagram of a network access device for use in wireless communication, in accordance with one or more aspects of the present disclosure.

FIG. 13 shows a block diagram 1300 of a network access device 1305 for use in wireless communication, in accordance with one or more aspects of the present disclosure. In some examples, the network access device 1305 may be an example of one or more aspects of the network access devices (e.g., a radio head, a base station, an eNB, or an ANC) described with reference to FIG. 1, or aspects of the apparatus described with reference to FIG. 8 or 9. The network access device 1305 may be configured to implement or facilitate at least some of the network access device techniques and functions described with reference to FIGS. 1-11.

The network access device 1305 may include a processor 1310, a memory 1320, at least one transceiver (represented by transceiver(s) 1350), antennas 1355 (e.g., an antenna array), or a wireless communication manager 1360. The network access device 1305 may also include one or more of a network access device communicator 1330 or a network communicator 1340. Each of these components may be in communication with each other, directly or indirectly, over one or more buses 1335.

The memory 1320 may include RAM or ROM. The memory 1320 may store computer-readable, computer-executable code 1325 containing instructions that are configured to, when executed, cause the processor 1310 to perform various functions described herein related to wireless communication, including, for example, the processing of IP flows in an L2 architecture. Alternatively, the computer-executable code 1325 may not be directly executable by the processor 1310 but be configured to cause the network access device 1305 (e.g., when compiled and executed) to perform various of the functions described herein.

The processor 1310 may include an intelligent hardware device, e.g., a CPU, a microcontroller, an ASIC, etc. The processor 1310 may process information received through the transceiver(s) 1350, the network access device communicator 1330, or the network communicator 1340. The processor 1310 may also process information to be sent to the transceiver(s) 1350 for transmission through the antennas 1355, or to the network access device communicator 1330 for transmission to one or more other network access devices (e.g., network access device 1305-a and network access device 1305-b), or to the network communicator 1340 for transmission to a core network 1345, which may be an example of one or more aspects of the core network 130 described with reference to FIG. 1. The processor 1310 may handle, alone or in connection with the wireless communication manager 1360, one or more aspects of communicating over (or managing communications over) one or more radio frequency spectrum bands.

The transceiver(s) 1350 may include a modem configured to modulate packets and provide the modulated packets to the antennas 1355 for transmission, and to demodulate packets received from the antennas 1355. The transceiver(s) 1350 may, in some examples, be implemented as one or more transmitters and one or more separate receivers. The transceiver(s) 1350 may support communications in one or more radio frequency spectrum bands. The transceiver(s) 1350 may be configured to communicate bi-directionally, via the antennas 1355, with one or more UEs or apparatuses, such as one of the UEs described with reference to FIG. 1 or 12, or the apparatus described with reference to FIG. 8 or 9. The network access device 1305 may communicate with the core network 1345 through the network communicator 1340. The network access device 1305 may also communicate with other network access devices, such as the network access device 1305-a and the network access device 1305-b, using the network access device communicator 1330.

The wireless communication manager 1360 may be configured to perform or control some or all of the network access device or apparatus techniques or functions described with reference to FIGS. 1-11 related to wireless communication. The wireless communication manager 1360, or portions of it, may include a processor, or some or all of the functions of the wireless communication manager 1360 may be performed by the processor 1310 or in connection with the processor 1310. In some examples, the wireless communication manager 1360 may be an example of the wireless communication manager described with reference to FIG. 1, 8, 9, 10, or 11.

Figure 14:
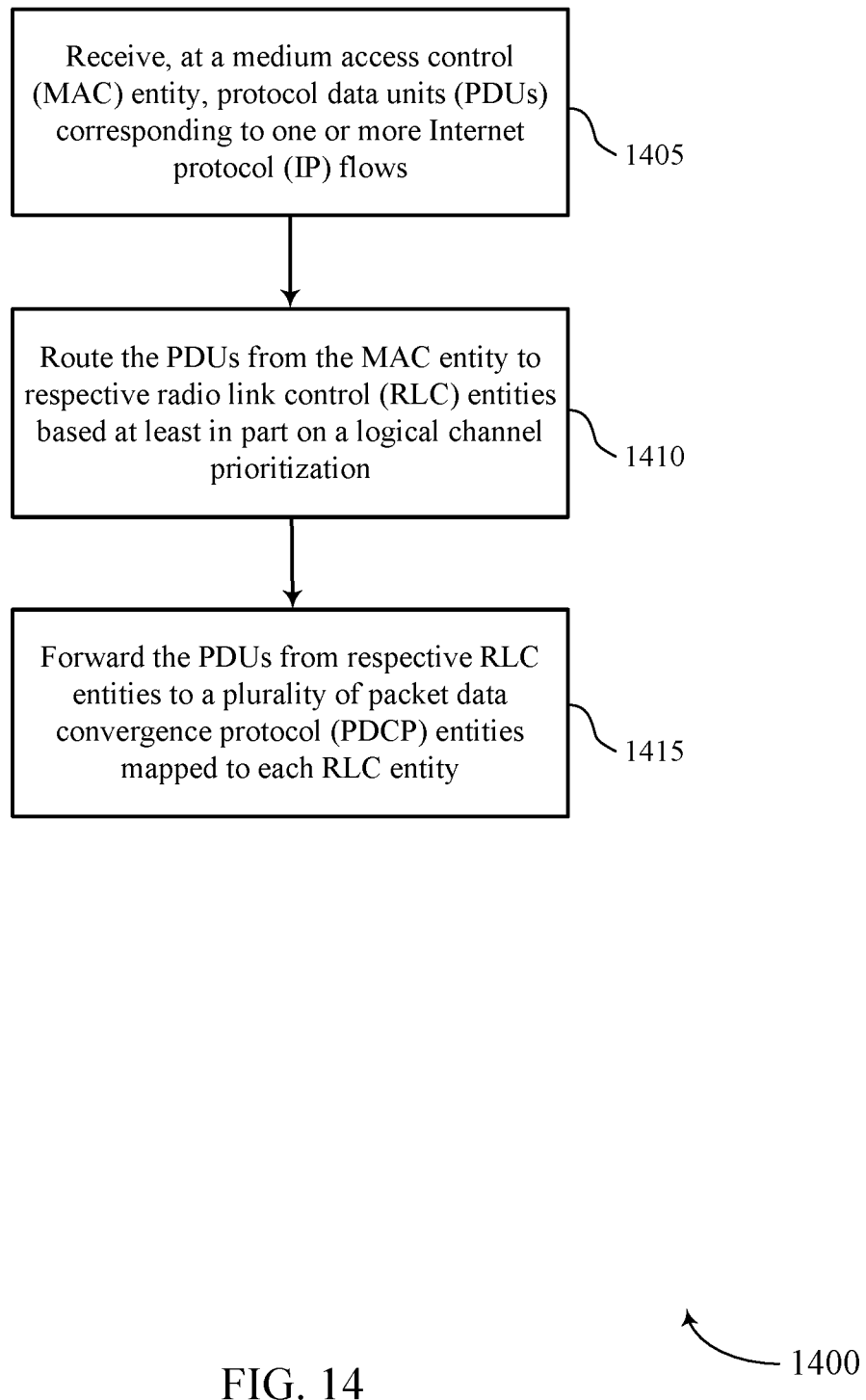
FIGS. 14-23 are flow charts illustrating examples of methods for wireless communication at a wireless device, in accordance with one or more aspects of the present disclosure.

FIG. 14 is a flow chart illustrating an example of a method 1400 for wireless communication at a wireless device, in accordance with one or more aspects of the present disclosure. For clarity, the method 1400 is described below with reference to aspects of one or more of the UEs described with reference to FIG. 1 or 12, aspects of one or more of the network access devices described with reference to FIG. 1 or 13, aspects of one or more of the apparatuses described with reference to FIG. 8 or 9, or aspects of one or more of the wireless communication managers described with reference to FIG. 1, 8, 9, 10, 12, or 13. In some examples, a wireless device may execute one or more sets of codes to control the functional elements of the wireless device to perform the functions described below. Additionally or alternatively, the wireless device may perform one or more of the functions described below using special-purpose hardware.

At block 1405, the method 1400 may include receiving, at a MAC entity, PDUs corresponding to one or more IP flows, as described for example with reference to FIG. 6. In certain examples, the operation(s) at block 1405 may be performed using the MAC entity described with reference to FIG. 9 or 10.

At block 1410, the method 1400 may include routing the PDUs from the MAC entity to respective RLC entities based at least in part on a logical channel prioritization, as described for example with reference to FIG. 6. In some examples, routing the PDUs from the MAC entity to respective RLC entities may include routing the PDUs from the MAC entity to respective radio bearers. Each radio bearer may include a single RLC entity and multiple PDCP entities. In some examples, the single RLC entity may be a receive RLC entity that is different from a transmit RLC entity for the multiple PDCP entities. In certain examples, the operation(s) at block 1410 may be performed using the MAC entity or MAC-to-RLC router described with reference to FIG. 9 or 10.

At block 1415, the method 1400 may include forwarding the PDUs from respective RLC entities to a plurality of PDCP entities mapped to each RLC entity, as described for example with reference to FIG. 6. In some examples, forwarding the PDUs from respective RLC entities to a plurality of PDCP entities may include forwarding PDUs corresponding to one of the one or more IP flows to one of the plurality of PDCP entities dedicated to the one IP flow. In some examples, forwarding the PDUs from respective RLC entities to a plurality of PDCP entities may include extracting, at respective RLC entities, an IP flow identifier from a header of each of the PDUs, and forwarding the PDUs to the plurality of PDCP entities based at least in part on the IP flow identifier. In some examples, forwarding the PDUs from respective RLC entities to a plurality of PDCP entities may include forwarding PDUs corresponding to a correlated portion of the one or more IP flows to one of the plurality of PDCP entities dedicated to the correlated portion of IP flows. In certain examples, the operation(s) at block 1415 may be performed using the RLC entities or RLC-to-PDCP routers described with reference to FIG. 9.

Figure 15:
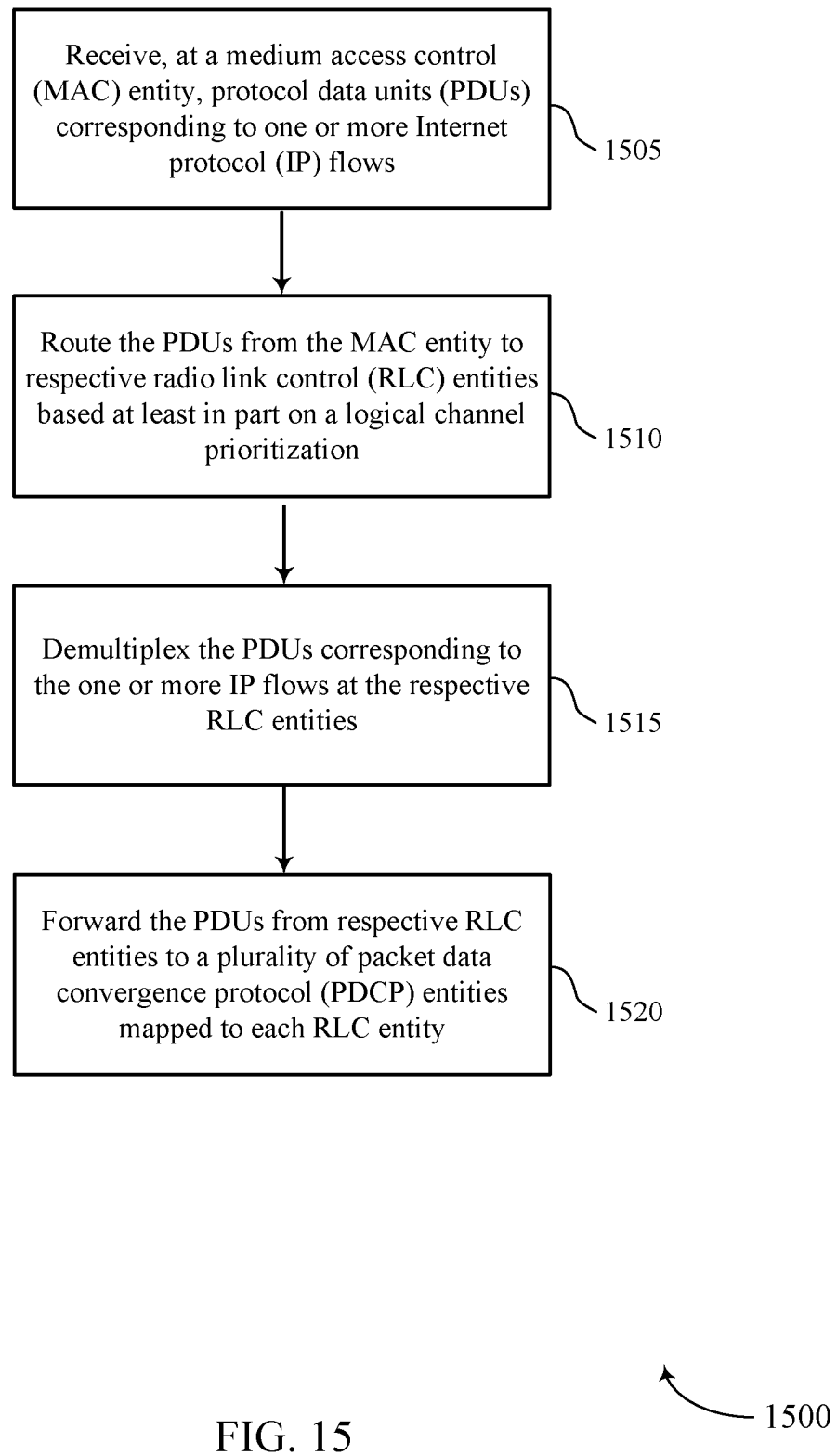

FIG. 15 is a flow chart illustrating an example of a method 1500 for wireless communication at a wireless device, in accordance with one or more aspects of the present disclosure. For clarity, the method 1500 is described below with reference to aspects of one or more of the UEs described with reference to FIG. 1 or 12, aspects of one or more of the network access devices described with reference to FIG. 1 or 13, aspects of one or more of the apparatuses described with reference to FIG. 8 or 9, or aspects of one or more of the wireless communication managers described with reference to FIG. 1, 8, 9, 10, 12, or 13. In some examples, a wireless device may execute one or more sets of codes to control the functional elements of the wireless device to perform the functions described below. Additionally or alternatively, the wireless device may perform one or more of the functions described below using special-purpose hardware.

At block 1505, the method 1500 may include receiving, at a MAC entity, PDUs corresponding to one or more IP flows, as described for example with reference to FIG. 6. In certain examples, the operation(s) at block 1505 may be performed using the MAC entity described with reference to FIG. 9 or 10.

At block 1510, the method 1500 may include routing the PDUs from the MAC entity to respective RLC entities based at least in part on a logical channel prioritization, as described for example with reference to FIG. 6. In certain examples, the operation(s) at block 1510 may be performed using the MAC entity or MAC-to-RLC router described with reference to FIG. 9 or 10.

At block 1515, the method 1500 may include demultiplexing the PDUs corresponding to the one or more IP flows at the respective RLC entities, as described for example with reference to FIG. 6. In certain examples, the operation(s) at block 1515 may be performed using the RLC entities described with reference to FIG. 9 or 10, or the demultiplexers described with reference to FIG. 10.

At block 1520, the method 1500 may include forwarding the PDUs from respective RLC entities to a plurality of PDCP entities mapped to each RLC entity, as described for example with reference to FIG. 6. In certain examples, the operation(s) at block 1520 may be performed using the RLC entities or RLC-to-PDCP routers described with reference to FIG. 9.

Figure 16:
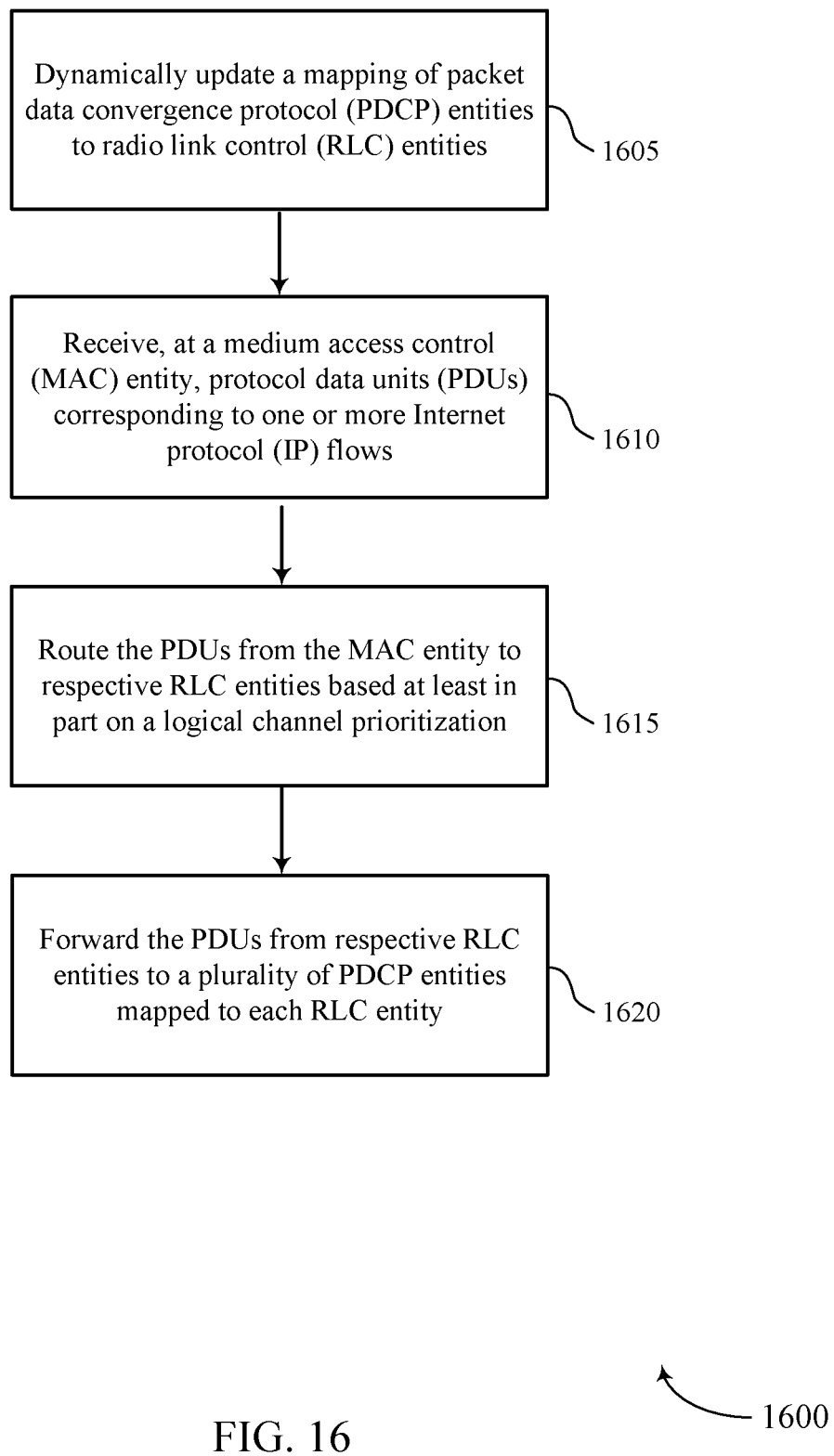

FIG. 16 is a flow chart illustrating an example of a method 1600 for wireless communication at a wireless device, in accordance with one or more aspects of the present disclosure. For clarity, the method 1600 is described below with reference to aspects of one or more of the UEs described with reference to FIG. 1 or 12, aspects of one or more of the network access devices described with reference to FIG. 1 or 13, aspects of one or more of the apparatuses described with reference to FIG. 8 or 9, or aspects of one or more of the wireless communication managers described with reference to FIG. 1, 8, 9, 10, 12, or 13. In some examples, a wireless device may execute one or more sets of codes to control the functional elements of the wireless device to perform the functions described below. Additionally or alternatively, the wireless device may perform one or more of the functions described below using special-purpose hardware.

At block 1605, the method 1600 may include dynamically updating a mapping of PDCP entities to RLC entities, as described for example with reference to FIG. 6. In certain examples, the operation(s) at block 1605 may be performed using the PDCP-to-RLC mapper described with reference to FIG. 10.

At block 1610, the method 1600 may include receiving, at a MAC entity, PDUs corresponding to one or more IP flows, as described for example with reference to FIG. 6. In certain examples, the operation(s) at block 1610 may be performed using the MAC entity described with reference to FIG. 9 or 10.

At block 1615, the method 1600 may include routing the PDUs from the MAC entity to respective ones of the RLC entities based at least in part on a logical channel prioritization, as described for example with reference to FIG. 6. In certain examples, the operation(s) at block 1615 may be performed using the MAC entity or MAC-to-RLC router described with reference to FIG. 9 or 10.

At block 1620, the method 1600 may include forwarding the PDUs from respective RLC entities to a plurality of the PDCP entities mapped to each RLC entity, as described for example with reference to FIG. 6. In certain examples, the operation(s) at block 1620 may be performed using the RLC entities or RLC-to-PDCP routers described with reference to FIG. 9.

Figure 17:
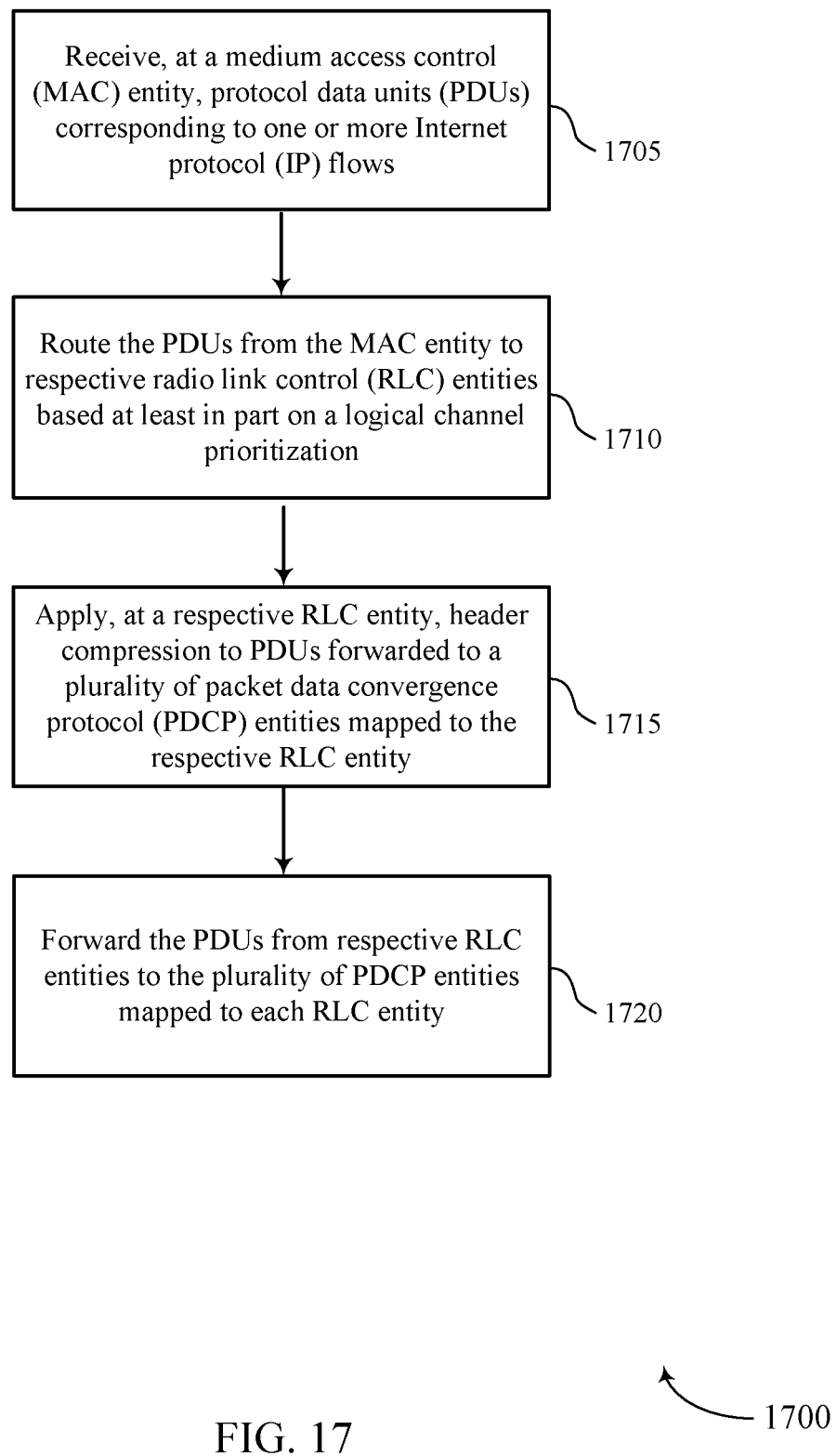

FIG. 17 is a flow chart illustrating an example of a method 1700 for wireless communication at a wireless device, in accordance with one or more aspects of the present disclosure. For clarity, the method 1700 is described below with reference to aspects of one or more of the UEs described with reference to FIG. 1 or 12, aspects of one or more of the network access devices described with reference to FIG. 1 or 13, aspects of one or more of the apparatuses described with reference to FIG. 8 or 9, or aspects of one or more of the wireless communication managers described with reference to FIG. 1, 8, 9, 10, 12, or 13. In some examples, a wireless device may execute one or more sets of codes to control the functional elements of the wireless device to perform the functions described below. Additionally or alternatively, the wireless device may perform one or more of the functions described below using special-purpose hardware.

At block 1705, the method 1700 may include receiving, at a MAC entity, PDUs corresponding to one or more IP flows, as described for example with reference to FIG. 6. In certain examples, the operation(s) at block 1705 may be performed using the MAC entity described with reference to FIG. 9 or 10.

At block 1710, the method 1700 may include routing the PDUs from the MAC entity to respective RLC entities based at least in part on a logical channel prioritization, as described for example with reference to FIG. 6. In certain examples, the operation(s) at block 1710 may be performed using the MAC entity or MAC-to-RLC router described with reference to FIG. 9 or 10.

At block 1715, the method 1700 may include applying, at a respective RLC entity, header compression to PDUs forwarded to a plurality of PDCP entities mapped to the respective RLC entity, as described for example with reference to FIG. 6. In certain examples, the operation(s) at block

1715 may be performed using the RLC entities described with reference to FIG. 9 or 10, or the header compressor described with reference to FIG. 10.

At block 1720, the method 1700 may include forwarding the PDUs from respective RLC entities to the plurality of PDCP entities mapped to each RLC entity, as described for example with reference to FIG. 6. In certain examples, the operation(s) at block 1720 may be performed using the RLC entities or RLC-to-PDCP routers described with reference to FIG. 9.

Figure 18:
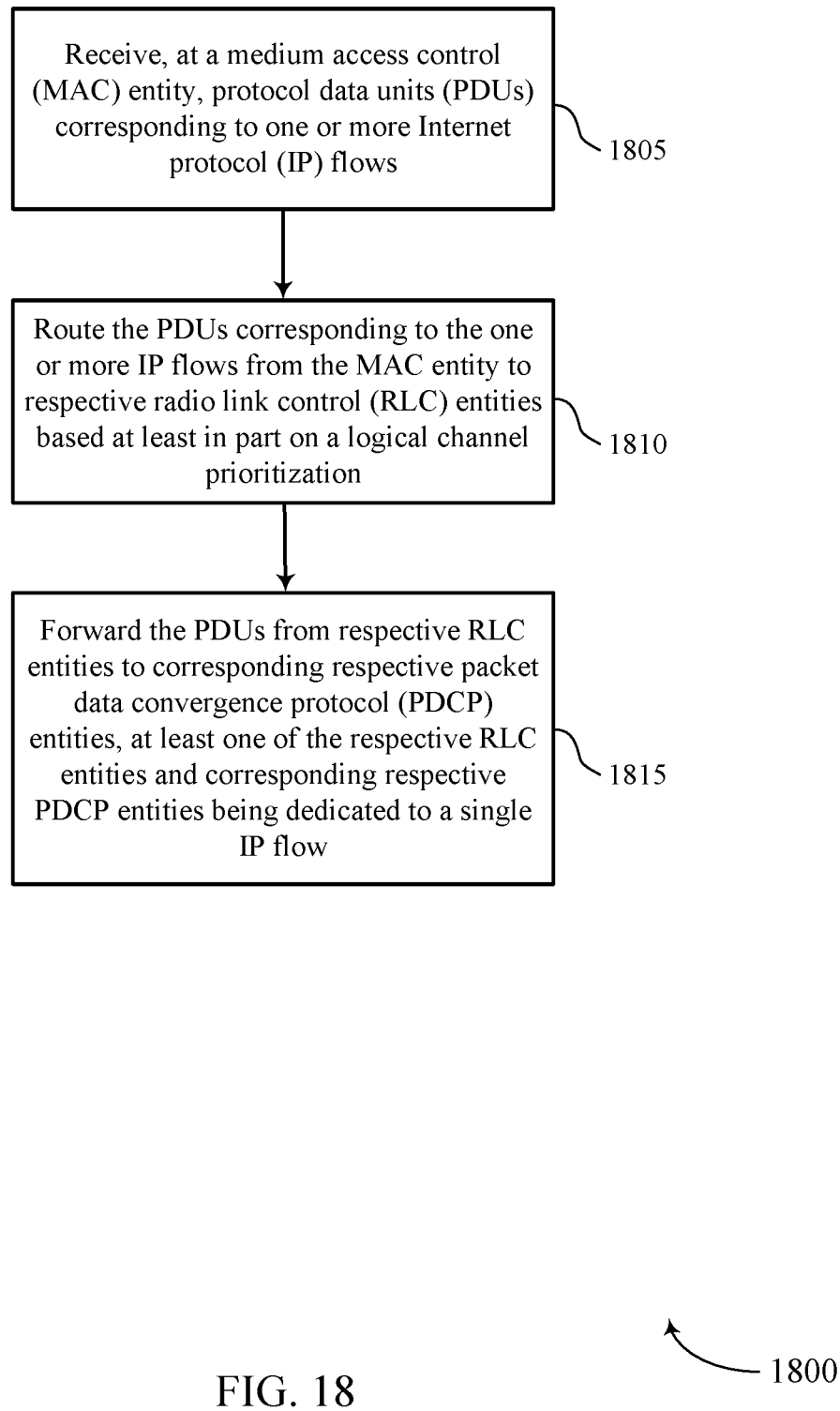

FIG. 18 is a flow chart illustrating an example of a method 1800 for wireless communication at a wireless device, in accordance with one or more aspects of the present disclosure. For clarity, the method 1800 is described below with reference to aspects of one or more of the UEs described with reference to FIG. 1 or 12, aspects of one or more of the network access devices described with reference to FIG. 1 or 13, aspects of one or more of the apparatuses described with reference to FIG. 8 or 9, or aspects of one or more of the wireless communication managers described with reference to FIG. 1, 8, 9, 10, 12, or 13. In some examples, a wireless device may execute one or more sets of codes to control the functional elements of the wireless device to perform the functions described below. Additionally or alternatively, the wireless device may perform one or more of the functions described below using special-purpose hardware.

At block 1805, the method 1800 may include receiving, at a MAC entity, PDUs corresponding to one or more IP flows, as described for example with reference to FIG. 4. In certain examples, the operation(s) at block 1805 may be performed using the MAC entity described with reference to FIG. 9 or 10.

At block 1810, the method 1800 may include routing the PDUs corresponding to the one or more IP flows from the MAC entity to respective RLC entities based at least in part on a logical channel prioritization, as described for example with reference to FIG. 4. In some examples, routing the PDUs from the MAC entity to respective RLC entities may include routing the PDUs from the MAC entity to respective radio bearers, with each radio bearer including a single RLC entity and a single PDCP entity. In some examples, the single RLC entity may be a receive RLC entity that is different from a transmit RLC entity for the single PDCP entity. In certain examples, the operation(s) at block 1810 may be performed using the MAC entity or MAC-to-RLC router described with reference to FIG. 9 or 10.

At block 1815, the method 1800 may include forwarding the PDUs from respective RLC entities to corresponding respective PDCP entities, as described for example with reference to FIG. 4. At least one of the respective RLC entities and corresponding respective PDCP entities may be dedicated to a single IP flow. In some examples, forwarding the PDUs from respective RLC entities to corresponding respective PDCP entities may include using matching sequence numbers for a same PDU at a respective RLC entity and a PDCP entity mapped to the respective RLC entity. In some examples, forwarding the PDUs from respective RLC entities to corresponding respective PDCP entities may include forwarding PDUs corresponding to a correlated portion of the one or more IP flows to one of the plurality of PDCP entities dedicated to the correlated portion of IP flows. In certain examples, the operation(s) at block 1815 may be performed using the RLC entities or RLC-to-PDCP routers described with reference to FIG. 9.

Figure 19:
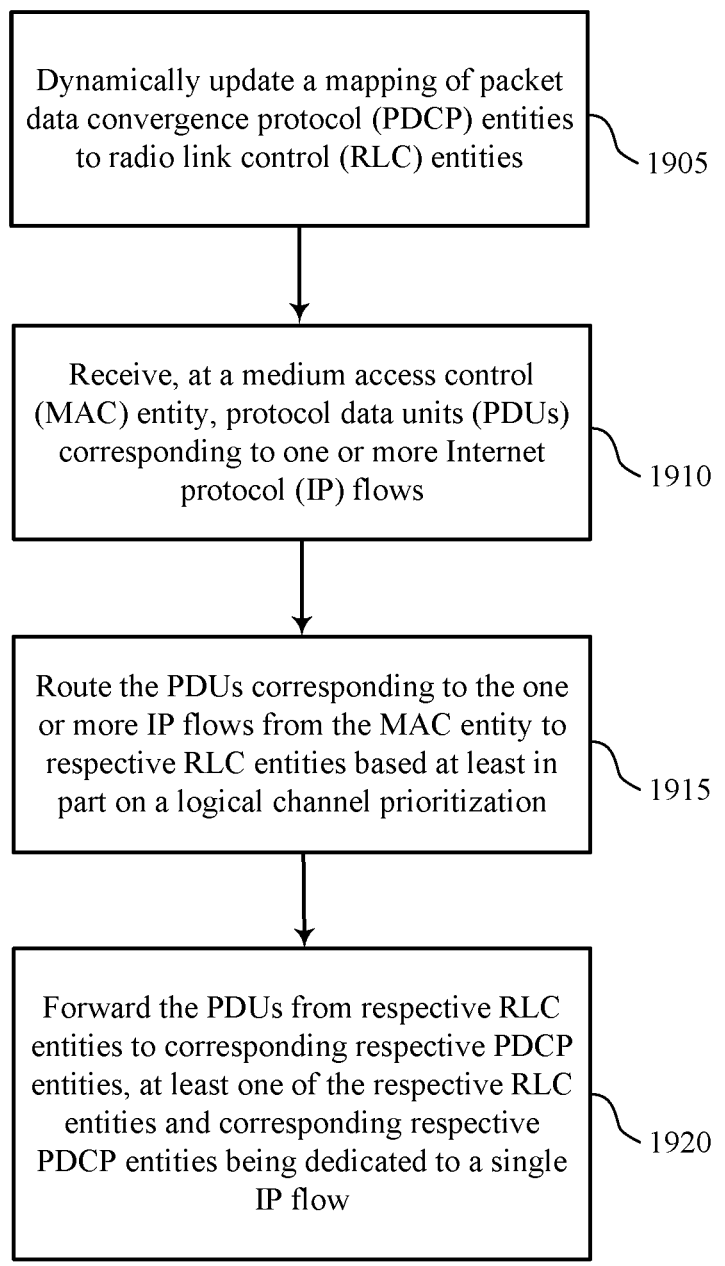

FIG. 19 is a flow chart illustrating an example of a method 1900 for wireless communication at a wireless device, in accordance with one or more aspects of the present disclosure. For clarity, the method 1900 is described below with reference to aspects of one or more of the UEs described with reference to FIG. 1 or 12, aspects of one or more of the network access devices described with reference to FIG. 1 or 13, aspects of one or more of the apparatuses described with reference to FIG. 8 or 9, or aspects of one or more of the wireless communication managers described with reference to FIG. 1, 8, 9, 10, 12, or 13. In some examples, a wireless device may execute one or more sets of codes to control the functional elements of the wireless device to perform the functions described below. Additionally or alternatively, the wireless device may perform one or more of the functions described below using special-purpose hardware.

At block 1905, the method 1900 may include dynamically updating a mapping of PDCP entities to RLC entities, as described for example with reference to FIG. 4. In certain examples, the operation(s) at block 1905 may be performed using the PDCP-to-RLC mapper described with reference to FIG. 10.

At block 1910, the method 1900 may include receiving, at a MAC entity, PDUs corresponding to one or more IP flows, as described for example with reference to FIG. 4. In certain examples, the operation(s) at block 1910 may be performed using the MAC entity described with reference to FIG. 9 or 10.

At block 1915, the method 1900 may include routing the PDUs corresponding to the one or more IP flows from the MAC entity to respective RLC entities based at least in part on a logical channel prioritization, as described for example with reference to FIG. 4. In certain examples, the operation(s) at block 1915 may be performed using the MAC entity or MAC-to-RLC router described with reference to FIG. 9 or 10.

At block 1920, the method 1900 may include forwarding the PDUs from respective RLC entities to corresponding respective PDCP entities, as described for example with reference to FIG. 4. At least one of the respective RLC entities and corresponding respective PDCP entities may be dedicated to a single IP flow. In certain examples, the operation(s) at block 1920 may be performed using the RLC entities or RLC-to-PDCP routers described with reference to FIG. 9.

Figure 20:
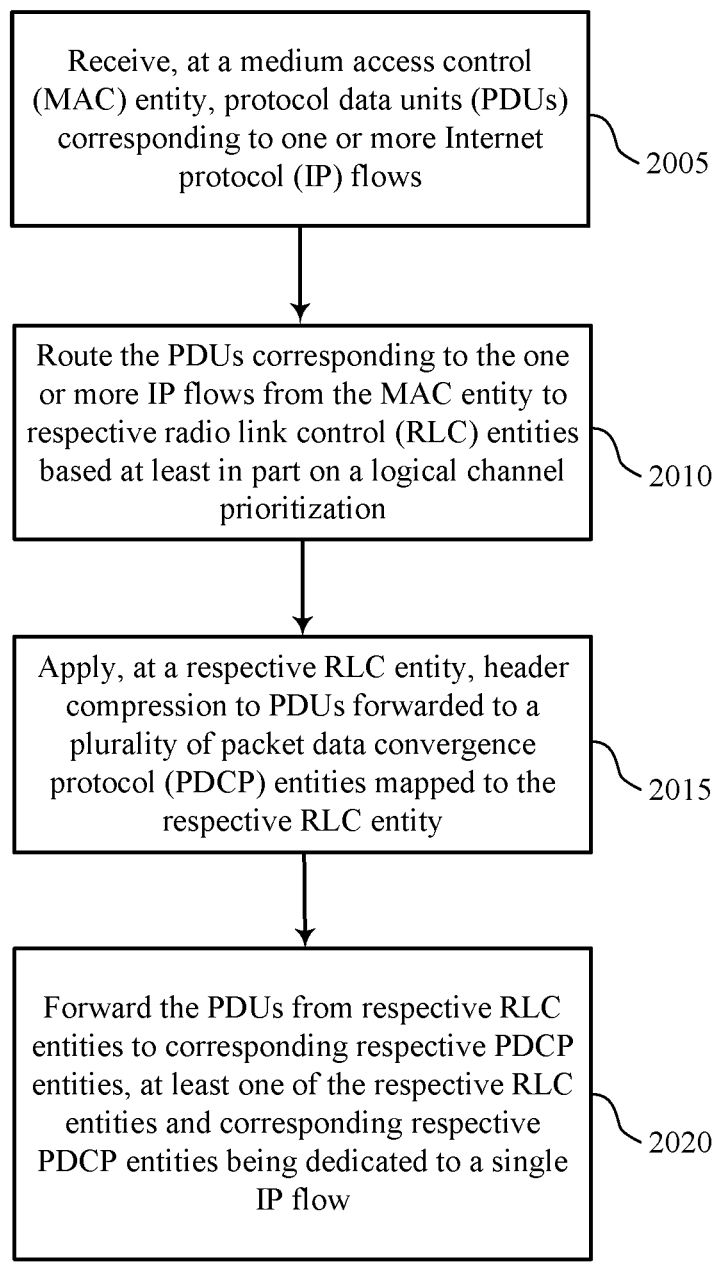

FIG. 20 is a flow chart illustrating an example of a method 2000 for wireless communication at a wireless device, in accordance with one or more aspects of the present disclosure. For clarity, the method 2000 is described below with reference to aspects of one or more of the UEs described with reference to FIG. 1 or 12, aspects of one or more of the network access devices described with reference to FIG. 1 or 13, aspects of one or more of the apparatuses described with reference to FIG. 8 or 9, or aspects of one or more of the wireless communication managers described with reference to FIG. 1, 8, 9, 10, 12, or 13. In some examples, a wireless device may execute one or more sets of codes to control the functional elements of the wireless device to perform the functions described below. Additionally or alternatively, the wireless device may perform one or more of the functions described below using special-purpose hardware.

At block 2005, the method 2000 may include receiving, at a MAC entity, PDUs corresponding to one or more IP flows, as described for example with reference to FIG. 4. In certain examples, the operation(s) at block 2005 may be performed using the MAC entity described with reference to FIG. 9 or 10.

At block 2010, the method 2000 may include routing the PDUs corresponding to the one or more IP flows from the MAC entity to respective RLC entities based at least in part on a logical channel prioritization, as described for example with reference to FIG. 4. In certain examples, the operation(s) at block 2010 may be performed using the MAC entity or MAC-to-RLC router described with reference to FIG. 9 or 10.

At block 2015, the method 2000 may include applying, at a respective RLC entity, header compression to PDUs forwarded to the respective PDCP entity mapped to the respective RLC entity, as described for example with reference to FIG. 4. In certain examples, the operation(s) at block 2015 may be performed using the RLC entities described with reference to FIG. 9 or 10, or the header compressor described with reference to FIG. 10.

At block 2020, the method 2000 may include forwarding the PDUs from respective RLC entities to corresponding respective PDCP entities, as described for example with reference to FIG. 4. At least one of the respective RLC entities and corresponding respective PDCP entities may be dedicated to a single IP flow. In certain examples, the operation(s) at block 2020 may be performed using the RLC entities or RLC-to-PDCP routers described with reference to FIG. 9.

Figure 21:
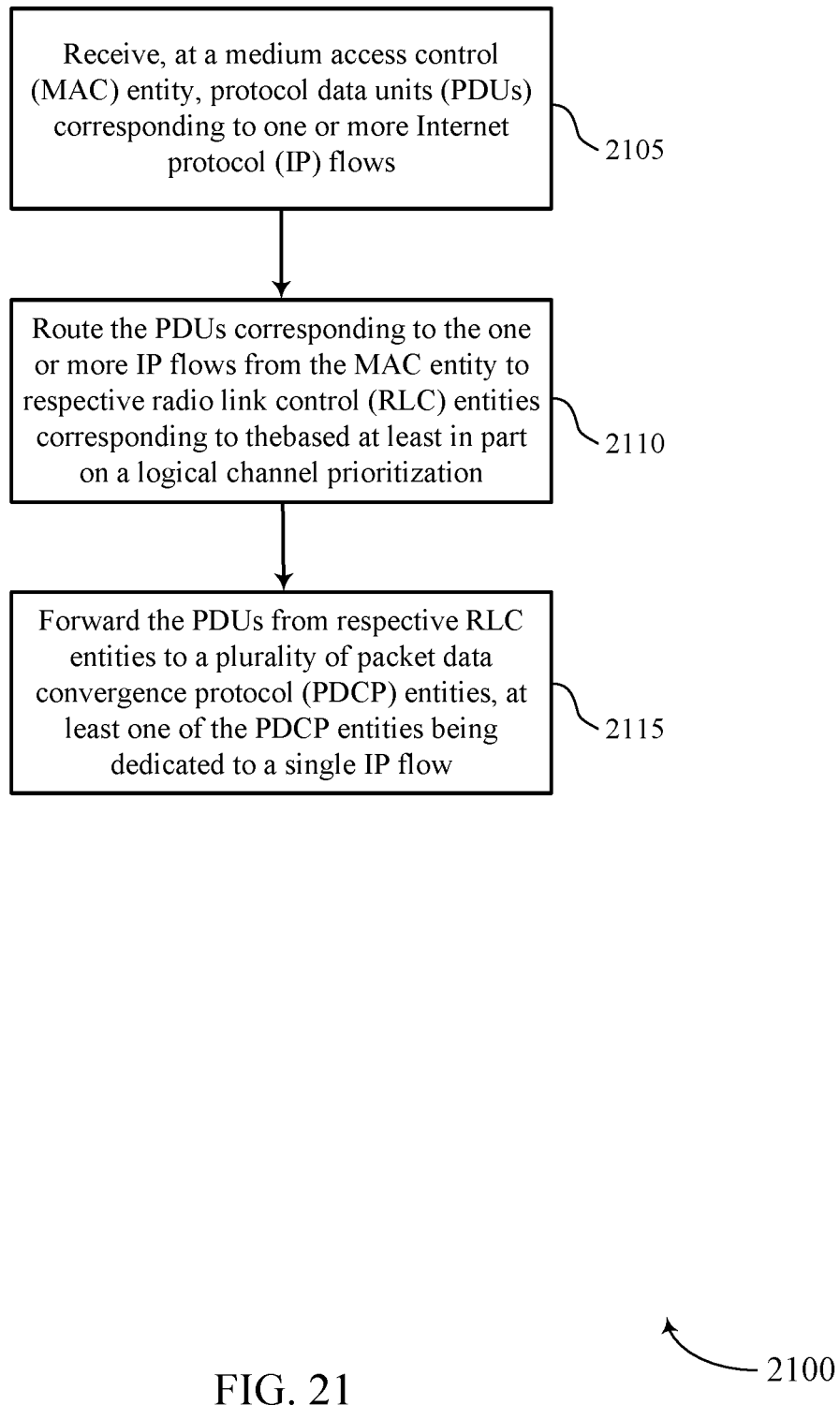

FIG. 21 is a flow chart illustrating an example of a method 2100 for wireless communication at a wireless device, in accordance with one or more aspects of the present disclosure. For clarity, the method 2100 is described below with reference to aspects of one or more of the UEs described with reference to FIG. 1 or 12, aspects of one or more of the network access devices described with reference to FIG. 1 or 13, aspects of one or more of the apparatuses described with reference to FIG. 8 or 9, or aspects of one or more of the wireless communication managers described with reference to FIG. 1, 8, 9, 10, 12, or 13. In some examples, a wireless device may execute one or more sets of codes to control the functional elements of the wireless device to perform the functions described below. Additionally or alternatively, the wireless device may perform one or more of the functions described below using special-purpose hardware.

At block 2105, the method 2100 may include receiving, at a MAC entity, PDUs corresponding to one or more IP flows, as described for example with reference to FIG. 4 or 6. In certain examples, the operation(s) at block 2105 may be performed using the MAC entity described with reference to FIG. 9 or 10.

At block 2110, the method 2100 may include routing the PDUs corresponding to the one or more IP flows from the MAC entity to respective RLC entities based at least in part on a logical channel prioritization, as described for example with reference to FIG. 4 or 6. In certain examples, the operation(s) at block 2110 may be performed using the MAC entity or MAC-to-RLC router described with reference to FIG. 9 or 10.

At block 2115, the method 2100 may include forwarding the PDUs from respective RLC entities to a plurality of PDCP entities, at least one of the PDCP entities being dedicated to a single IP flow, as described for example with reference to FIG. 4 or 6. In certain examples, the operation(s) at block 2115 may be performed using the RLC entities or RLC-to-PDCP routers described with reference to FIG. 9.

Figure 22:
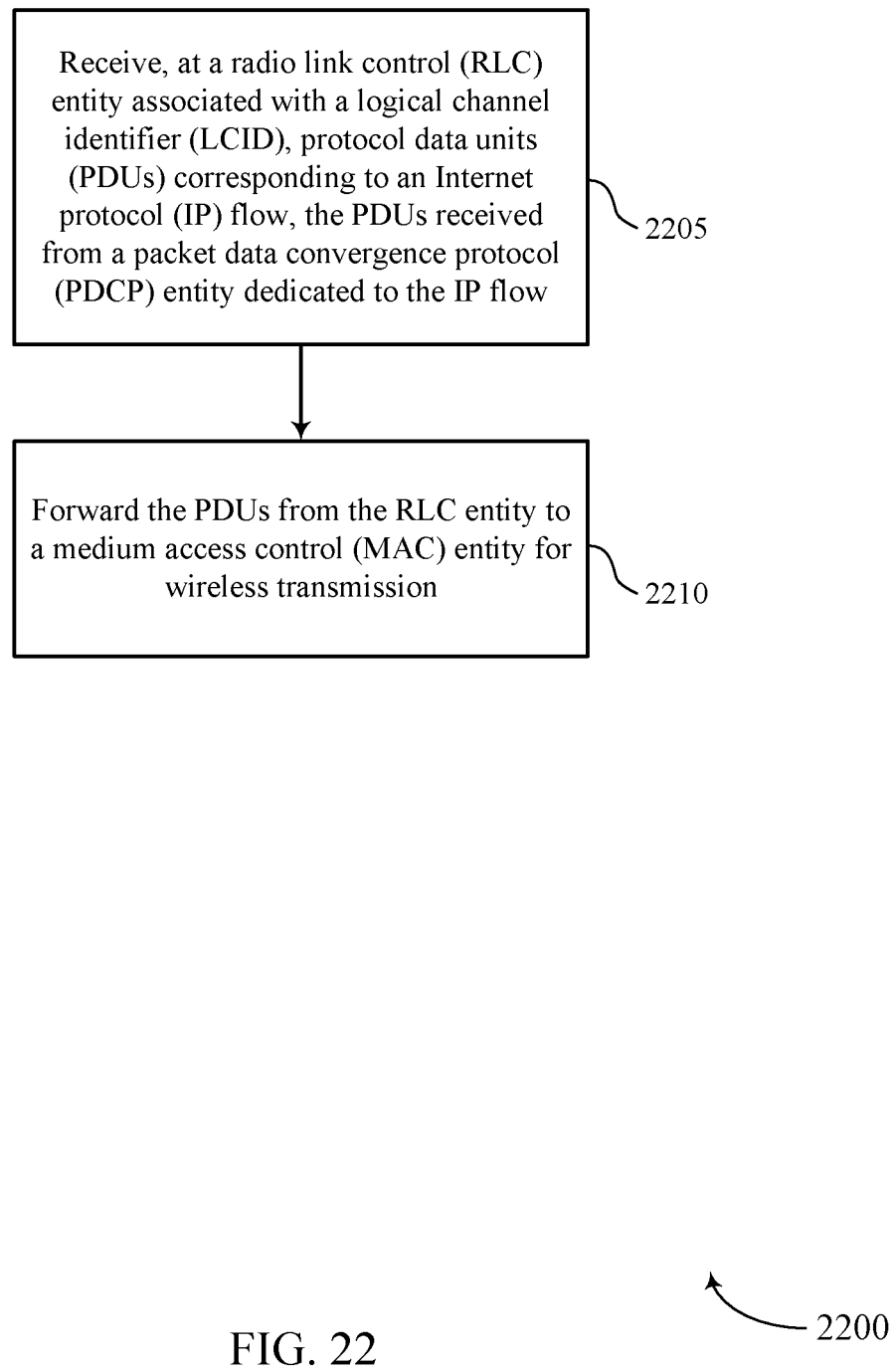

FIG. 22 is a flow chart illustrating an example of a method 2200 for wireless communication at a wireless device, in accordance with one or more aspects of the present disclosure. For clarity, the method 2200 is described below with reference to aspects of one or more of the UEs described with reference to FIG. 1 or 12, aspects of one or more of the network access devices described with reference to FIG. 1 or 13, aspects of one or more of the apparatuses described with reference to FIG. 8 or 9, or aspects of one or more of the wireless communication managers described with reference to FIG. 1, 8, 9, 11, 12, or 13. In some examples, a wireless device may execute one or more sets of codes to control the functional elements of the wireless device to perform the functions described below. Additionally or alternatively, the wireless device may perform one or more of the functions described below using special-purpose hardware.

At block 2205, the method 2200 may include receiving, at a RLC entity associated with a LCID, PDUs corresponding to an IP flow, as described for example with reference to FIG. 5 or 7. The PDUs may be received from a PDCP entity dedicated to the IP flow. In some examples, the RLC entity and the PDCP entity may be mapped together as a radio bearer. In some examples, the RLC entity may be mapped together with the PDCP entity and other PDCP entities as a radio bearer. In some examples, receiving, at the RLC entity, PDUs corresponding to an IP flow may include receiving concatenated PDUs from the PDCP entity. In certain examples, the operation(s) at block 2205 may be performed using a RLC entity described with reference to FIG. 9 or 11.

At block 2210, the method 2200 may include forwarding the PDUs from the RLC entity to a MAC entity for wireless transmission, as described for example with reference to FIG. 5 or 7. In certain examples, the operation(s) at block 2210 may be performed using a RLC entity described with reference to FIG. 9 or 11, or a RLC-to-MAC router described with reference to FIG. 11.

Figure 23:
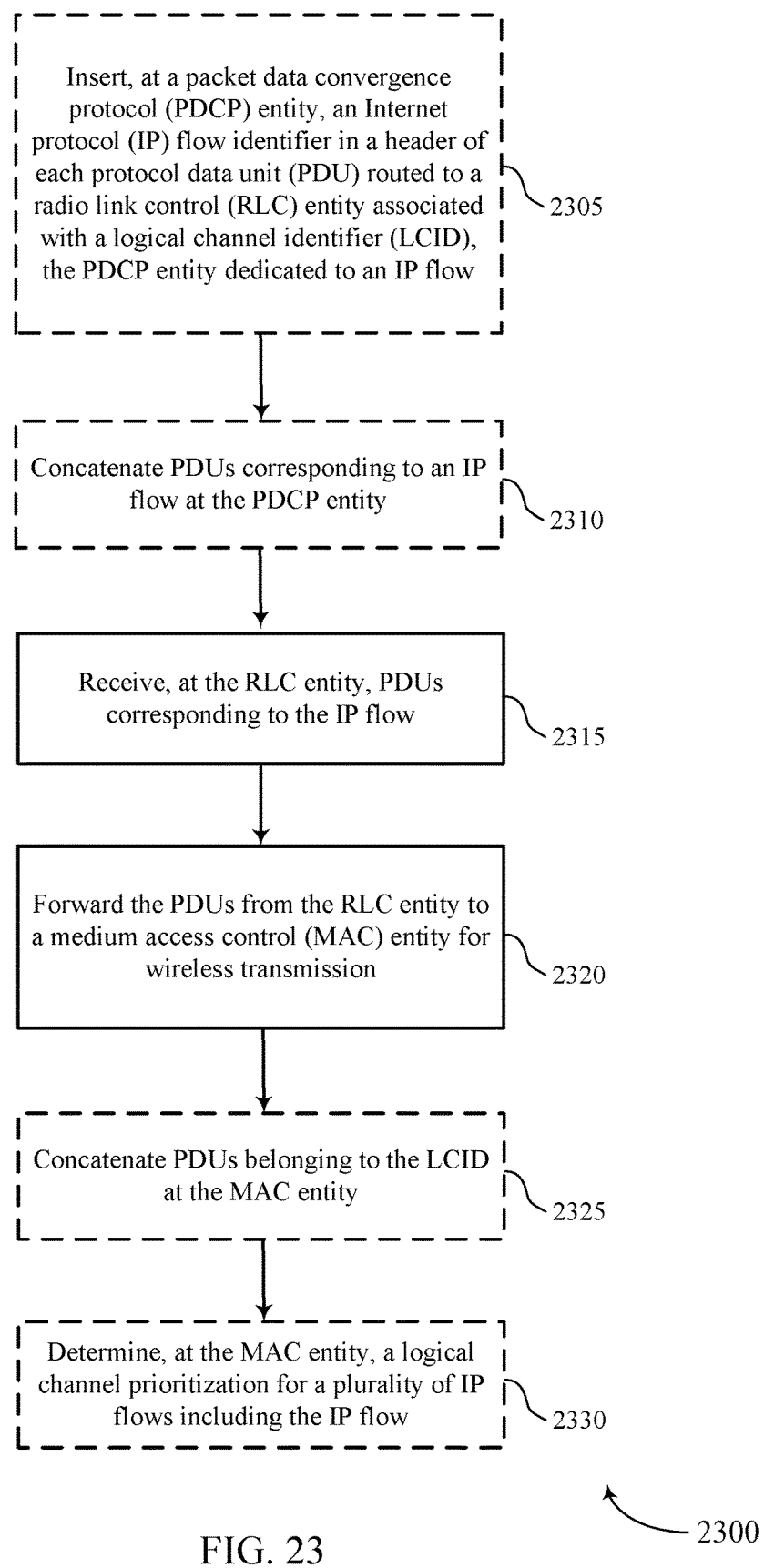

FIG. 23 is a flow chart illustrating an example of a method 2300 for wireless communication at a wireless device, in accordance with one or more aspects of the present disclosure. For clarity, the method 2300 is described below with reference to aspects of one or more of the UEs described with reference to FIG. 1 or 12, aspects of one or more of the network access devices described with reference to FIG. 1 or 13, aspects of one or more of the apparatuses described with reference to FIG. 8 or 9, or aspects of one or more of the wireless communication managers described with reference to FIG. 1, 8, 9, 11, 12, or 13. In some examples, a wireless device may execute one or more sets of codes to control the functional elements of the wireless device to perform the functions described below. Additionally or alternatively, the wireless device may perform one or more of the functions described below using special-purpose hardware.

At block 2305, the method 2300 may optionally include inserting, at a PDCP entity, an IP flow identifier in a header of each PDU routed to a RLC entity associated with a LCID, as described for example with reference to FIG. 5 or 7. The PDCP entity may be dedicated to an IP flow. In certain examples, the operation(s) at block 2305 may be performed using a PDCP entity described with reference to FIG. 9 or 11, or a IP flow identifier described with reference to FIG. 11.

At block 2310, the method 2300 may optionally include concatenating PDUs corresponding to the IP flow at the PDCP entity, as described for example with reference to FIG. 5 or 7. In certain examples, the operation(s) at block 2310 may be performed using a PDCP entity described with reference to FIG. 9 or 11, or a PDCP concatenator described with reference to FIG. 11.

At block 2315, the method 2300 may include receiving, at the RLC entity, PDUs corresponding to an IP flow, as described for example with reference to FIG. 5 or 7. In certain examples, the operation(s) at block 2315 may be performed using a RLC entity described with reference to FIG. 9 or 11.

At block 2320, the method 2300 may include forwarding the PDUs from the RLC entity to a MAC entity for wireless transmission, as described for example with reference to FIG. 5 or 7. In certain examples, the operation(s) at block 2320 may be performed using a RLC entity described with reference to FIG. 9 or 11, or a RLC-to-MAC router described with reference to FIG. 11.

At block 2325, the method 2300 may optionally include concatenating PDUs belonging to the LCID at the MAC entity, as described for example with reference to FIG. 5 or 7. In certain examples, the operation(s) at block 2325 may be performed using the MAC entity described with reference to FIG. 9 or 11, or the MAC concatenator described with reference to FIG. 11.

At block 2330, the method 2300 may optionally include determining, at the MAC entity, a logical channel prioritization for a plurality of IP flows including the IP flow, as described for example with reference to FIG. 5 or 7. In certain examples, the operation(s) at block 2330 may be performed using the MAC entity described with reference to FIG. 9 or 11, or the logical channel prioritizer described with reference to FIG. 11.

The methods 1400, 1500, 1600, 1700, 1800, 1900, 2000, 2100, 2200, and 2300 described with reference to FIGS. 14, 15, 16, 17, 18, 19, 20, 21, 22, and 23 may provide for wireless communication. It should be noted that the methods 1400, 1500, 1600, 1700, 1800, 1900, 2000, 2100, 2200, and 2300 are example implementations of some of the techniques described in the present disclosure, and the operations of the methods 1400, 1500, 1600, 1700, 1800, 1900, 2000, 2100, 2200, and 2300 may be rearranged, combined with other operations of the same or different method, or otherwise modified, such that other implementations are possible. Operations may also be added to the methods 1400, 1500, 1600, 1700, 1800, 1900, 2000, 2100, 2200, and 2300.

Figure 24:
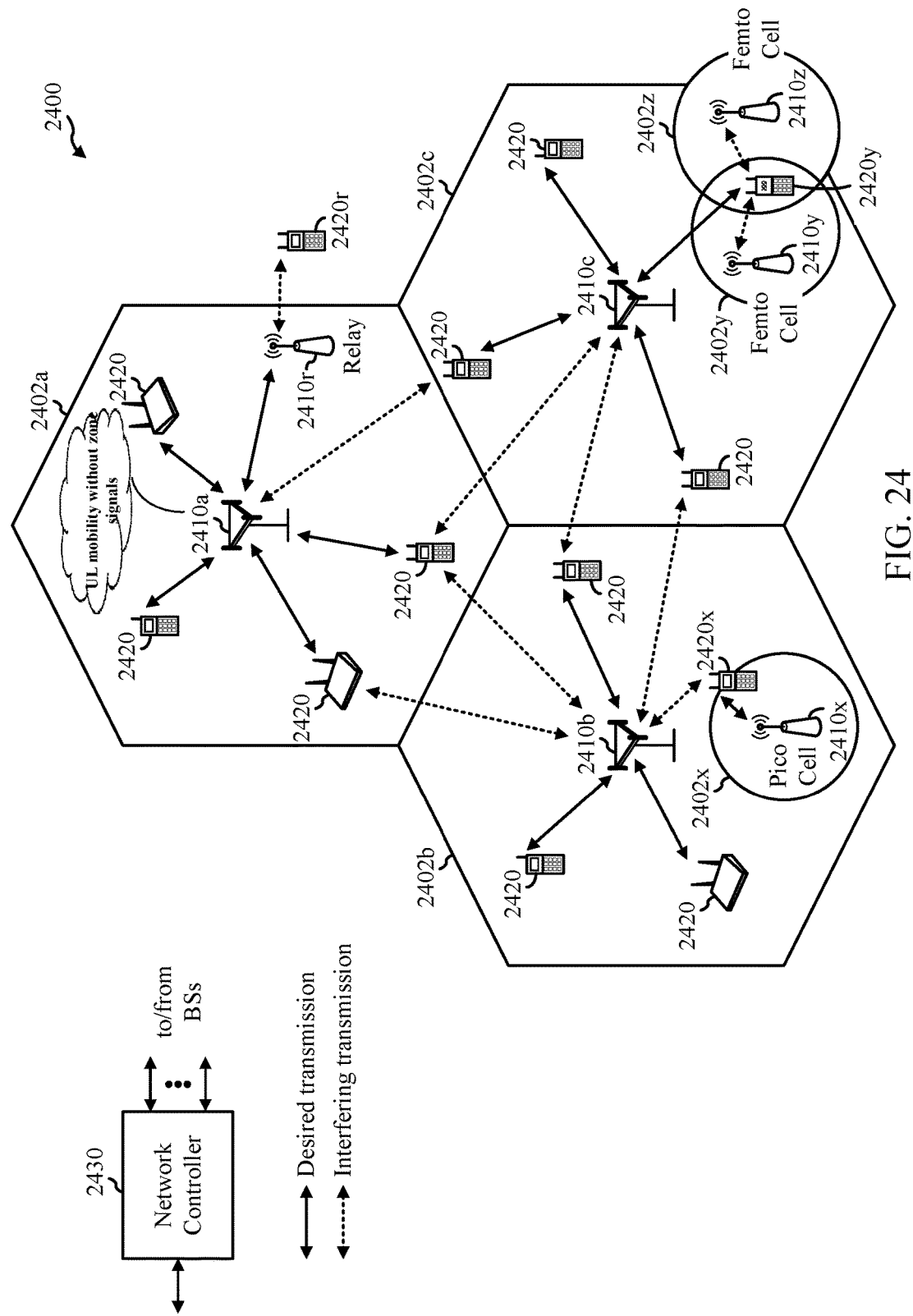
FIG. 24 is a block diagram conceptually illustrating an example telecommunications system, in accordance with one or more aspects of the present disclosure.

FIG. 24 illustrates an example wireless network 2400, such as a new radio (NR) or 5G network, in which aspects of the present disclosure may be performed.

As illustrated in FIG. 24, the wireless network 2400 may include a number of BSs 2410 and other network entities. A BS may be a station that communicates with UEs. Each BS 2410 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 2400 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 24, the BSs 2410a, 2410b and 2410c may be macro BSs for the macro cells 2402a, 2402b and 2402c, respectively. The BS 2410x may be a pico BS for a pico cell 2402x. The BSs 2410y and 2410z may be femto BS for the femto cells 2402y and 2402z, respectively. A BS may support one or multiple (e.g., three) cells.

The wireless network 2400 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 24, a relay station 2410r may communicate with the BS 2410a and a UE 2420r in order to facilitate communication between the BS 2410a and the UE 2420r. A relay station may also be referred to as a relay BS, a relay, etc.

The wireless network 2400 may be a heterogeneous network that includes BSs of different types, e.g., macro BS, pico BS, femto BS, relays, etc. These different types of BSs may have different transmit power levels, different coverage areas, and different impact on interference in the wireless network 2400. For example, macro BS may have a high transmit power level (e.g., 20 Watts) whereas pico BS, femto BS, and relays may have a lower transmit power level (e.g., 1 Watt).

The wireless network 2400 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 2430 may be coupled to a set of BSs and provide coordination and control for these BSs. The network controller 2430 may communicate with the BSs 2410 via a backhaul. The BSs 2410 may also communicate with one another, e.g., directly or indirectly via wireless or wireline backhaul.

The UEs 2420 (e.g., 2420x, 2420y, etc.) may be dispersed throughout the wireless network 2400, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a health-care device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 24, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 29 and 30. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity (DC), but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 25:
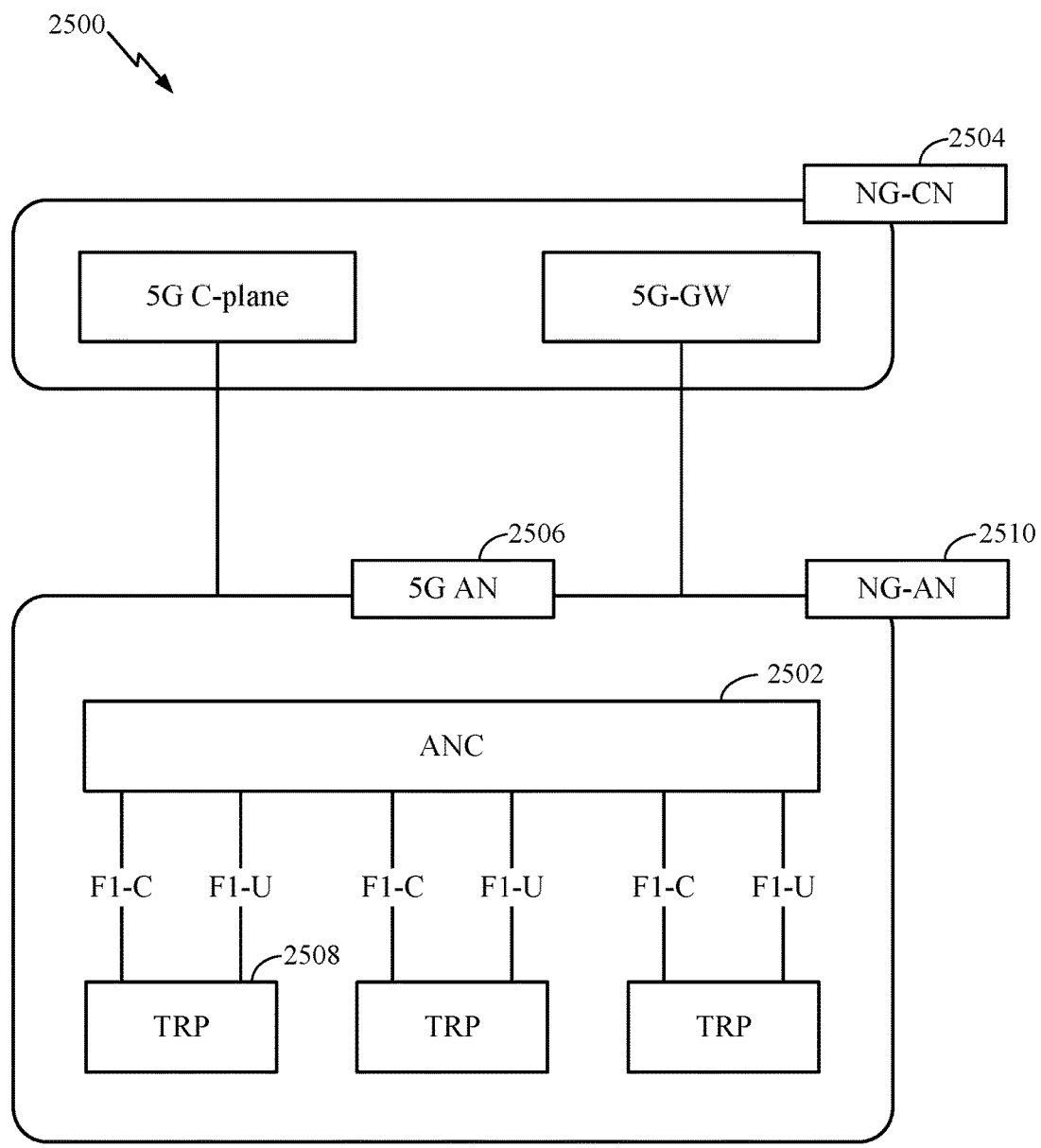
FIG. 25 is a block diagram illustrating an example logical architecture of a distributed radio access network (RAN), in accordance with one or more aspects of the present disclosure.

FIG. 25 illustrates an example logical architecture of a distributed RAN 2500, which may be implemented in the wireless communication system illustrated in FIG. 24. A 5G access node 2506 may include an access node controller (ANC) 2502. The ANC may be a central unit (CU) of the distributed RAN 2500. The backhaul interface to the next generation core network (NG-CN) 2504 may terminate at the ANC. The backhaul interface to neighboring next generation access nodes (NG-ANs) may terminate at the ANC.

The ANC may include one or more TRPs 2508 (which may also be referred to as BSs, NR BSs, Node Bs, 5G NBs, APs, gNBs, or some other term). As described above, a TRP may be used interchangeably with "cell."

The TRPs 2508 may be a DU. The TRPs may be connected to one ANC (ANC 2502) or more than one ANC (not illustrated). For example, for RAN sharing, radio as a service (RaaS), and service specific AND deployments, the TRP may be connected to more than one ANC. A TRP may include one or more transmitters, receivers, and/or antenna ports. The TRPs may be configured to individually (e.g., dynamic selection) or jointly (e.g., joint transmission) serve traffic to a UE.

The local architecture 2500 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 2510 may support dual connectivity with NR. The NG-AN may share a common fronthaul for LTE and NR.

The architecture may enable cooperation between and among TRPs 2508. For example, cooperation may be preset within a TRP and/or across TRPs via the ANC 2502. According to aspects, no inter-TRP interface may be needed/present.

According to aspects, a dynamic configuration of split logical functions may be present within the architecture 2500. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 2502) and/or one or more distributed units (e.g., one or more TRPs 2508).

Figure 26:
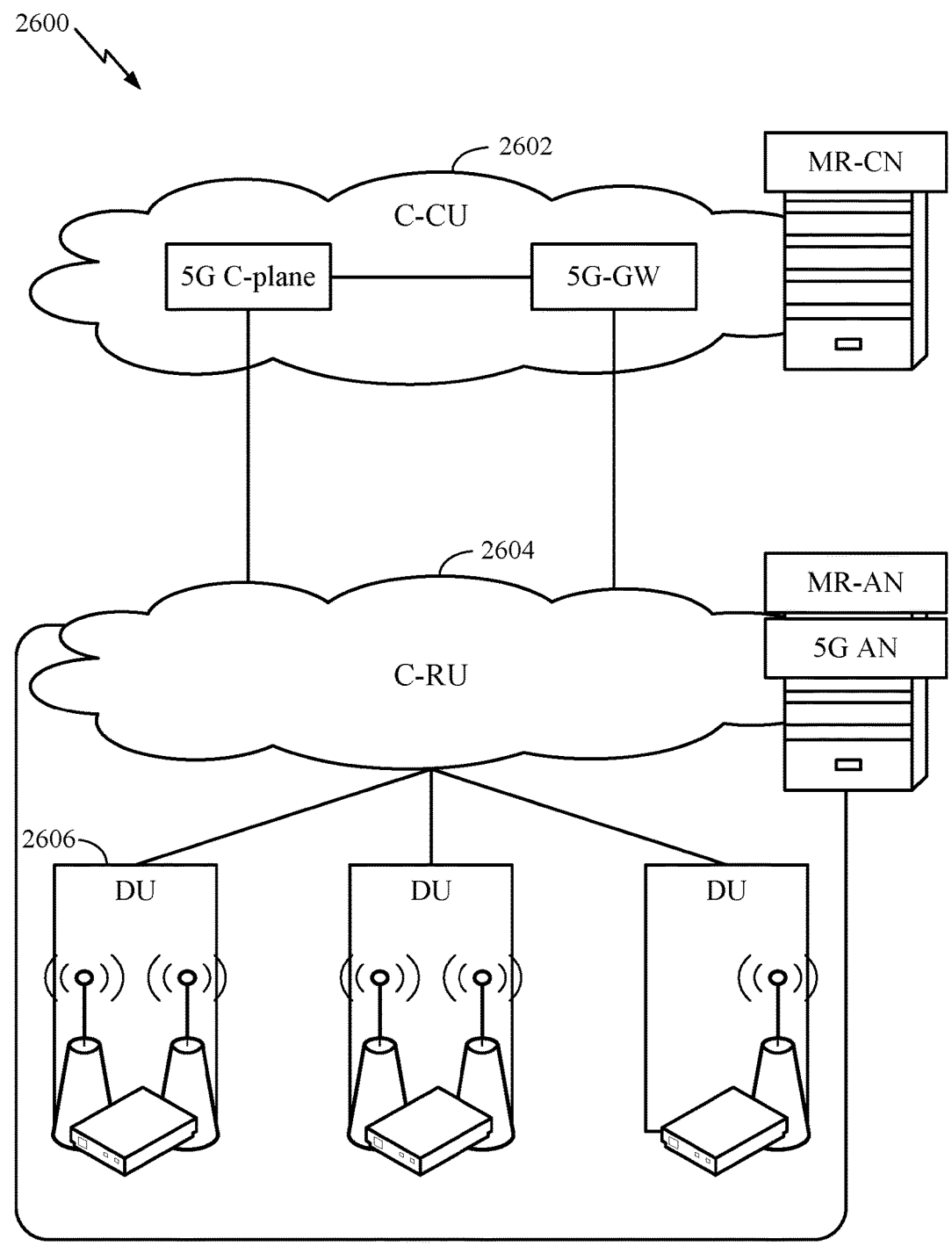
FIG. 26 is a diagram illustrating an example physical architecture of a distributed RAN, in accordance with one or more aspects of the present disclosure.

FIG. 26 illustrates an example physical architecture of a distributed RAN 2600, according to aspects of the present disclosure. A centralized core network unit (C-CU) 2602 may host core network functions. The C-CU may be centrally deployed. C-CU functionality may be offloaded (e.g., to advanced wireless services (AWS)), in an effort to handle peak capacity.

A centralized RAN unit (C-RU) 2604 may host one or more ANC functions. Optionally, the C-RU may host core network functions locally. The C-RU may have distributed deployment. The C-RU may be closer to the network edge.

A DU 2606 may host one or more TRPs (edge node (EN), an edge unit (EU), a radio head (RH), a smart radio head (SRH), or the like). The DU may be located at edges of the network with radio frequency (RF) functionality.

Figure 27:
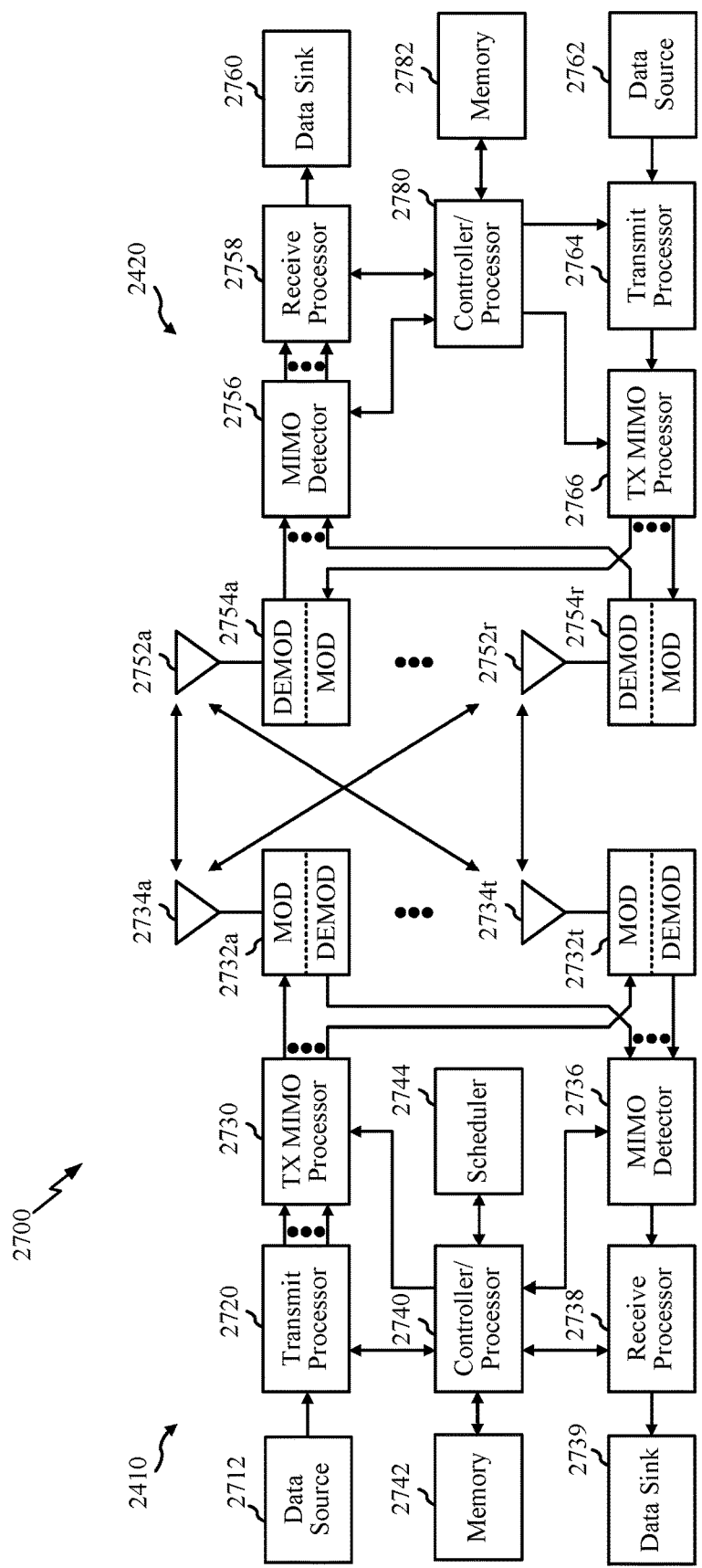
FIG. 27 is a block diagram conceptually illustrating a design of an example base station and user equipment (UE), in accordance with one or more aspects of the present disclosure.

FIG. 27 illustrates example components of the BS 2410 and UE 2420 illustrated in FIG. 24, which may be used to implement aspects of the present disclosure. As described above, the BS may include a TRP. One or more components of the BS 2410 and UE 2420 may be used to practice aspects of the present disclosure. For example, antennas 2752, Tx/Rx 222, processors 2766, 2758, 2764, and/or controller/processor 2780 of the UE 2420 and/or antennas 2734, processors 2760, 2720, 2738, and/or controller/processor 2740 of the BS 2410 may be used to perform the operations described herein and illustrated with reference to FIGS. 35 and 36.

FIG. 27 shows a block diagram of a design of a BS 2410 and a UE 2420, which may be one of the BSs and one of the UEs in FIG. 24. For a restricted association scenario, the base station 2410 may be the macro BS 2410*c* in FIG. 24, and the UE 2420 may be the UE 2420*y*. The base station 2410 may also be a base station of some other type. The base station 2410 may be equipped with antennas 2734*a* through 2734*t*, and the UE 2420 may be equipped with antennas 2752*a* through 2752*r*.

At the base station 2410, a transmit processor 2720 may receive data from a data source 2712 and control information from a controller/processor 2740. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 2720 may process (e.g., encode and symbol map) the data and control information to obtain data symbols and control symbols, respectively. The processor 2720 may also generate reference symbols, e.g., for the PSS, SSS, and cell-specific reference signal. A transmit (TX) multiple-input multiple-output (MIMO) processor 2730 may perform spatial processing (e.g., precoding) on the data symbols, the control symbols, and/or the reference symbols, if applicable, and may provide output symbol streams to the modulators (MODs) 2732*a* through 2732*t*. For example, the TX MIMO processor 2730 may perform certain aspects described herein for RS multiplexing. Each modulator 2732 may process a respective output symbol stream (e.g., for OFDM, etc.) to obtain an output sample stream. Each modulator 2732 may further process (e.g., convert to analog, amplify, filter, and upconvert) the output sample stream to obtain a downlink signal. Downlink signals from modulators 2732*a* through 2732*t* may be transmitted via the antennas 2734*a* through 2734*t*, respectively.

At the UE 2420, the antennas 2752*a* through 2752*r* may receive the downlink signals from the base station 2410 and may provide received signals to the demodulators (DE-MODs) 2754*a* through 2754*r*, respectively. Each demodulator 2754 may condition (e.g., filter, amplify, downconvert, and digitize) a respective received signal to obtain input samples. Each demodulator 2754 may further process the input samples (e.g., for OFDM, etc.) to obtain received symbols. A MIMO detector 2756 may obtain received symbols from all the demodulators 2754*a* through 2754*r*, perform MIMO detection on the received symbols if applicable, and provide detected symbols. For example, MIMO detector 2756 may provide detected RS transmitted using techniques described herein. A receive processor 2758 may process (e.g., demodulate, deinterleave, and decode) the detected symbols, provide decoded data for the UE 2420 to a data sink 2760, and provide decoded control information to a controller/processor 2780. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 2732 may be in the distributed units.

On the uplink, at the UE 2420, a transmit processor 2764 may receive and process data (e.g., for the Physical Uplink Shared Channel (PUSCH)) from a data source 2762 and control information (e.g., for the Physical Uplink Control Channel (PUCCH) from the controller/processor 2780. The transmit processor 2764 may also generate reference symbols for a reference signal. The symbols from the transmit processor 2764 may be precoded by a TX MIMO processor 2766 if applicable, further processed by the demodulators 2754*a* through 2754*r* (e.g., for SC-FDM, etc.), and transmitted to the base station 2410. At the BS 2410, the uplink signals from the UE 2420 may be received by the antennas 2734, processed by the modulators 2732, detected by a MIMO detector 2736 if applicable, and further processed by a receive processor 2738 to obtain decoded data and control information sent by the UE 2420. The receive processor 2738 may provide the decoded data to a data sink 2739 and the decoded control information to the controller/processor 2740.

The controllers/processors 2740 and 2780 may direct the operation at the base station 2410 and the UE 2420, respectively. The processor 2740 and/or other processors and modules at the base station 2410 may perform or direct the processes for the techniques described herein. The processor 2780 and/or other processors and modules at the UE 2420 may also perform or direct processes for the techniques described herein. The memories 2742 and 2782 may store data and program codes for the BS 2410 and the UE 2420, respectively. A scheduler 2744 may schedule UEs for data transmission on the downlink and/or uplink.

Figure 28:
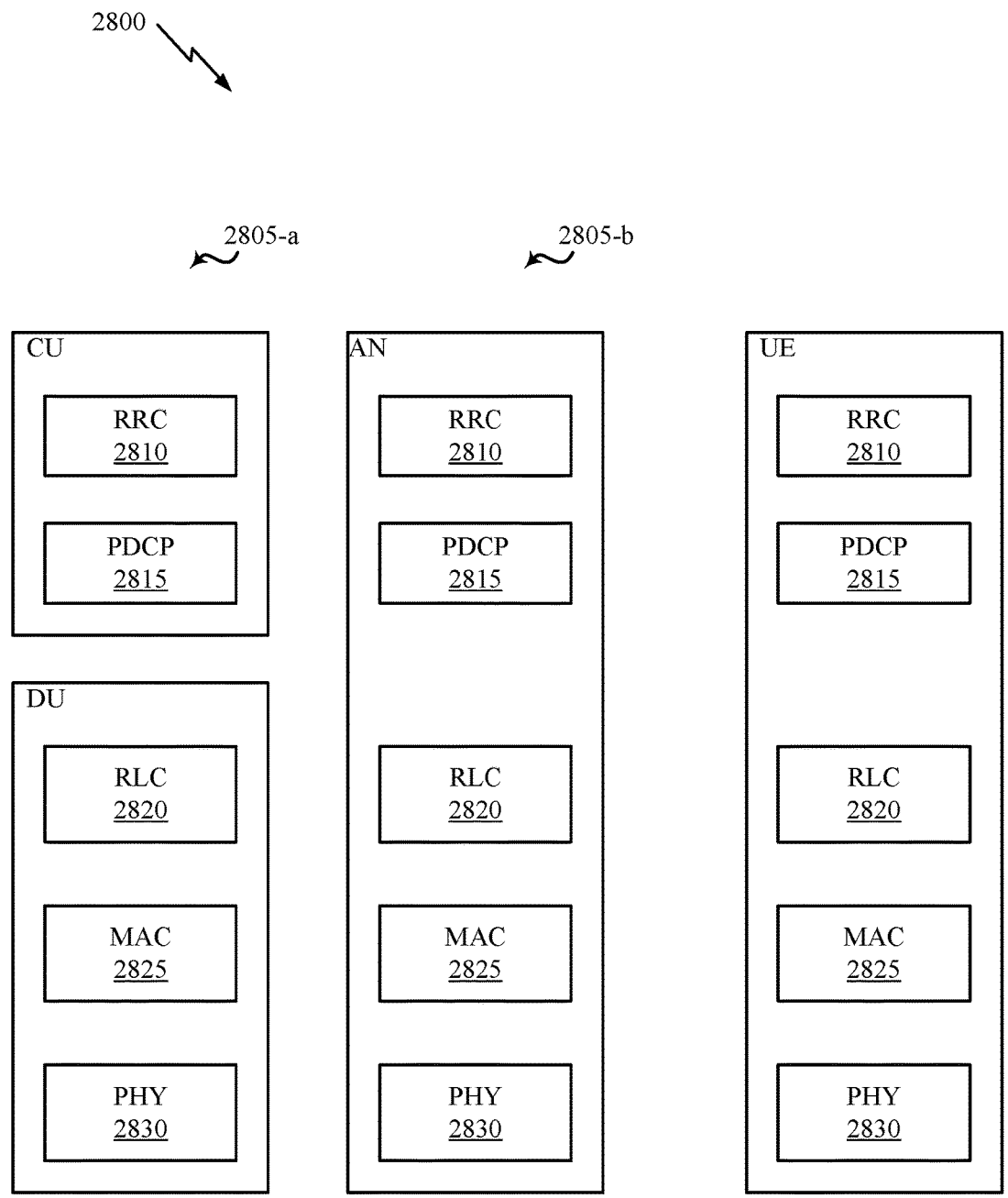
FIG. 28 is a diagram showing examples for implementing a communication protocol stack, in accordance with one or more aspects of the present disclosure.

FIG. 28 illustrates a diagram 2800 showing examples for implementing a communications protocol stack, according to aspects of the present disclosure. The illustrated communications protocol stacks may be implemented by devices operating in a in a 5G system (e.g., a system that supports uplink-based mobility). Diagram 2800 illustrates a communications protocol stack including a Radio Resource Control (RRC) layer 2810, a Packet Data Convergence Protocol (PDCP) layer 2815, a Radio Link Control (RLC) layer 2820, a Medium Access Control (MAC) layer 2825, and a Physical (PHY) layer 2830. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 2805-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 2805-*a*, an RRC layer 2810 and a PDCP layer 2815 may be implemented by the central unit, and an RLC layer 2820, a MAC layer 2825, and a PHY layer 2830 may be implemented by the DU. In various examples the CU and the DU may be collocated or non-collocated. The first option 2805-*a* may be useful in a macro cell, micro cell, or pico cell deployment.

A second option 2805-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 2810, the PDCP layer 2815, the RLC layer 2820, the MAC layer 2825, and the PHY layer 2830 may each be implemented by the AN. The second option 2805-*b* may be useful in a femto cell deployment.

Regardless of whether a network access device implements part or all of a protocol stack, a UE may implement an entire protocol stack (e.g., the RRC layer 2810, the PDCP layer 2815, the RLC layer 2820, the MAC layer 2825, and the PHY layer 2830).

Figure 29:
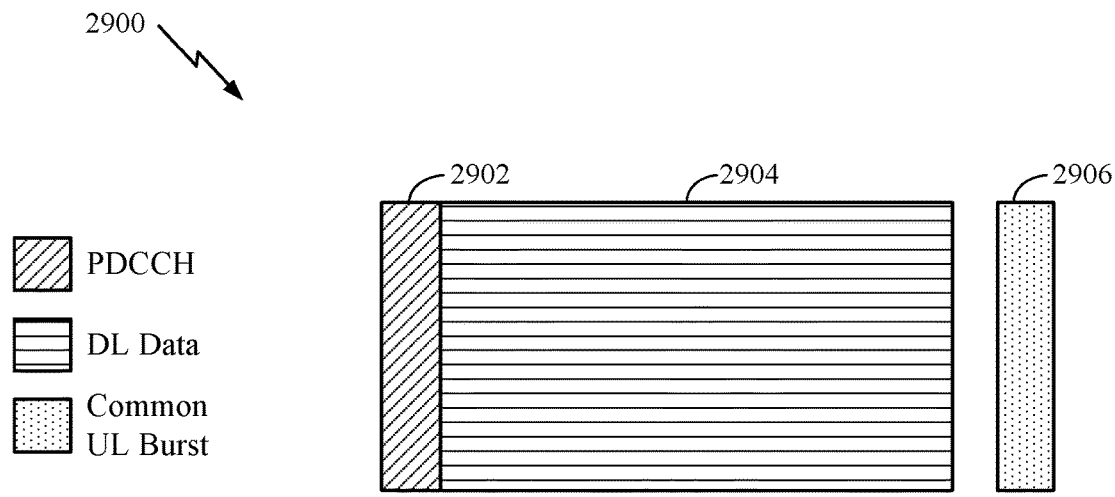
FIG. 29 illustrates an example of a DL-centric subframe, in accordance with one or more aspects of the present disclosure.

FIG. 29 is a diagram 2900 showing an example of a DL-centric subframe. The DL-centric subframe may include a control portion 2902. The control portion 2902 may exist in the initial or beginning portion of the DL-centric subframe. The control portion 2902 may include various scheduling information and/or control information corresponding to various portions of the DL-centric subframe. In some configurations, the control portion 2902 may be a physical DL control channel (PDCCH), as indicated in FIG. 29. The DL-centric subframe may also include a DL data portion 2904. The DL data portion 2904 may sometimes be referred to as the payload of the DL-centric subframe. The DL data portion 2904 may include the communication resources utilized to communicate DL data from the scheduling entity (e.g., UE or BS) to the subordinate entity (e.g., UE). In some configurations, the DL data portion 2904 may be a physical DL shared channel (PDSCH).

The DL-centric subframe may also include a common UL portion 2906. The common UL portion 2906 may sometimes be referred to as an UL burst, a common UL burst, and/or various other suitable terms. The common UL portion 2906 may include feedback information corresponding to various other portions of the DL-centric subframe. For example, the common UL portion 2906 may include feedback information corresponding to the control portion 2902. Non-limiting examples of feedback information may include an ACK signal, a NACK signal, a HARQ indicator, and/or various other suitable types of information. The common UL portion 2906 may include additional or alternative information, such as information pertaining to random access channel (RACH) procedures, scheduling requests (SRs), and various other suitable types of information. As illustrated in FIG. 29, the end of the DL data portion 2904 may be separated in time from the beginning of the common UL portion 2906. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 30:
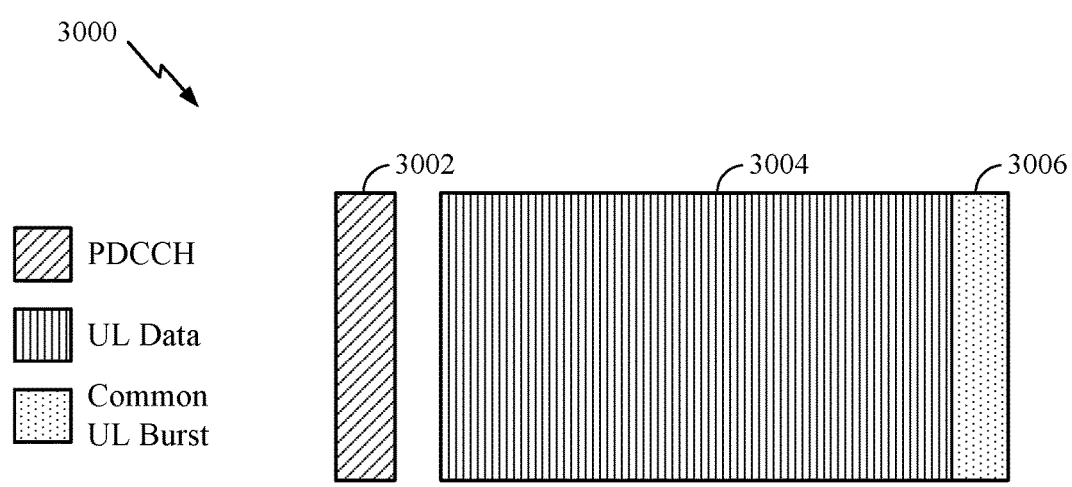
FIG. 30 illustrates an example of an UL-centric subframe, in accordance with one or more aspects of the present disclosure.

FIG. 30 is a diagram 3000 showing an example of an UL-centric subframe. The UL-centric subframe may include a control portion 3002. The control portion 3002 may exist in the initial or beginning portion of the UL-centric subframe. The control portion 3002 in FIG. 30 may be similar to the control portion described above with reference to FIG. 29. The UL-centric subframe may also include an UL data portion 3004. The UL data portion 3004 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 3002 may be a physical DL control channel (PDCCH).

As illustrated in FIG. 30, the end of the control portion 3002 may be separated in time from the beginning of the UL data portion 3004. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 3006. The common UL portion 3006 in FIG. 30 may be similar to the common UL portion 3006 described above with reference to FIG. 30. The common UL portion 3006 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

A number of options are available for delivery of a RRC message from a SN to a UE. For example, the UE may be configured to establish a signaling radio bearer (SRB) in a secondary cell group (SCG) to enable RRC PDUs for the secondary node to be sent directly between the UE and the secondary node. RRC PDUs for the secondary node may be transported directly to the UE for the secondary node RRC reconfiguration not requiring any coordination with the master node. Alternatively, it may be delivered embedded within RRC PDUs generated by the master node, which is up to the network implementation. Measurement reporting for mobility within the secondary node may be done directly from the UE to the secondary node if an SCG SRB is configured. Split SRB may be supported for DC between LTE and NR no matter which RAT is the master. In other words, C-plane packet duplication may be supported in LTE/NR PDCP.

Figure 31A:
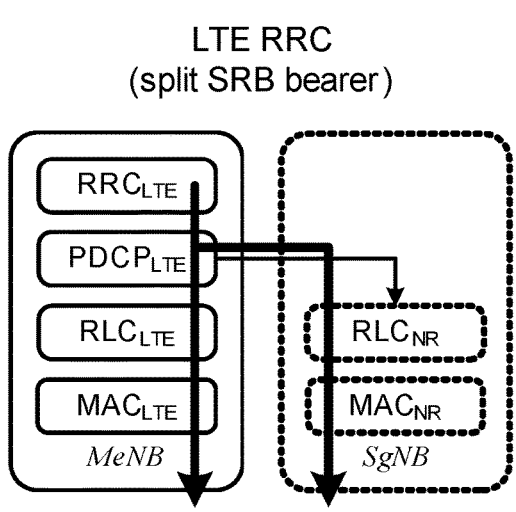
FIG. 31A illustrates an example of a LTE RRC split SRB bearer, in accordance with one or more aspects of the present disclosure.
Figure 31B:
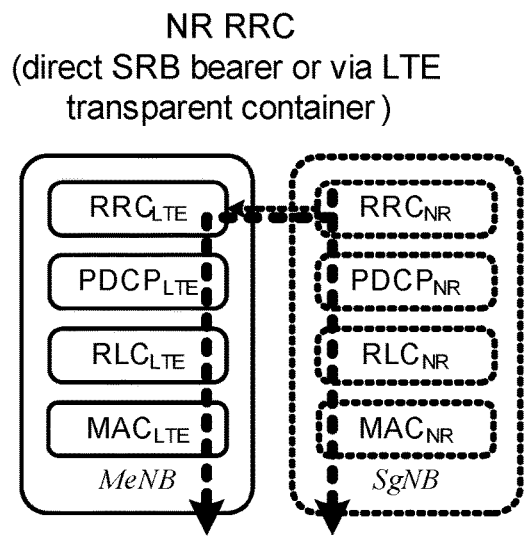
FIG. 31B illustrates an example of a NR RRC direct SRB bearer or via LTE RRC container, in accordance with one or more aspects of the present disclosure.

According to one or more examples, one or more options may be provided for an SRB split and direct bearer. For example, FIG. 31A illustrates an example of a LTE RRC split SRB bearer, and FIG. 31B illustrates an example of a NR RRC direct SRB bearer or via LTE RRC container, in accordance with aspects of the present disclosure. Particularly, FIGS. 31A and 31B illustrate possible data paths for two agreements for delivery of a RRC message from the SN to the UE, where LTE RRC can use a split SRB bearer and NR RRC can use a direct SRB or send a RRC message via a LTE RRC container.

Figure 32A:
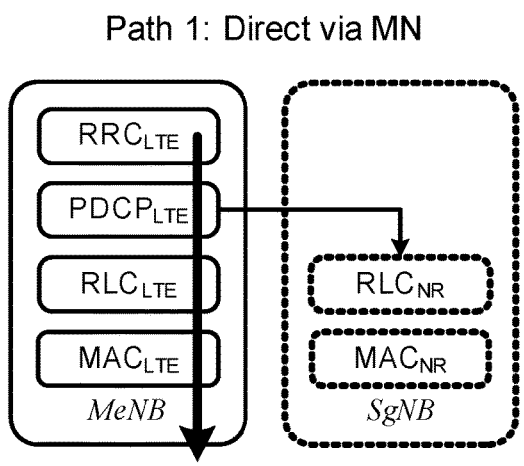
FIGS. 32A and 32B illustrate example LTE RRC message delivery paths, in accordance with one or more aspects of the present disclosure.
Figure 32B:
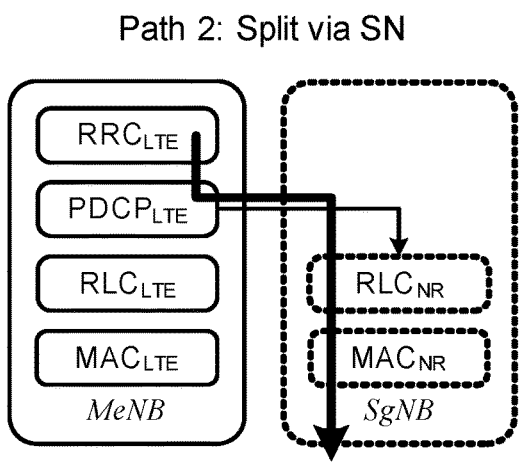
Figures 33A, 33B, 33C:
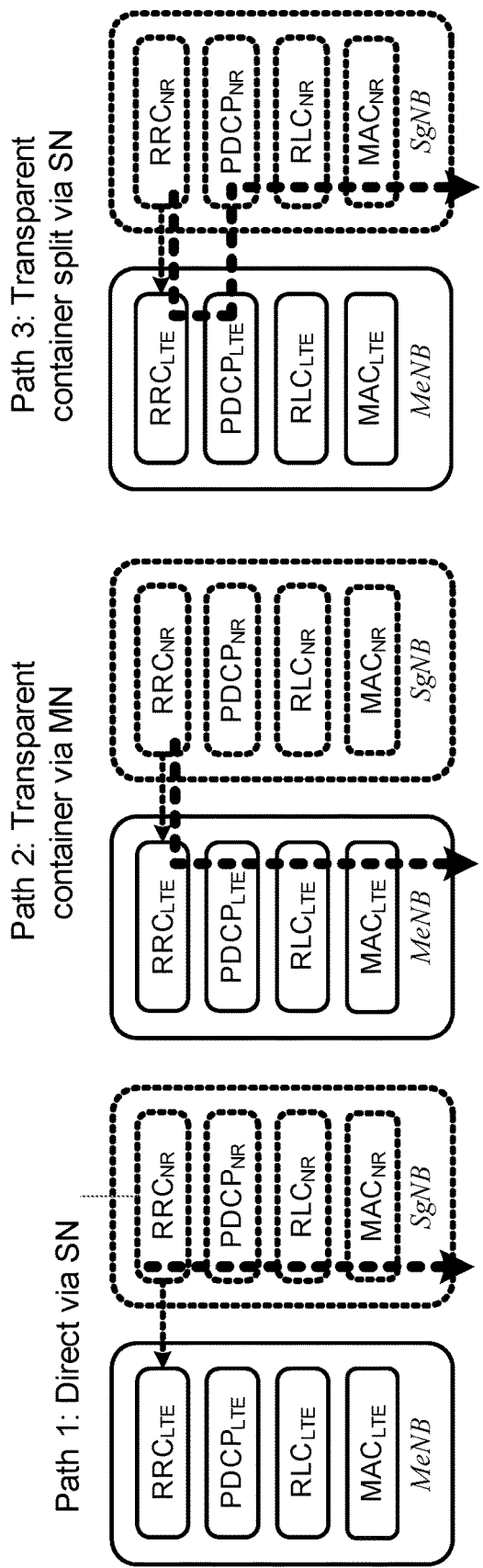
FIGS. 33A, 33B, and 33C illustrate examples of NR RRC message delivery paths, in accordance with one or more aspects of the present disclosure.

In accordance with one or more examples, looking at options slightly differently a RRC message from LTE may have two possible delivery paths and an NR RRC message may have three as show in the FIGS. 32A, 32B, 33A, 33B, and 33C. Particularly, FIGS. 32A and 32B illustrate example LTE RRC message delivery paths, in accordance with aspects of the present disclosure. FIGS. 33A, 33B, and 33C illustrate examples of NR RRC message delivery paths, in accordance with aspects of the present disclosure.

In LTE, some SRB types are defined in TS 36.331 and may include, for example: SRB0 that may be for RRC messages using the CCCH logical channel; SRB1 that may be for RRC messages (which may include a piggybacked NAS message) as well as for NAS messages prior to the establishment of SRB2, all using DCCH logical channel; and SRB2 that may be for RRC messages which include logged measurement information as well as for NAS messages, all using DCCH logical channel. SRB2 may have a lower-priority than SRB1 and may be configured by E-UTRAN after security activation. SRB2 may not be applicable for NB-IoT.

According to one or more examples, the use of SRB0 on the SN may be provided. Particularly, as defined above SRB0 may be used in the initial connection setup and so may not be part of LTE DC. Assuming that NR reuses the LTE baseline for managing SRB messages, the SRB0 may not be required on the SN either for LTE RRC or SRB direct messages. Accordingly, one observation that may be made includes that SRB0 may not be needed on the SN for either RRC diversity or direct SRB based on the LTE definitions of their use.

According to one or more examples, the use of SRB1 on the SN may be provided. Particularly, SRB1 may be the main LTE SRB for sending RRC messages and may be used for mobility management and other RRC messages that apply to the direct SRB. Additionally, SRB1 may make sense to be use for RRC diversity use case as SRB1 may be an important SRB for managing the radio link. Accordingly, an observation that may be made includes that SRB1 may be needed on the SN for both RRC diversity and direct SRB based on the LTE definitions of their use.

According to one or more examples, the use of SRB2 on the SN may be provided. Particularly, the SN direct SRB may not connect to the MME so no NAS messages may need to be sent on the SN direct SRB. Accordingly, an observation that may be made includes that NAS messages may not needed on the SN direct SRB.

Other SRB messages on SRB2 as defined in LTE may be useful to send on the SN direct SRB. Additionally, there may be no reason to restrict LTE split RRC messages for SRB2 to not be sent via the SN. Accordingly, an observation that may be made includes that SRB2 may be needed on the SN for either RRC diversity or direct SRB based on the LTE definitions of their use. Thus, according to one or more options, SRB0 may not supported on SN and SRB1 and SRB2 may be supported on the SN for both split and direct SRB use cases.

Figure 34A:
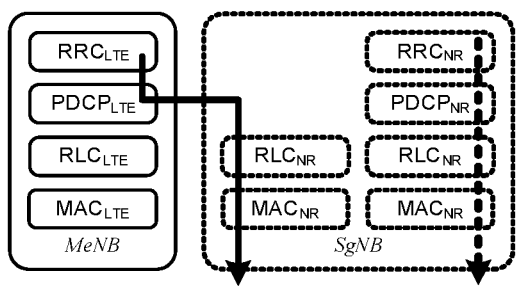
FIGS. 34A and 34B illustrate examples of Split SRB and direct SRB RRC delivery, in accordance with one or more aspects of the present disclosure.
Figure 34B:
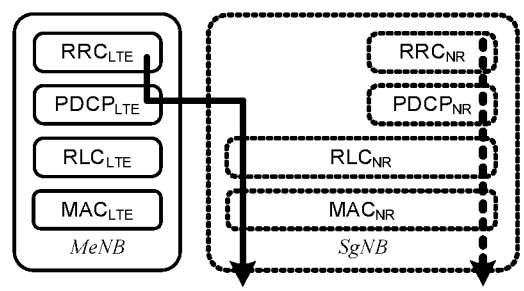

In accordance with one or more examples, options for an SRB protocol stack at the SN may be provided. For example, there may be two choices for the protocol stack at the SN when both the direct SRB at the SN and split SRB is present. A first option, as shown in FIG. 34A, may include a split SRB and direct SRB being delivered via separate RLC instances. A second option, as shown in FIG. 34B, may include a split SRB and direct SRB being delivered via a common RLC instance.

Looking at FIG. 34A, this first option may require an additional SRB to be supported in the SN for each SRB supported, even though it will have the same configuration, service requirements and reliability as for the same SRB on the SN. On the other hand, looking at FIG. 34B, the second option may require two PDCP instances sharing a single DRB.

Additionally, in one or more examples, RLC in NR may provide reliability and segmentation as a service and so may be allowed to support multiple PDCP instances with the same QoS requirements. Accordingly, an observation that may be made includes that a split SRB and direct SRB may be delivered via a common RLC instance that preserves the existing LTE model of SRB0, SRB1 and SRB2 and does not require SRB3, SRB4 or more at the SN. Thus, according to one or more options, a split SRB and direct SRB may be delivered via a common RLC instance.

In accordance with one or more cases disclosed herein, one or more methods and apparatus for packet data convergence protocol (PDCP) instance aggregation in radio link control (RLC) using communications systems operating according to new radio (NR) technologies may be provided. Additionally, the methods and/or apparatus may be provided in response to a number of different use cases that would benefit from such a method or apparatus.

In LTE, each UE has only one RRC connection for a PDU session, and therefore only one RLC instance for the purpose. In contrast, in NR, RRC diversity may be supported. RRC diversity provides that the RRC connections from multiple base stations may transmit one or more messages originated from one base station through multiple base stations. In other words, one base station may receive RRC messages from multiple base stations, and may therefore require multiple RLC instances to handle the RRC messages. In order to reduce overhead of setting up multiple RLC instances with the same configurations, transmitting multiple DRBs' messages on one logical channel, i.e. one RLC instance, may be provided in accordance with one or more cases as described herein.

Further, according to another use case, such as in a handover scenario, a user plane stack may allow packet duplication at the PDCP layer. In this case, the source and target base stations may transmit duplicate packets to the same UE using separate RLC instances. According to one or more cases, the UE may be able to use the same PDCP instance to receive the duplicate packets from two links for the purpose of duplication removal.

According to one or more cases, another use case may include a flow reordering queue separation with the same scheduling priority. For example, in NR, PDCP handles reordering. On the other hand, an RLC instance represents a logical channel and the priority associated with an RLC may be used by a MAC layer to perform scheduling. In some cases, a traffic flow may have packets that require a separate reordering queue at the Rx side, but on the other hand, may be scheduled as one flow at the Tx side. For example, it may be beneficial to separate the uplink TCP ACK and uplink TCP data for a bi-directional TCP flow. In such cases, it is desired to separate the two types of packets by using two PDCP instances, and at the same time handle them as traffic from one RLC instance at the MAC layer.

Therefore, in accordance with one or more cases, a transmitter and/or receiver may be provided during any of the above use cases, or any other applicable use case for packet data convergence protocol (PDCP) instance aggregation in radio link control (RLC).

For example, on a transmitter (Tx) side each Tx node, e.g. eNB, may include a labeling function and a multiplexing function. One or more connections from different gNBs may use the same RLC instance. This may be provided by providing each connection a unique PDCP instance identifier (PII). The PII may include an identifier of the gNB where the PDCP terminates. In another case, the PII may indicate the identifier of a PDCP instance. In another case, the PII may include information indicating a RRC connection. The PII may include information indicating a type of traffic. Further, in another case, the PII may include information indicating the traffic is from a RRC connection. Additionally, the PII may include information indicating one or more of a QoS flow, a type of upper layer connection, or a default PDCP instance.

According to one or more cases, the PII may be included in at least one of a PDCP header, a RLC header, a MAC header, and a labeling header. In one or more cases, a labeling layer may be above PDCP or the labeling layer may be between PDCP and RLC. According to one or more cases, the labeling function labels the packets of each connection using the PII. Additionally, in one or more cases, the labeling function may be above, within, or below the PDCP layer.

The multiplexing function multiplexes the packet to an RLC instance based on PIIs. Further, multiplexing may be based on a PII to RLC instance mapping rule. According to one or more cases, the multiplexing function may be above, within, or below the PDCP layer and is above RLC layer. In some cases, the labeling function on the master node and the multiplexing function on a secondary node are used. The secondary node may be a second transmitter such as a TCP, gNB, or eNB.

Figure 37:
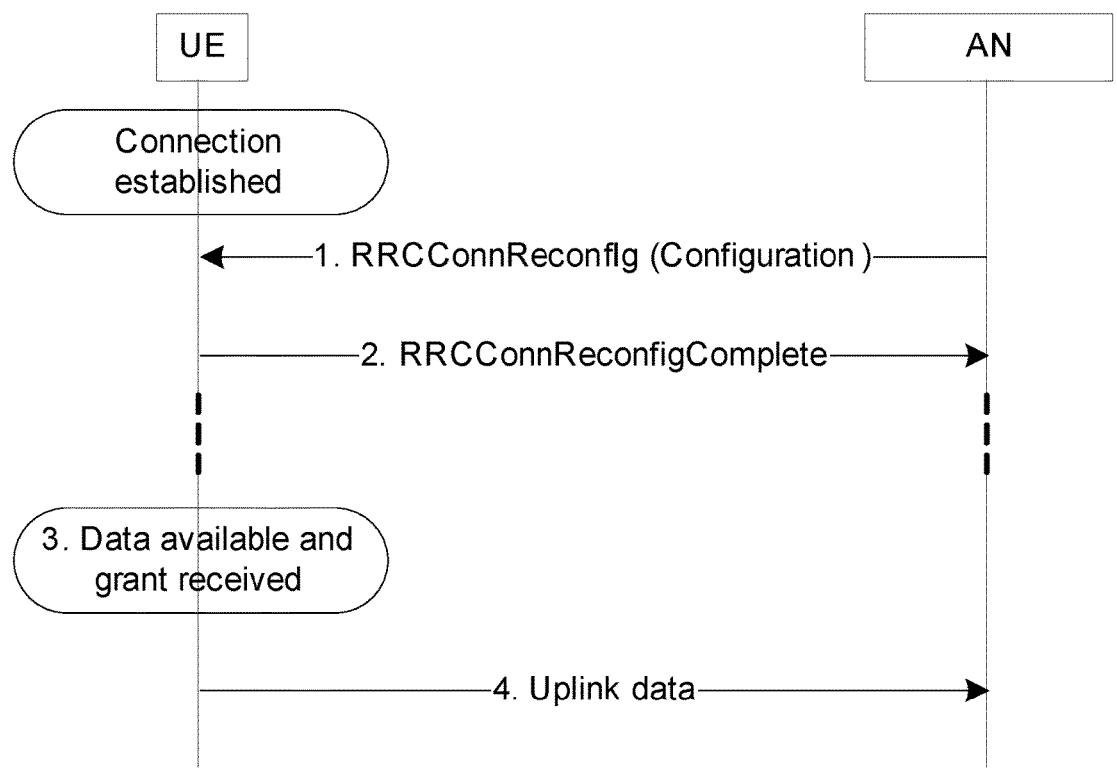
FIG. 37 illustrates an example of communications between a UE and AN, in accordance with one or more aspects of the present disclosure.

According to one or more cases, on a receiver (Rx) side, a receiver may determine which PDCP instance should process a packet based on the PII. Further according to one or more cases, the PII value of a PDCP instance can be configured using RRC signaling. The PII to RLC instance (LCID) mapping may be configured using RRC signaling. In another case, a special value may be used as default PII. In accordance with one or more cases, any of this configuring, or any other element configuration, may be done during configuration operations as shown in FIG. 37. Particularly, during configuration operations that occur after a connection is established and before a grant is received and data is available and transmitted.

Figure 35:
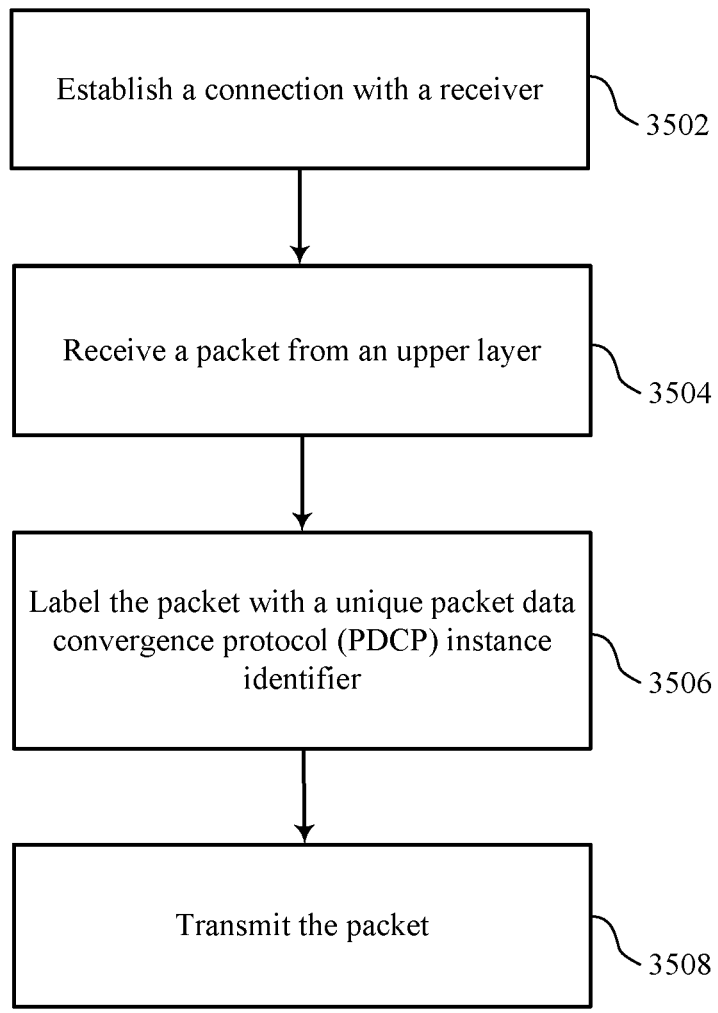
FIG. 35 illustrates example operations for wireless communications by a transmitter, in accordance with one or more aspects of the present disclosure.

For example, FIG. 35 illustrates example operations 3500 for wireless communications by a transmitter, in accordance with aspects of the present disclosure.

Specifically, operations 3500 begin, at block 3502, with establishing a connection with a receiver. The operations 3500 also include, at block 3504, receiving a packet from an upper layer. Further, operations 3500 include, at block 3506, labeling the packet with a unique packet data convergence protocol (PDCP) instance identifier (PII). Finally, operations 3500 may also include, at block 3508, transmitting the packet.

Figure 36:
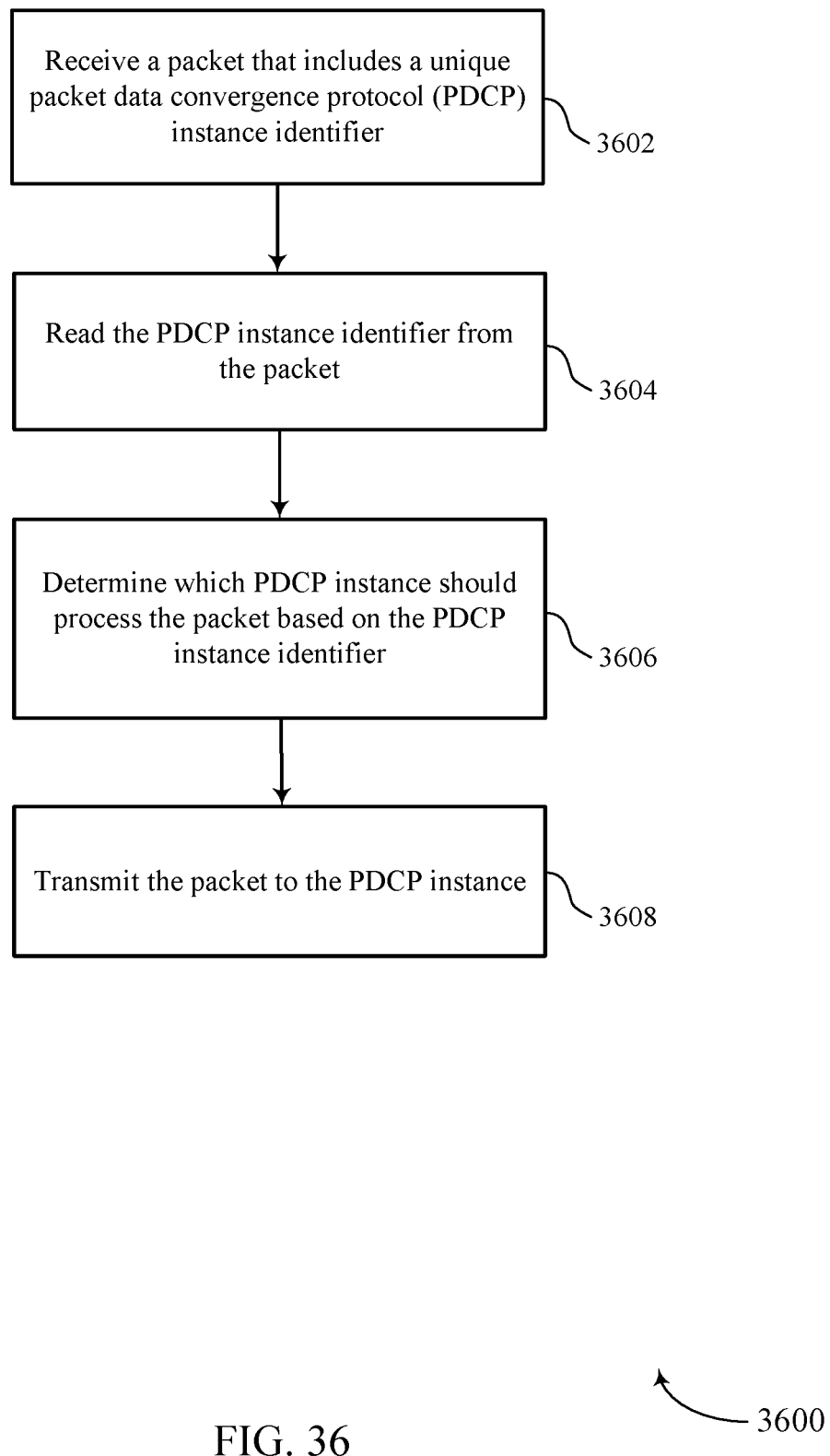
FIG. 36 illustrates example operations for wireless communications by a receiver, in accordance with one or more aspects of the present disclosure.

FIG. 36 illustrates example operations 3600 for wireless communications by a receiver, in accordance with aspects of the present disclosure.

Specifically, operations 3600 begin, at block 3602, with receiving a packet that includes a unique packet data convergence protocol (PDCP) instance identifier (PII). The operations 3600 also include, at block 3604, reading the PII from the packet. Further, operations 3600 include, at block 3606, determining which PDCP instance should process the packet based on the PII. Operations 3600 may also include, at block 3608, transmitting the packet to the PDCP instance.

For example, in accordance with one or more cases, the method of wireless communication may include one or more features and elements that may help provide packet data convergence protocol (PDCP) instance aggregation in radio link control (RLC). In a single transmitter case, the transmitter may be a single gNB and the receiver may be a UE. In this case, operations may be included such as establishing a first connection with the UE and receiving a packet from upper layer. Further, this case may include labeling the packet with a unique PDCP instance identifier (PII). The PII may include an identifier of the gNB where the PDCP terminates. In another example, the PII may indicate the identifier of a PDCP instance. Further, the PII may include information indicating the traffic is from a RRC connection. Additionally, a special PII value may be used to indicate a default PDCP instance. Further, the operations may include determining based on the PII which RLC instance to send the packet to. The determination may be based on a PII to RLC instance mapping rule In a dual connectivity case a transmitter, which may be for example a master gNB, may establishing a first connection with a receiver, which may be, for example, a UE. The transmitter may then receive a packet from upper layer and label the packet by a unique PDCP instance identifier (PII). Similar to the single transmitter case, the PII may also include an identifier of the gNB where the PDCP terminates. Further, the PII may indicate the identifier of a PDCP instance. In another case, the PII may include information indicating the traffic is from a RRC connection. A special PII value may be used to indicate a default PDCP instance.

This case may further send the packet to a secondary transmitter, which may be a secondary gNB, where the PII is included in the packet. The secondary receiver may then receive the packet from the transmitter, gNB, and reads the PII from the packet. The receiver may then determine, based on the PII, which RLC instance to send this packet to. Further, the determination may be based on a PII to RLC instance mapping rule. In one or more cases, RRC signaling may be included such that PII may be configured using RRC signaling. Further, the RRC signaling may also include configuring PII to RLC instance (LCID) mapping using RRC signaling. In other cases, the transmitter may be a UE while the receiver may be a gNB.

According to one or more cases, multiple PDCP instances from different RAN nodes on the DL may be provided, and each one may be labeled and served by a common RLC. Accordingly, multiple PIIs may be provided such that each one indicates a different source node. For example, according to one or more cases, a second PII for the same RLC may be provided, where the second PII indicates where the PDCP terminates. Further, a UE in dual connectivity may be provided that includes two or more links associated with the connection, where the second PII indicates a link where the PDCP terminates. Additionally, the second PII may indicate a RRC instance associated with the PDCP.

In accordance with aspects of the subject technology, the methods 1400, 1500, 1600, 1700, 1800, 1900, 2000, 2100, 2200, 2300, 3500, and 3600 described with reference to FIGS. 14, 15, 16, 17, 18, 19, 20, 21, 22, 23, 35 and 36 may provide for wireless communication. It should be noted that the methods 1400, 1500, 1600, 1700, 1800, 1900, 2000, 2100, 2200, 2300, 3500, and 3600 are example implementations of some of the techniques described in the present disclosure, and the operations of the methods 1400, 1500, 1600, 1700, 1800, 1900, 2000, 2100, 2200, 2300, 3500, and 3600 may be rearranged, combined with other operations of the same or different method, or otherwise modified, such that other implementations are possible. Operations may also be added to the methods 1400, 1500, 1600, 1700, 1800, 1900, 2000, 2100, 2200, 2300, 3500, and 3600.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method of wireless communication comprising:
   receiving, at a medium access control (MAC) entity of a receiving device over a wireless interface, protocol data units (PDUs) corresponding to one or more Internet protocol (IP) flows, wherein each of the received PDUs includes a unique packet data convergence protocol (PDCP) instance identifier corresponding to a radio link control (RLC) entity and a first PDCP entity as well as an additional unique PDCP instance identifier corresponding to the RLC entity and a second PDCP entity different from the first PDCP entity;
   routing the PDUs from the MAC entity to respective RLC entities based at least in part on a logical channel prioritization; and
   forwarding the PDUs from respective RLC entities to a set of PDCP entities mapped to each RLC entity, wherein the set of PDCP entities includes both the first PDCP entity and the second PDCP entity.

2. The method of claim 1, wherein forwarding the PDUs from respective RLC entities to the set of PDCP entities further comprises:
   forwarding PDUs corresponding to one IP flow of the one or more IP flows to the first PDCP entity or the second PDCP entity of the set of PDCP entities, wherein the first PDCP entity or the second PDCP entity is dedicated to the one IP flow.

3. The method of claim 1, wherein forwarding the PDUs from respective RLC entities to the set of PDCP entities further comprises:
   extracting, at respective RLC entities, an IP flow identifier from a header of each of the PDUs; and
   forwarding the PDUs to the first PDCP entity or the second PDCP entity of the set of PDCP entities based at least in part on the IP flow identifier.

4. The method of claim 1, wherein forwarding the PDUs from respective RLC entities to the set of PDCP entities further comprises:
   forwarding PDUs corresponding to a correlated portion of the one or more IP flows to the first PDCP entity or the second PDCP entity of the set of PDCP entities, wherein the first PDCP entity or the second PDCP entity is dedicated to the correlated portion of IP flows.

5. The method of claim 1, wherein routing the PDUs from the MAC entity to respective RLC entities further comprises:
   routing the PDUs from the MAC entity to respective radio bearers, each radio bearer comprising a single RLC entity and multiple PDCP entities, the multiple PDCP entities comprising both the first PDCP entity and the second PDCP entity.

6. The method of claim 5, wherein the single RLC entity is a receive RLC entity that is different from a transmit RLC entity for the multiple PDCP entities.

7. The method of claim 1, wherein forwarding the PDUs from respective RLC entities to the set of PDCP entities comprises:
forwarding the PDUs from respective RLC entities to corresponding respective PDCP entities, at least one of the respective RLC entities and corresponding respective PDCP entities being dedicated to a single IP flow.

8. The method of claim 7, wherein forwarding the PDUs from respective RLC entities to corresponding respective PDCP entities further comprises:
using matching sequence numbers for a same PDU at a respective RLC entity and the first PDCP entity or the second PDCP entity, wherein the first PDCP entity or the second PDCP entity is mapped to the respective RLC entity.

9. The method of claim 7, wherein forwarding the PDUs from respective RLC entities to corresponding PDCP entities further comprises:
forwarding PDUs corresponding to a correlated portion of the one or more IP flows to the first PDCP entity or the second PDCP entity of the set of PDCP entities, wherein the first PDCP entity or the second PDCP entity is dedicated to the correlated portion of IP flows.

10. The method of claim 7, wherein routing the PDUs from the MAC entity to respective RLC entities further comprises:
routing the PDUs from the MAC entity to respective radio bearers, each radio bearer comprising a single RLC entity and a single PDCP entity.

11. The method of claim 10, wherein the single RLC entity is a receive RLC entity that is different from a transmit RLC entity for the single PDCP entity.

12. The method of claim 1, wherein forwarding the PDUs from respective RLC entities to the set of PDCP entities comprises:
forwarding the PDUs from respective RLC entities to one or more of the first PDCP entity or the second PDCP entity, at least one of the first PDCP entity or the second PDCP entity being dedicated to a single IP flow.

13. The method of claim 1, further comprising:
demultiplexing the PDUs corresponding to the one or more IP flows at the respective RLC entities.

14. A method of wireless communication comprising:
receiving, at a first packet data convergence protocol (PDCP) entity dedicated to an Internet protocol (IP) flow, protocol data units (PDUs) corresponding to the IP flow;
labeling each of the PDUs corresponding to the IP flow with a unique PDCP instance identifier corresponding to a radio link control (RLC) entity and the first PDCP entity as well as an additional unique PDCP instance identifier corresponding to the RLC entity and a second PDCP entity different from the first PDCP entity;
passing, from the first PDCP entity, the PDUs to the RLC entity based at least in part on a logical channel identifier (LCID) associated with the RLC entity;
forwarding the PDUs from the RLC entity to a medium access control (MAC) entity for wireless transmission; and
transmitting the PDUs over a wireless interface to a receiving device.

15. The method of claim 14, wherein the RLC entity and the first PDCP entity dedicated to the IP flow are mapped together as a radio bearer.

16. The method of claim 14, further comprising:
concatenating PDUs corresponding to the IP flow received at the first PDCP entity dedicated to the IP flow.

17. The method of claim 14, further comprising:
concatenating PDUs from the RLC entity belonging to the LCID associated with the RLC entity.

18. The method of claim 14, further comprising:
determining, at the MAC entity, a logical channel prioritization for a plurality of IP flows including the IP flow.

19. The method of claim 14, further comprising:
inserting, at the first PDCP entity, an IP flow identifier in a header of each of the PDUs passed to the RLC entity.

20. A method of wireless communication comprising:
receiving, by a receiving device over a wireless interface, a protocol data unit (PDU) that includes a unique packet data convergence protocol (PDCP) instance identifier corresponding to a radio link control (RLC) entity associated with the PDU and a first PDCP entity as well as an additional unique PDCP instance identifier corresponding to the RLC entity and a second PDCP entity different from the first PDCP entity;
identifying the first PDCP entity corresponding to the PDU based at least in part on the PDCP instance identifier; and
forwarding the PDU to the first PDCP entity.

21. The method of claim 20, wherein receiving, by the receiving device, the PDU that includes the unique PDCP instance identifier comprises:
receiving, at a medium access control (MAC) entity of the receiving device, the PDU that includes the unique PDCP instance identifier, the PDU corresponding to an Internet protocol (IP) flow.

22. The method of claim 20, wherein forwarding the PDU to the first PDCP entity comprises:
determining that the first PDCP entity is associated with a destination receiving device different from the receiving device; and
transmitting the PDU to the destination receiving device.

23. A method of wireless communication comprising:
receiving, at a protocol layer entity above a packet data convergence protocol (PDCP) layer of a transmitting device, a protocol data unit (PDU);
labeling the PDU with a unique PDCP instance identifier corresponding to a radio link control (RLC) entity and a first PDCP entity;
determining the RLC entity associated with the PDU based at least in part on the unique PDCP instance identifier;
labeling the PDU with an additional unique PDCP instance identifier, the additional unique PDCP instance identifier corresponding to the RLC entity and a second PDCP entity different from the first PDCP entity;
passing the PDU to a protocol layer entity below the PDCP layer of the transmitting device; and
transmitting the PDU over a wireless interface.

24. The method of claim 23, wherein passing the PDU to a protocol layer below the PDCP layer of the transmitting device comprises:
passing the PDU to the entity of the transmitting device based at least in part on a logical channel identifier (LCD) associated with the RLC entity and the method further comprising:
forwarding the PDU from the RLC entity to a medium access control (MAC) entity for wireless transmission.

25. The method of claim 23, wherein transmitting the PDU over the wireless interface comprises:

transmitting the PDU to a destination transmitting device different from the transmitting device when the unique PDCP instance identifier is associated with the destination transmitting device.

\* \* \* \* \*